United States Patent
Ogasawara et al.

(10) Patent No.: US 8,004,951 B2
(45) Date of Patent: Aug. 23, 2011

(54) PICKUP DEVICE

(75) Inventors: Masakazu Ogasawara, Tsurugashima (JP); Takuma Yanagisawa, Tsurugashima (JP); Katsuhiro Koike, Kawasaki (JP)

(73) Assignee: Pioneer Corporation, Tokyo (JP)

( * ) Notice: Subject to any disclaimer, the term of this patent is extended or adjusted under 35 U.S.C. 154(b) by 393 days.

(21) Appl. No.: 12/307,853

(22) PCT Filed: Jul. 13, 2007

(86) PCT No.: PCT/JP2007/063965
§ 371 (c)(1),
(2), (4) Date: Jan. 7, 2009

(87) PCT Pub. No.: WO2008/007768
PCT Pub. Date: Jan. 17, 2008

(65) Prior Publication Data
US 2009/0201787 A1 Aug. 13, 2009

(30) Foreign Application Priority Data
Jul. 13, 2006 (JP) .................................. 2006-192608

(51) Int. Cl.
*G11B 7/135* (2006.01)
(52) U.S. Cl. .................... 369/112.01; 369/94; 369/44.23
(58) Field of Classification Search ............. 369/112.01, 369/112.03, 112.06, 112.1, 112.16, 112.18, 369/112.19, 112.23, 44.23, 94
See application file for complete search history.

(56) References Cited

U.S. PATENT DOCUMENTS

| | | | | |
|---|---|---|---|---|
| 5,627,816 A * | 5/1997 | Ito et al. | ..................... | 369/275.1 |
| 6,442,125 B1 * | 8/2002 | Maeda et al. | .............. | 369/112.1 |
| 6,556,533 B1 * | 4/2003 | Fukakusa et al. | ........ | 369/112.19 |
| 6,839,313 B2 * | 1/2005 | Araki et al. | ............... | 369/112.01 |
| 7,539,090 B2 * | 5/2009 | Kadowaki et al. | ......... | 369/44.28 |
| 2002/0159342 A1 * | 10/2002 | Ogasawara et al. | ........ | 369/44.23 |
| 2004/0184388 A1 * | 9/2004 | Ito et al. | ..................... | 369/124.1 |
| 2005/0105407 A1 * | 5/2005 | Matsui et al. | ............... | 369/44.15 |
| 2007/0036058 A1 * | 2/2007 | Okamoto et al. | ........ | 369/112.06 |

FOREIGN PATENT DOCUMENTS

| | | |
|---|---|---|
| JP | 10-124906 A | 5/1998 |
| JP | 2003-045047 A | 2/2003 |
| JP | 2005-063595 A | 3/2005 |
| JP | 2006-252716 A | 9/2006 |
| WO | 2007/046284 A1 | 4/2007 |

* cited by examiner

*Primary Examiner* — Wayne R Young
*Assistant Examiner* — Thomas D Alunkal
(74) *Attorney, Agent, or Firm* — Sughrue Mion, PLLC

(57) ABSTRACT

A pickup device includes an irradiation optical system including an object lens for focusing light flux on a track of a recording surface of an optical recording media having a plurality of recording layers stacked while a spacer layer is interposed between the recording layers to form a spot and a detection optical system including an photo detector having a plurality of light receiving parts for receiving returning light reflected from the spot through the object lens to perform photoelectric conversion. The pickup device controls a position of the object leans according to an electrical signal calculated from outputs of the light receiving parts. The pickup device further includes an astigmatic device for providing astigmatism to the returning light directed to the light receiving parts and a division device, having divisional regions divided by a division line extending in an astigmatic direction about an optical axis of the returning light, for dividing the returning light having the astigmatism into a plurality of partial light fluxes divided for the respective divisional regions along the optical axis of returning light. The neighboring divisional regions provide the partial light fluxes with an optical action so that interference between the corresponding partial light fluxes does not occur on the light receiving parts.

10 Claims, 44 Drawing Sheets

Fig. 3
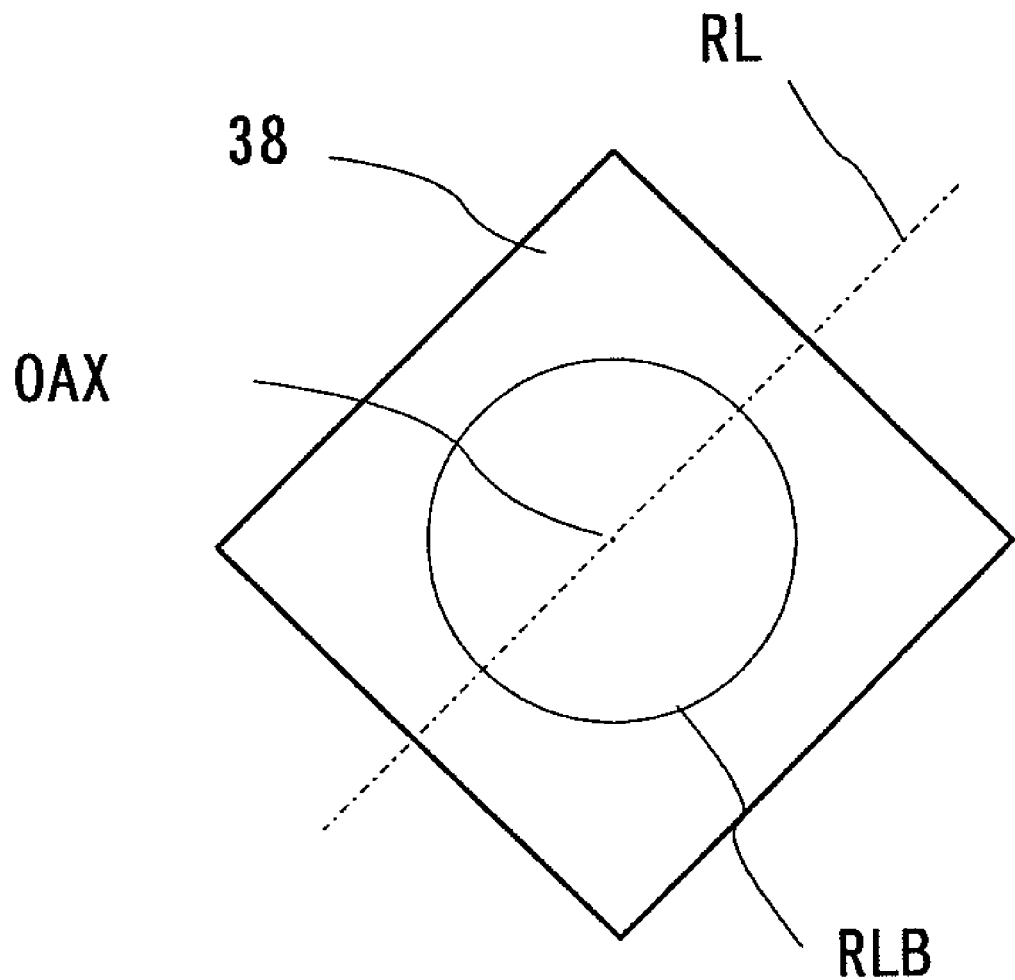
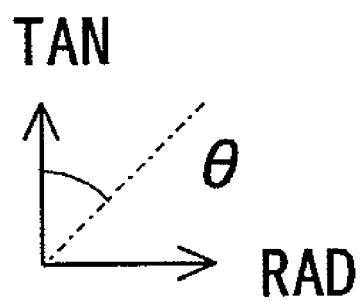

Fig. 4
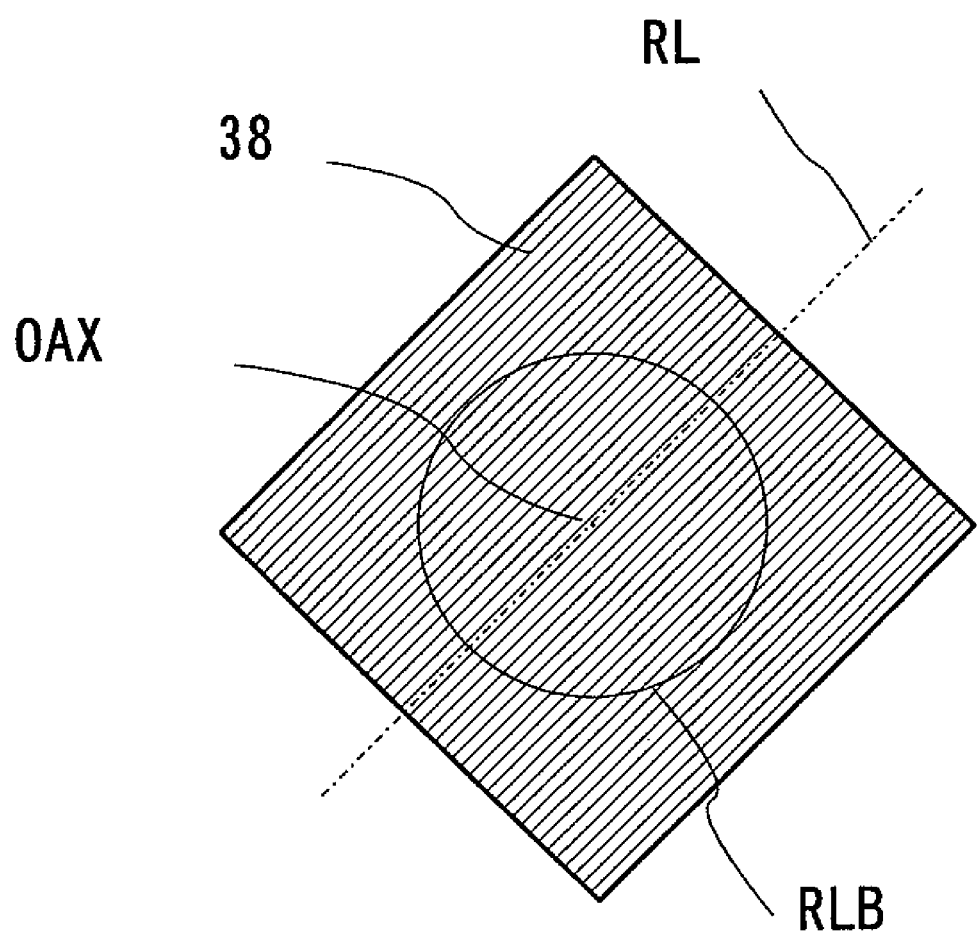
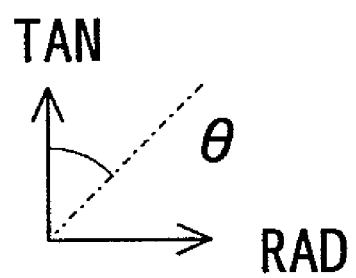

Fig. 5
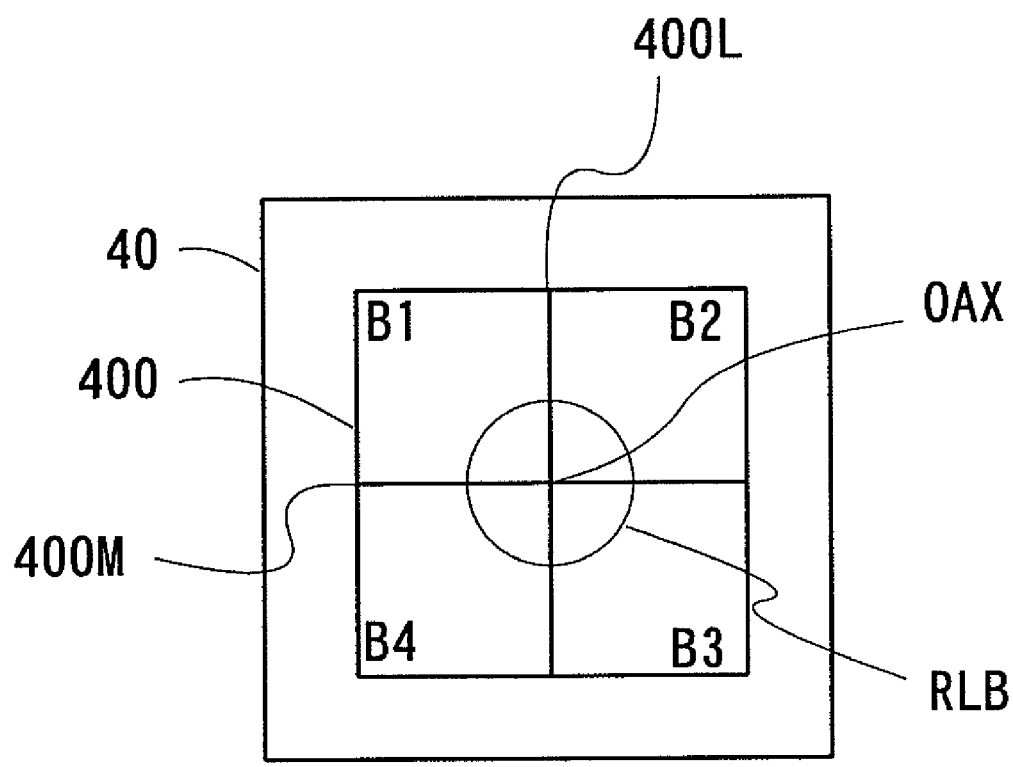
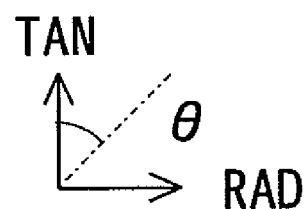

Fig. 7
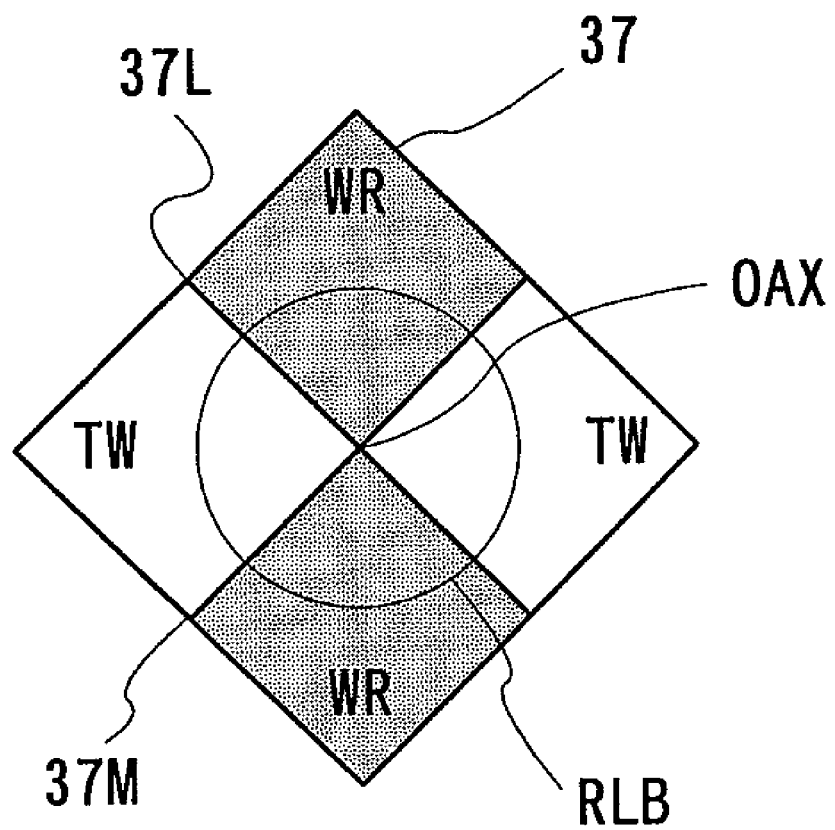
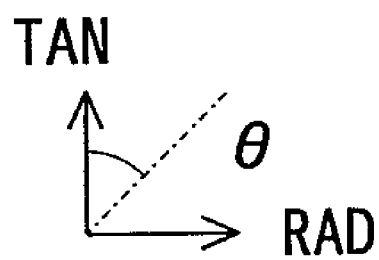

Fig. 1 3
(a)
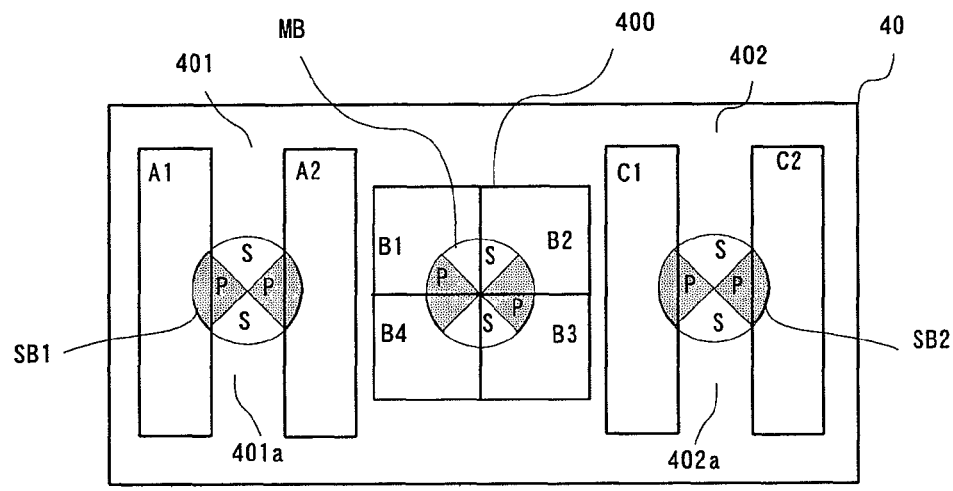
(b)
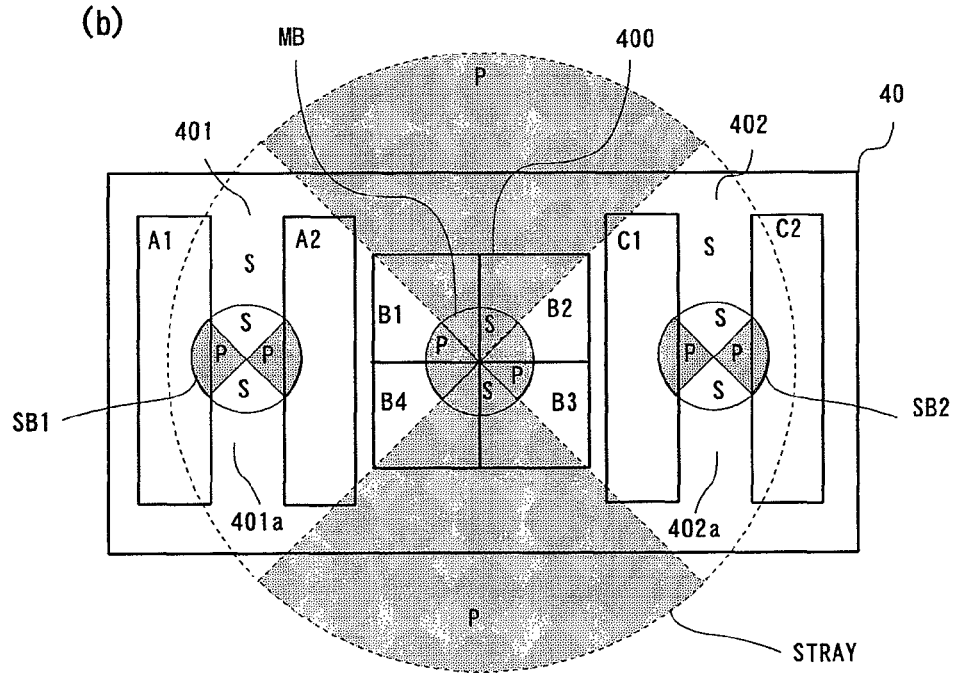

Fig. 19
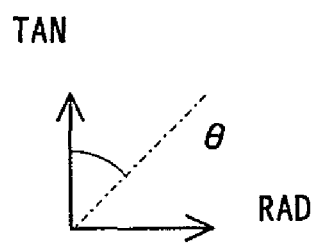
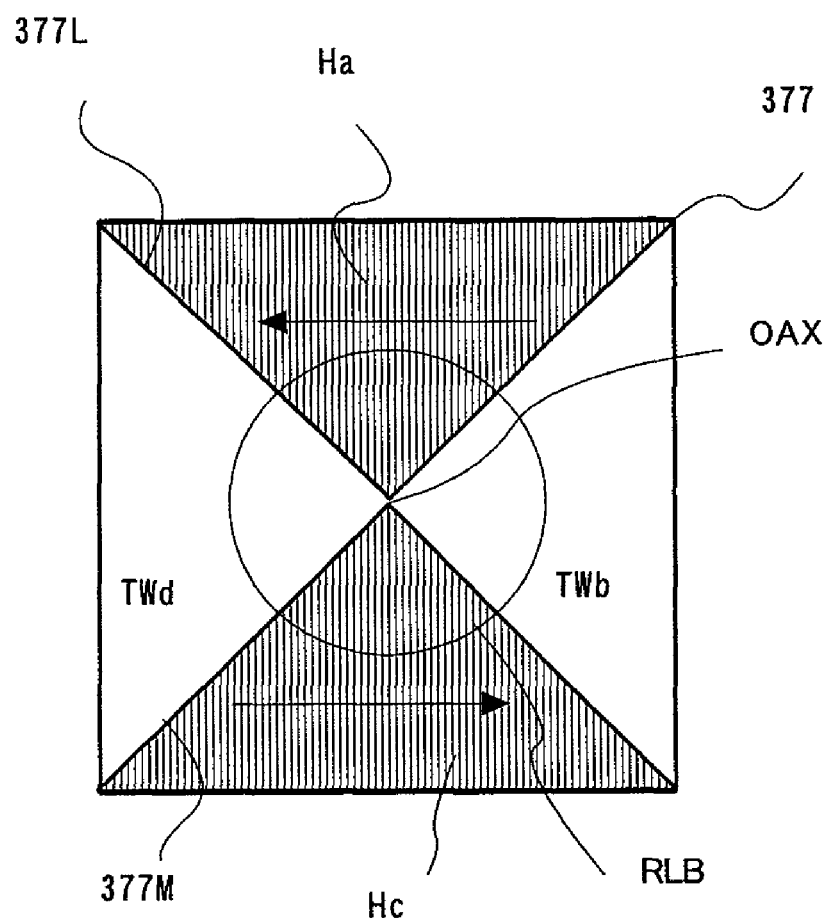

Fig. 24
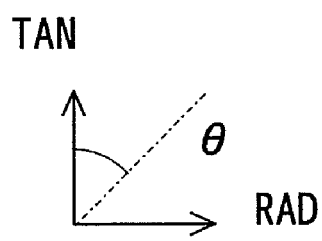
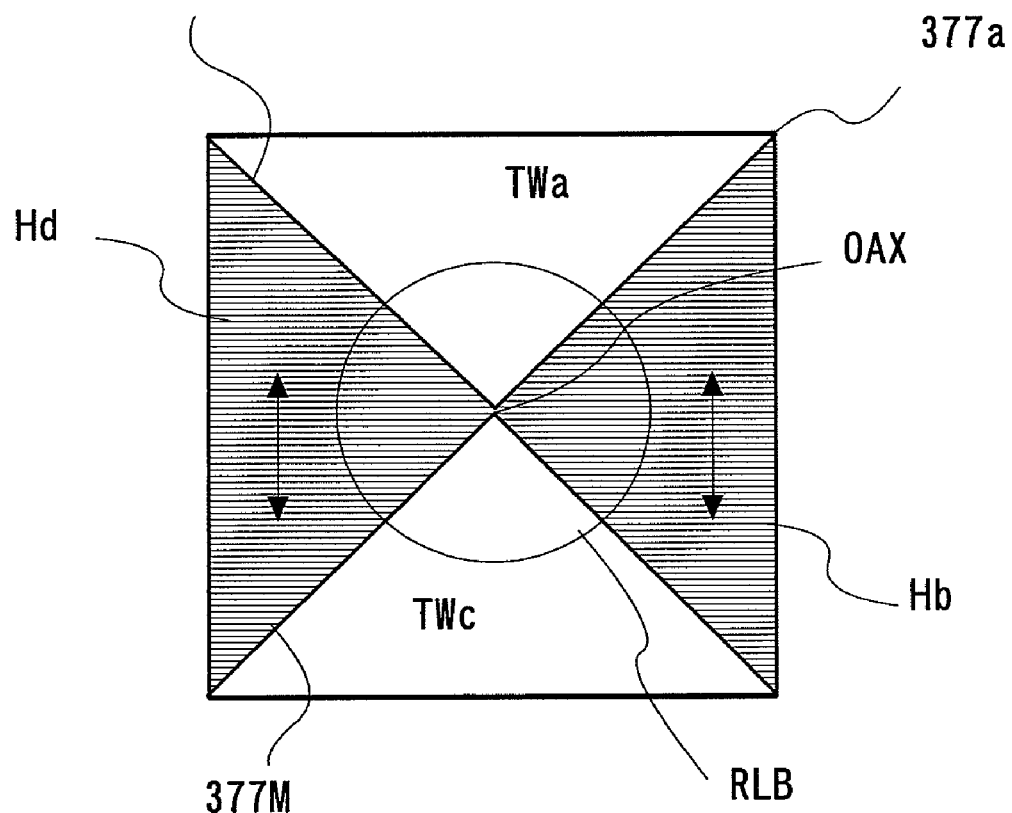

Fig. 39
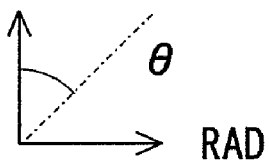
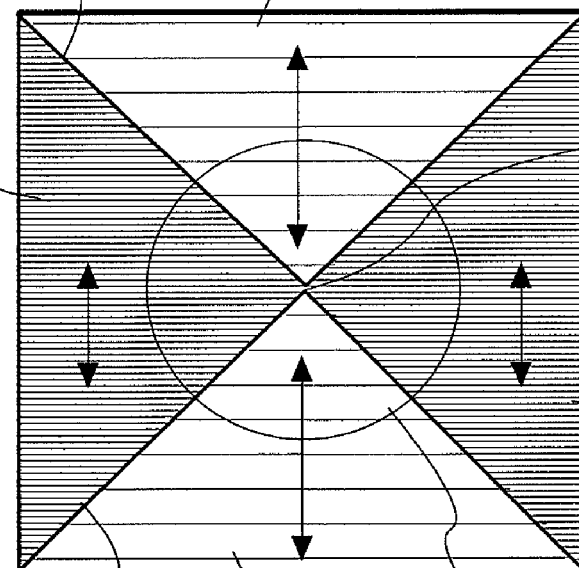

Fig. 44
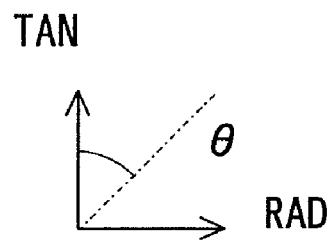
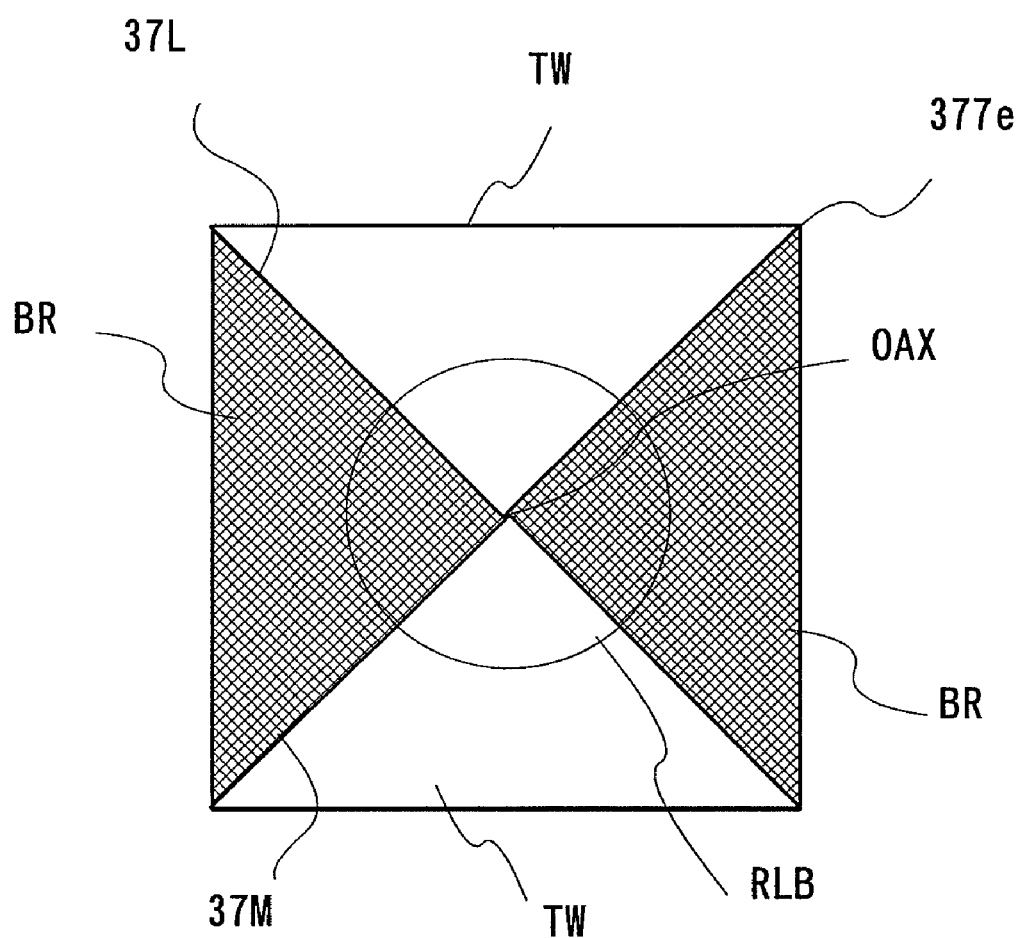

PICKUP DEVICE

BACKGROUND OF THE INVENTION

1. Field of the Invention

The present invention relates to an optical pickup device used in a recording and reproducing apparatus for an optical recording medium, such as an optical disk, etc., and more particularly to an optical pickup device that is capable of controlling the optimum focusing position of light flux focused on a target recording surface of an optical recording medium, such as an optical disk, etc., having a plurality of recording layers stacked using an astigmatic method.

2. Description of the Related Art

In recent years, an optical disk has been widely used as a means to record and reproduce various kinds of data, such as video data, audio data, computer data, etc. A high-density recording type disk called a Blu-ray™ Disk (hereinafter, referred to as a BD) has been put to practical use. This optical disk standard encompasses a multi-layer optical disk in which a plurality of recording layers are laminated. In a multi-layer optical disk constructed in a structure in which a plurality of recording layers are alternately stacked while spacer layers are interposed respectively between the recording layers, it is required to adjust the focus of light (an in-focus position or the optimum focusing position) on the recording surface of a target layer and irradiate the focused light spot to a target recording layer, in order for information to be read from one surface side of the optical disk by an optical pickup device.

For example, as shown in FIG. 1, a dual-layer disk is constructed in a structure in which a first recording layer (hereinafter, referred to L0, formed of a semitransparent film, which is close to a reading side thereof, and a second recording layer (hereinafter, referred to L1), formed of a reflective film, such as a metal or a dielectric, are disposed on a substrate Sub, a light-transmissive spacer layer SP to separate the recording layers from each other by a predetermined thickness is interposed between L0 and L1, and a cover layer CL is disposed to protect L0.

In case of the spacer thickness being large, when the focus is adjusted, for example, on L0, which is a target layer, from the cover layer side of the disk, laser light L2LB focused on L1 widely spreads out, with the result that light reflected from L1 is not bit modulated and thus becomes a very low frequency or direct-current-like signal. For this reason, when a high-frequency component is drawn from the read signal by a high pass filer, it is possible to read only the signal from L0. In case of the spacer thickness being small, on the other hand, even when the focus is adjusted on L0, laser light irradiated to L1 does not widely spread out. As a result, a signal from L1 leaks to some extent. (This leakage is called an interlayer cross talk.) Even in case of laser light L1LB being focused on L1, which is a target layer, the same result is obtained.

In order to adjust the focus on a target recording layer of a multi-layer optical disk, it is necessary to generate a focus error signal and perform servo control (focus draw-in). In order to prevent focus error noise, on the other hand, it is necessary to eliminate an influence, such as the interlayer cross talk, from the focus error signal.

Even in case of the interlayer cross talk being restrained, however, when laser light is focused on L0, which is a target layer, reflected light (signal light) is guided to an photo detector by a condensing lens, and, on the other hand, the reflected light (stray light) component of light having passed through L0 and spread out at L1 is also incident on the photo detector as stray light having a predetermined spread-out.

The stray light except the signal light interferes with the signal light, with the result that noise may occur. Also, the quality of an output signal from the photo detector may be deteriorated, and defects, such as the offset of a servo error signal, may occur.

For the pickup device, the reduction of noise caused by the stray light is much more pursued. In order to prevent the incidence of the stray light on the photo detector and thus avoid the interference between the stray light and the signal light in the photo detector, therefore, there has been proposed a technology for preventing such interference by masking some of returning light such that light from a layer other than a target recording layer is not directly incident on the photo detector (See Patent document 1).

Patent document 1: Japanese Patent Application Publication No. 2005-63595

DISCLOSURE OF THE INVENTION

Problem to be Solved by the Invention

In the conventional art, the overlap between the signal light and the stray light in the photo detector is prevented using a light shading band or a hologram. In the conventional art, however, some of the signal light necessary for the reproduction is shaded, with the result that the quality of the signal reproduced is deteriorated. Also, the partition number of the photo detector increases, although the light shading region is received by the photo detector, and the number of adders to acquire a desired signal from the output signal of the photo detector increases, with the result that operational noise increases.

Therefore, it is an object of the present invention as an exempla to provide a pickup device that is capable of maintaining the quality of a reproduction signal by signal light from a multi-layer recording medium.

Means for Solving the Problem

In accordance with the present invention, the above and other objects can be accomplished by the provision of a pickup device comprising: an irradiation optical system including an object lens for focusing light on a track of a recording surface of an optical recording media having a plurality of recording layers stacked while a spacer layer is interposed between the recording layers to form a spot; and a detection optical system including an photo detector having a plurality of light receiving parts for receiving returning light reflected from the spot through the condensing lens to perform photoelectric conversion, the pickup device controlling a position of the object leans according to an electrical signal calculated from outputs of the light receiving parts, wherein the pickup device further comprises:

an optical device for providing astigmatism to the returning light directed to the light receiving parts; and a division device, having divisional regions divided by a division line extending in an astigmatic direction about an optical axis of the returning light, for dividing the returning light having the astigmatism into a plurality of partial light fluxes divided for the respective divisional regions along the optical axis of returning light, wherein ones of the divisional regions neighboring each other provide the partial light fluxes with an optical action so that interference between the corresponding partial light fluxes does not occur on the light receiving parts.

BRIEF DESCRIPTION OF THE DRAWINGS

FIG. 3 is a typical plan view illustrating a cylindrical lens, which is an astigmatic device, of the optical pickup device according to the first embodiment of the present invention.

FIG. 5 is a typical plan view illustrating a photo detector of the optical pickup device according to the first embodiment of the present invention.

FIG. 7 is a typical plan view illustrating a divisional wave plate device of the optical pickup device according to the first embodiment of the present invention when viewing from an incidence side of the divisional wave plate device.

FIG. 13 is a typical plan view illustrating the photo detector of the optical pickup device according to the second embodiment of the present invention when viewing from the optical axis incidence side of the photo detector.

FIG. 19 is a typical plan view illustrating a divisional deflection device of the optical pickup device according to the fourth embodiment of the present invention when viewing from an optical axis incidence side of the divisional deflection device.

FIG. 24 is a typical plan view illustrating a divisional deflection device, the deflection direction of which is changed, of the optical pickup device according to the fifth embodiment of the present invention.

FIG. 39 is a typical plan view illustrating a divisional deflection device of an optical pickup device according to a ninth embodiment of the present invention.

FIG. 42 is a typical plan view illustrating the structure of a photo detector of the optical pickup device according to the tenth embodiment of the present invention.

FIG. 44 is a schematic plan view illustrating a divisional light shading device of the optical pickup device according to the eleventh embodiment of the present invention.

Figure 1:
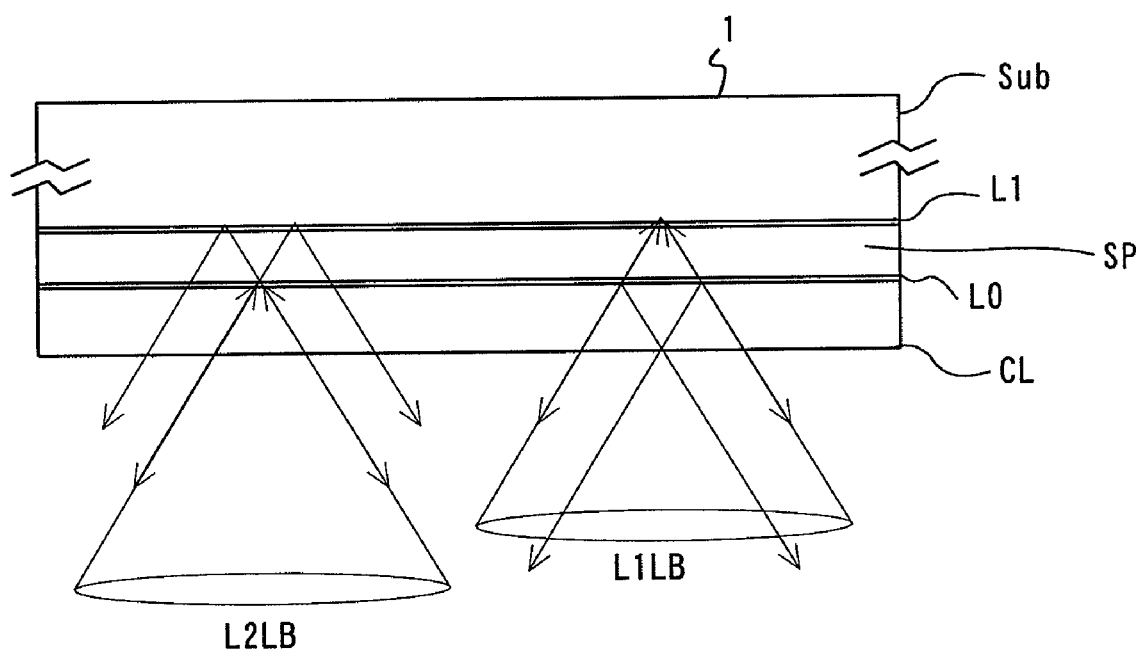
FIG. 1 is a schematic sectional view of a dual-layer optical disk.

EXPLANATION OF REFERENCE NUMERALS 1 optical disk
3 pickup device
31 semiconductor laser
32 sub beam creating diffraction grating
33 polarization beam splitter
34 collimator lens
35 quarter wave plate
36 object lens
37 divisional wave plate device
38 astigmatic device
40 photo detector
138 cylindrical assembly lens
138H quadrant transmission blazed hologram
400 quadrant optical detection unit
401 sub optical detection units
402 sub optical detection unit
B1, B2, B3, A1, A2, A3, C1, C2 light receiving parts
DM lens drive mechanism
M mirror

DETAILED DESCRIPTION OF THE PREFERRED EMBODIMENTS

Now, preferred embodiments of the present invention will be described in detail with reference to the accompanying drawings.

First Embodiment

Figure 2:
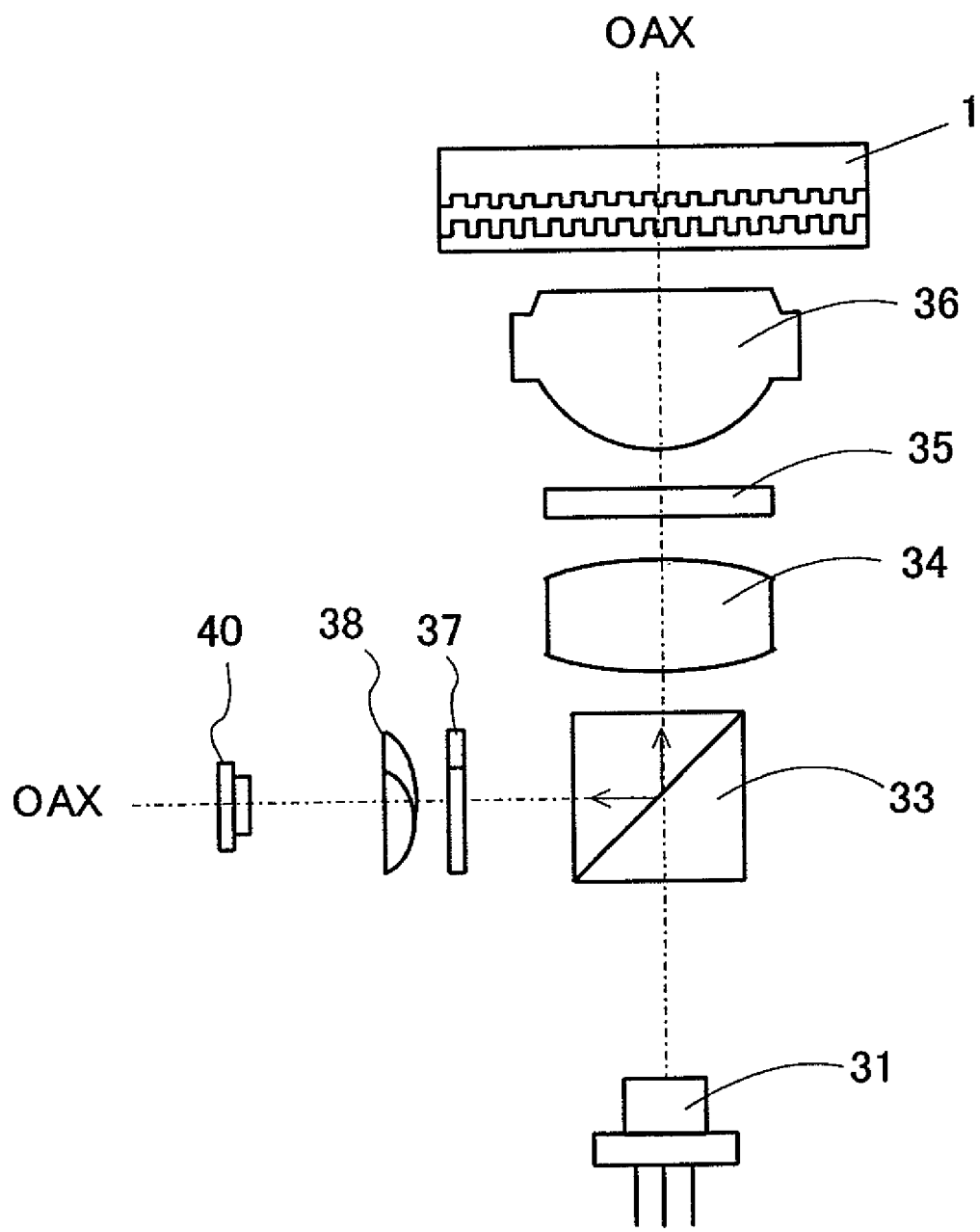
FIG. 2 is a schematic view illustrating the structure of an optical pickup device according to a first embodiment of the present invention.

FIG. 2 is a schematic view illustrating the structure of an optical pickup device 3 according to a first embodiment of the present invention. The optical pickup device 3 includes a semiconductor laser 31 as a light source, a polarization beam splitter 33, a collimator lens 34 to convert divergent light into parallel light, a quarter wave plate 35, an object lens 36, a divisional wave plate device 37, an astigmatic device 38, and a photo detector 40 to perform photoelectric conversion.

An optical disk 1 is an optical recording media having a plurality of recording layer stacked while a spacer layer is interposed between the recording layers. The optical disk 1 is placed on a turntable (not shown) of a spindle motor such that the optical disk 1 is spaced apart from the object lens 36.

The object lens 36, for focusing light flux on a target recording surface of the optical disk 1 to form a spot, is included in an irradiation optical system. The object lens 36 is movably supported such that the object lens 36 can perform a focus servo operation and a tracking servo operation. The position of the object lens 36 is controlled based on an electric signal calculated from the output of the photo detector. The object lens 36 is also included in a detection optical system that receives light reflected from the spot and returning and guides the returning light to the photo detector 40 via the polarization beam splitter 33.

The polarization beam splitter 33 has a polarization mirror. The polarization beam splitter 33 divides the optical path of passing light into different directions depending upon the polarization state of the passing light. The light flux focused on a signal surface track of the optical disk 1 at the object lens 36 is reflected, and is then incident on the object lens 36. The light flux of the returning light incident on the object lens 36 is separated from the irradiation optical system by the polarization beam splitter 33, and, at the same time, becomes straightly polarized light (S polarized light). The returning light flux reaches the photo detector 40 via the divisional wave plate device 37 and the astigmatic device 38.

The astigmatic device 38, disposed between the polarization beam splitter 33 and the photo detector 40, provides the returning light with astigmatism and performs focus servo by the astigmatism (an astigmatic method). The astigmatism is an aberration caused as the result of the focal distance of a lens optical system having different values at two sections perpendicular to an optical axis OAX. When point images are coupled in an optical system having astigmatism, the coupled image is changed into a shape having a relatively large vertical length, a circular shape, or a shape having a relatively large horizontal length according to its position between the two sections. Alternatively, the divisional wave plate device 37 and the astigmatic device 38 may be disposed in reverse order such that the returning light is diffracted and then the astigmatism is provided.

FIG. 3 is a typical plan view illustrating a cylindrical lens, which is an example of the astigmatic device 38. The cylindrical lens of the astigmatic device 38 provides astigmatism to returning light RLB directed toward the photo detector 40. As shown in the drawing, the cylindrical lens is disposed perpendicular to the optical axis OAX of the returning light such that, on a plane perpendicular to the optical axis OAX of the returning light, the direction in which a central axis RL (a ridgeline of the cylindrical lens or a rotational symmetry axis of a cylindrically curved surface forming a lens surface) of the plane is perpendicular to a radial direction RAD of the optical disk 1 is extended at an angle θ of 45° to the tangent direction TAN, i.e., the track extension direction (hereinafter, simply referred to as the tangent direction). The extension direction of the central axis RL of the cylindrical lens of the astigmatic device 38 is the astigmatic direction.

Figure 4:
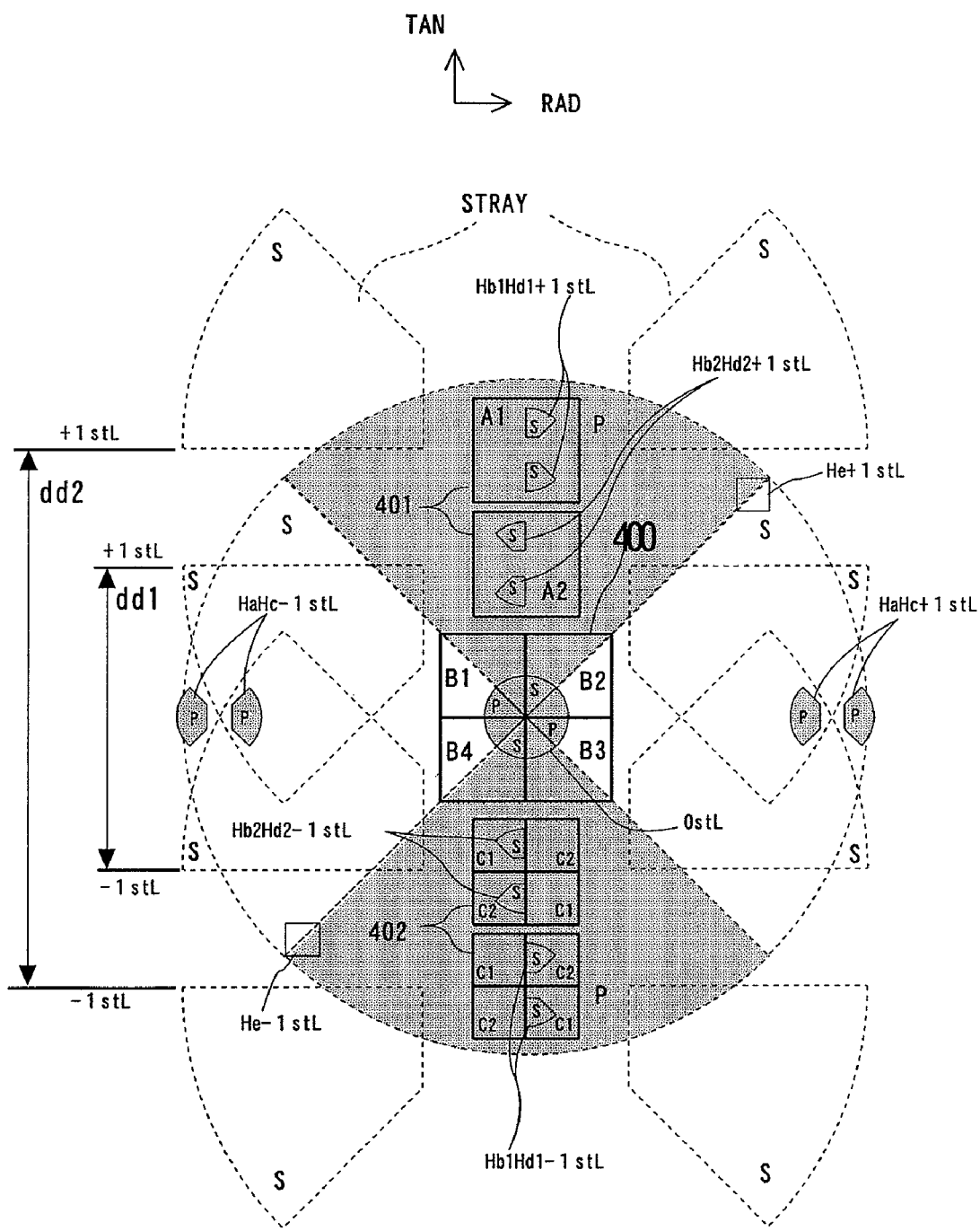
FIG. 4 is a typical plan view illustrating a transmission type hologram device, which is an astigmatic device, of the optical pickup device according to the first embodiment of the present invention.

FIG. 4 is a typical plan view illustrating a transmission type hologram device, which is an example of the astigmatic device 38. This transmission type hologram device is a diffraction optical device designed to function as the lens surface of the cylindrical lens. In the same manner as the cylindrical lens, the astigmatic device 38 of the transmission type hologram device has a central axis RL, which becomes the astigmatic direction, and this central axis becomes a ridgeline of the corresponding cylindrical lens or a rotational symmetry axis of a cylindrically curved surface forming a lens surface. The astigmatic device 38 of the transmission type hologram device is disposed perpendicular to the optical axis OAX of the returning light such that, on a plane perpendicular to the optical axis OAX of the returning light RLB, the central axis RL of the plane extends at an angle θ of 45° to the tangent direction TAN of the optical disk.

FIG. 5 is a typical plan view illustrating an example of the photo detector 40 (returning light RLB in an in-focus state). As shown in the drawing, the photo detector 40 includes a quadrant optical detection unit 400 on a plane perpendicular to the optical axis OAX of the returning light. The quadrant optical detection unit 400 includes four light receiving parts having the same area, i.e., first to fourth quadrant light receiving parts B1, B2, B3, and B4, which are disposed adjacent to one another while being separated from one another by two perpendicular division lines 400L and 400M as boundary lines. The division line 400L is parallel to the tangent direction TAN, and the intersection point between the division lines 400L and 400M is disposed to intersect the optical axis OAX of the returning light RLB. The respective light receiving parts are connected to a predetermined circuit (not shown). Photoelectric conversion outputs from the respective light receiving parts are calculated to create a focus error signal.

Figure 6:
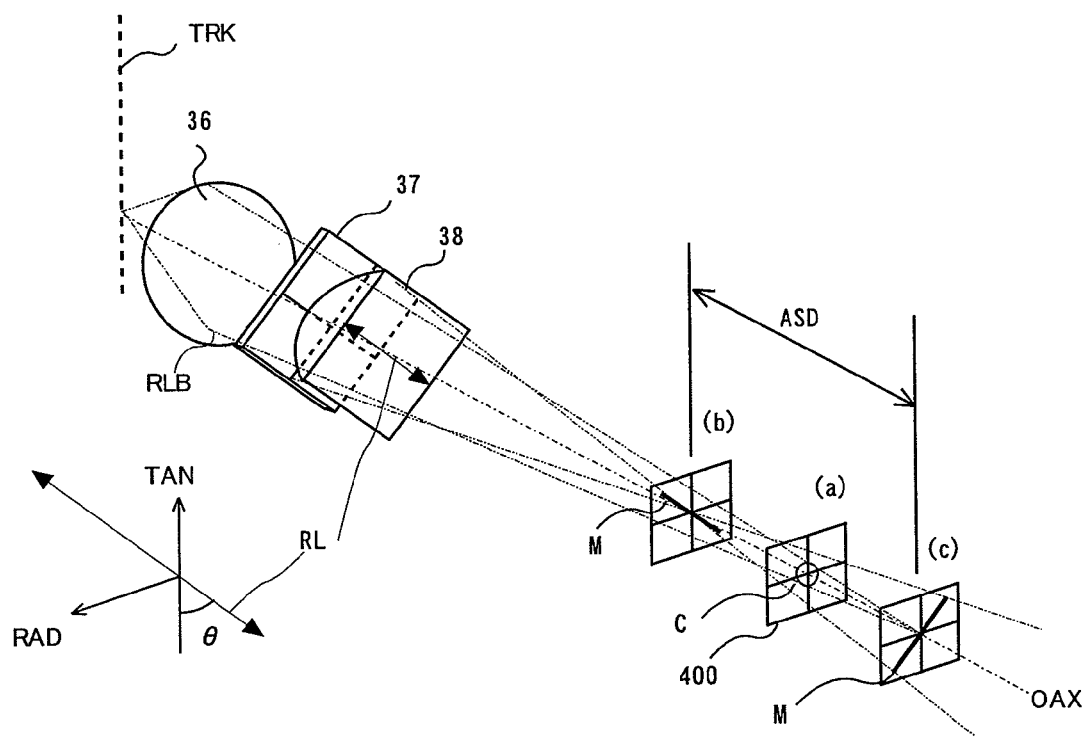
FIG. 6 is a schematic perspective view illustrating the principal part of an optical system, for focus servo by an astigmatic method, of the optical pickup device according to the first embodiment of the present invention.

FIG. 6 is a schematic perspective view illustrating the principal part of an optical system, for focus servo by an astigmatic method (A light source, a polarization beam splitter, etc. are omitted to clearly describe a detection system). In the astigmatic method, the whole optical system, including the object lens 36, the astigmatic device 38, the photo detector 40, is set such that a spot (a minimum scattering circle C, which will be described later) of the returning light RLB is formed around the center of the quadrant optical detection unit 400 when laser light is focused on the track TRK of the optical disk to form a light spot. The astigmatism is provided in the direction extending at an angle θ of approximately 45° to the division lines 400L and 400M of the optical detection unit 400 (FIG. 5). Consequently, when the focus state of the optical disk 1 is offset from an in-focus state, the shape of the condensed spot on the photo detector turns into an elliptical shape having a major axis extending at an angle of approximately 45° to the division line. According to the structure shown in FIG. 6, the astigmatic device 38 provides astigmatism to the returning light bound by the optical system including the object lens 36 to form a line image M and a minimum scattering circle C based on the distance between the optical disk and the object lens 36. In an in-focus state of the light flux, therefore, the detection optical system irradiates the minimum scattering circle C to the quadrant optical detection unit 400 as shown in FIG. 6(a). In a defocus state, on the other hand, the detection optical system irradiates the light spot of the line image (or the elliptical circle) extending in the direction diagonal to the light receiving parts to the quadrant optical detection unit 400 as shown in FIG. 6(b) or FIG. 6(c). The distance between the line images M of the condensed returning light, i.e., the astigmatic distance ASD, correspond to a capture range of a focus error signal of a so-called S-shaped characteristic curve.

FIG. 7 is a typical plan view illustrating a divisional wave plate device 37, which is an example of the division device used in this embodiment, when viewing from an incidence side of the divisional wave plate device. The divisional wave plate device 37 is constructed in a structure in which, on a plane perpendicular to the optical axis OAX of the returning light, half wave plate regions WR and transparent regions TW, which are obtained by uniformly quartering the light flux section of the returning light RLB about the optical axis in the shape of a fan, are alternately arranged around the optical axis. The half wave plate regions WR and the transparent regions TW perform polarizing operations such that polarized light components of the light flux of the transmitted returning light at the neighboring regions thereof are different from each other by an angle of 90°. That is, the divisional wave plate device 37 is divided into quarters by division lines 37M and 37L, such that the divisional wave plate device 37 includes four light-transmissive regions to make the polarized states to be different from each other at the neighboring regions thereof, and the polarized states of the partial light flux at supplementary angle positions, among the four regions, are different from each other by an angle of 90°, whereby the interference there between is prevented. In the divisional wave plate device 37, as shown in FIG. 7, the division line 37L extends at an angle θ of 45°, to the tangent direction of the optical disk, and intersects the optical axis of the returning light such that the half wave plate regions WR are disposed side by side in the tangent direction, and the transparent regions TW are disposed side by side in the radial direction. Consequently, the divisional wave plate device 37 has divisional regions divided by the division lines 37M and 37L extending in the astigmatic direction about the optical axis of the returning light, and the returning light having astigmatism is divided by the respective divisional regions along the optical axis to form a plurality of partial light fluxes which are different from each other at the neighboring regions thereof.

Figure 8:
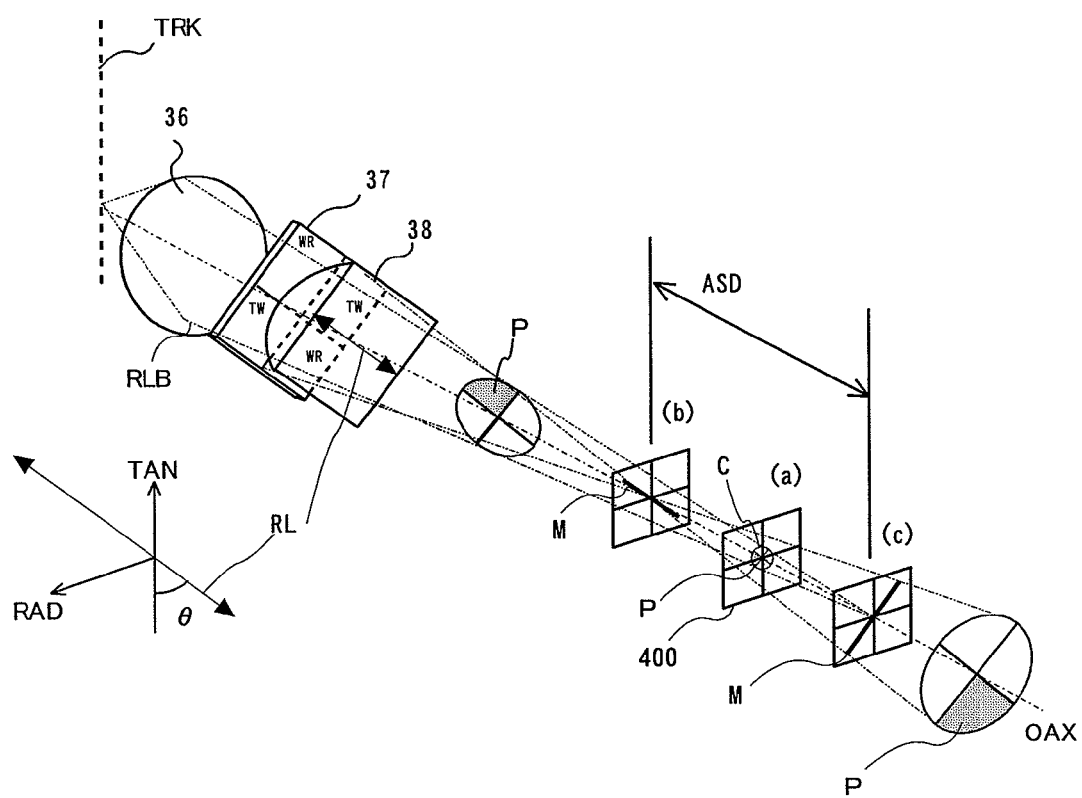
FIG. 8 is a schematic perspective view of a pickup detection system illustrating an in-focus state and a non-focus state in the optical pickup device according to the first embodiment of the present invention.
Figure 9:
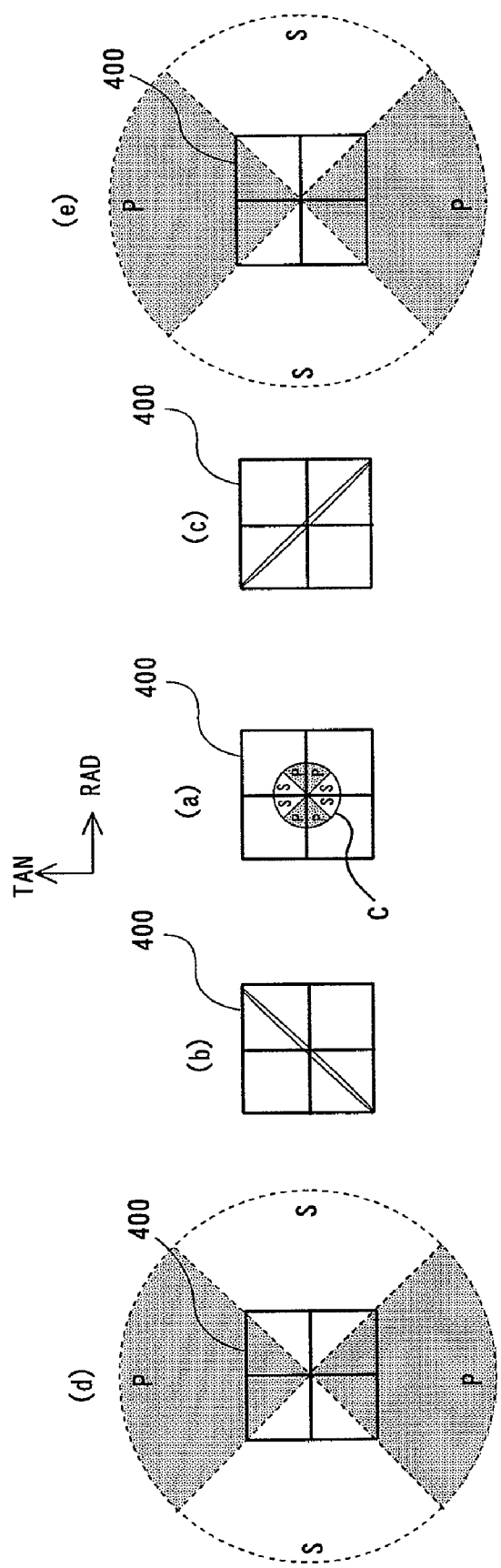
FIG. 9 is a schematic plan view of a quadrant photo detection unit illustrating an in-focus state and a non-focus state of the optical pickup device according to the first embodiment of the present invention.
Figure 10:
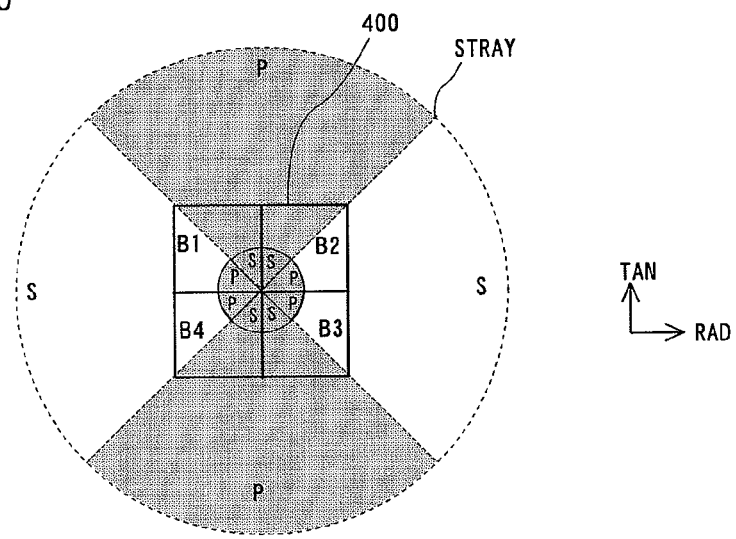
FIG. 10 is a schematic plan view of the quadrant optical detection unit illustrating an in-focus state of signal light in the optical pickup device according to the first embodiment of the present invention.

FIG. 8 is a schematic perspective view of a pickup detection system illustrating an in-focus state and a non-focus state in an embodiment in which the divisional wave plate device 37 is applied to focus servo control by an astigmatic method (A light source, a polarization beam splitter, etc. are omitted to clearly describe a detection system). FIG. 9 is a schematic plan view of a quadrant optical detection unit 400 illustrating an in-focus state and a non-focus state of the optical pickup device. FIG. 10 is a schematic plan view of the quadrant optical detection unit 400 illustrating an in-focus state of signal light, in particular, in the optical pickup device. In the astigmatic method, the division line 37L of the divisional wavelength plate device 37 and the ridgeline RL (the astigmatic direction) of the cylindrical lens of the astigmatic device 38 are parallel to each other, and, at the same time, the half wave plate regions WR and the transparent regions TW of the divisional wavelength plate device 37 and the respective first to fourth quadrant light receiving parts B1, B2, B3, and B4 are rotated around the common optical axis by an angle of 45°.

As shown in FIG. 8, when the returning light flux of the S polarized light incident on the divisional wavelength plate device 37 of the optical system including the object lens 36 passes through the half wavelength plate regions WR and the transparent regions TW, which are adjacent to each other, the polarized light components thereof become different from each other by an angle of 90°. The partial light flux RLB, which is divided in the polarized state, is transmitted through the astigmatic device 38, such that the astigmatism is provided in an angular direction of 45°, and passes through the line image M having an angle of 45°, such that a minimum scattering circle C is formed on the quadrant optical detection unit 400.

When the division line 37L of the divisional wavelength plate device 37 and the ridgeline RL of the cylindrical lens of the astigmatic device 38 are parallel to each other, the polarization direction at the in-focus position (the optical axis position of the minimum scattering circle C) becomes different by an angle of 90° from the polarization direction toward the optical disk from the line image M position. For example, the partial light flux P, which passes through the half wavelength plate regions WR of the divisional wavelength plate device 37 of FIG. 8 and thus becomes P polarized light, moves to the side symmetrical to the line image M (a meridional line image) about the position of the line image M, i.e., the side opposite to a plane including the division line 37L of the divisional wave plate device 37, the ridgeline RL of the cylindrical lens of the astigmatic device 38, and the optical axis. When deviating from a range of the astigmatic distance to the next line image M (a sagittal line image), the P polarized partial light flux P moves to the side symmetrical to the line image M about the position of the line image M (the sagittal line image), i.e., the side opposite to a plane including the division line 37M of the divisional wave plate device 37 and the optical axis. The movement of the partial light flux is equally applied to the S polarized partial light flux passing through the transparent regions TW of the divisional wave plate device 3.

Consequently, as shown in FIG. 9(a), in an in-focus state, the returning light RLB is condensed on the quadrant photo detection unit 400 in the shape of a minimum scattering circle C. When the optical disk becomes closer to the object lens 36 than in the in-focus state, as shown in FIG. 9(b), the returning light is condensed on a diagonal line of the quadrant optical detection unit 400 in the shape of a line image M. On the other hand, when the optical disk becomes more distant from the object lens 36 than in the in-focus state, as shown in FIG. 9(c), the returning light is condensed on another diagonal line of the quadrant optical detection unit 400 in the shape of a line image M.

Furthermore, when the distance between the optical disk and the object lens is further decreased and increased, as shown in FIGS. 9(d) and 9(e), the returning light spreads out on the quadrant optical detection unit 400 in the shape of a spreading ellipse. At the same time, light spot parts P and S on the quadrant optical detection unit 400, to which the P and S polarized partial light fluxes are irradiated, are changed inside the range of the astigmatic distance (FIGS. 9(a) to 9(c)) and outside the range of the astigmatic distance (FIGS. 9(d) and 9(e)). In the astigmatic method, the state of the light divided along the optical axis is changed inside and outside the range of the astigmatic distance.

As can be seen from FIGS. 8 and 9, when a multi layer optical disk is recorded and reproduced, the light (stray light STRAY) reflected from the recording layer other than the target recording layer to be reproduced is incident on the quadrant optical detection unit 400 along the same light path as described above although being reflected in a defocus state outside the range of the astigmatic distance (generally, more distant than in the line image state) in the astigmatic method.

Consequently, as shown in FIG. 10, in the in-focus state, the light flux of the reflected stray light STRAY is located at a position different from the focus of the object lens 36, with the result that the minimum scattering circle C is not formed on the quadrant optical detection unit 400, but is greatly defocused and irradiated. That is, the stray light overlaps with the light spot parts P and S of the minimum scattering circle C. In the light flux (the minimum scattering circle C) from the recording layer to be reproduced, however, its polarization direction in the optical spot parts P and S at every overlapped region is different from that of the stray light by an angle of 90°, even though being overlapped on the quadrant optical detection unit 400, and therefore, the interference therebetween does not occur.

As a result, in the pickup device according to this embodiment, noise caused due to the interference between the signal light and the stray light is not generated, and therefore, it is possible to obtain a good servo error signal and a good reproduction signal. For example, it is possible to obtain a focus error signal FE of the following equation FE=(B1+B3)−(B2+B4), a push pull tracking error signal PP of the following equation PP=(B1+B4)−(B2+B3), and an RF signal RF of the following equation RF=B1+B3+B2+B4, using the output signals B1, B2, B3, and B4 of the respective light receiving parts B1, B2, B3, and B4 of the quadrant optical detection unit 400.

Second Embodiment

Figure 11:
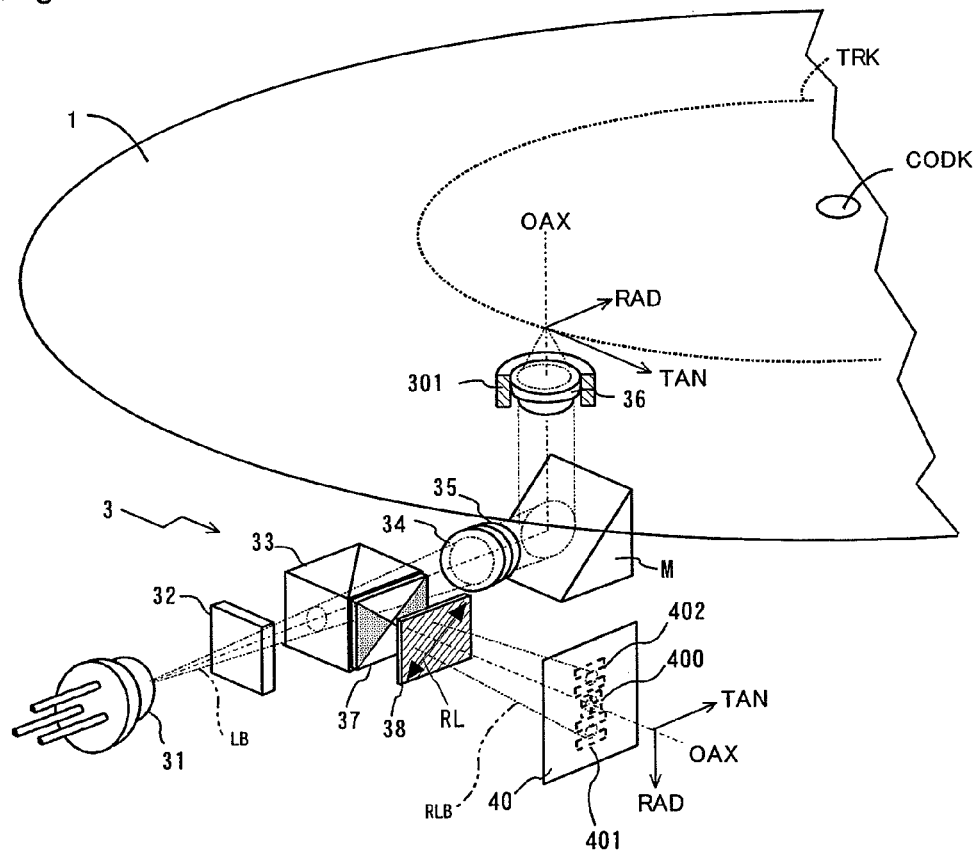
FIG. 11 is a schematic perspective view illustrating the structure of the principal part of an optical pickup device according to a second embodiment of the present invention.

FIG. 11 is a schematic perspective view illustrating the structure of the principal part of an optical pickup device according to a second embodiment of the present invention.

The optical pickup device 3 includes a semiconductor laser 31 as a light source, a sub beam creating diffraction grating 32, a polarization beam splitter 33, a collimator lens 34, a quarter wave plate 35, a start-up mirror M, an object lens 36, a divisional wave plate device 37, an astigmatic device 38 which is a transmissive hologram device, and an photo detector 40. An optical disk 1 is placed on a turntable (not shown) of a spindle motor at the center CODK thereof such that the optical disk 1 is spaced apart from the object lens 36 in the direction perpendicular to the disk surface (the optical axis direction). Also, the divisional wave plate device 37 of FIG. 11 is formed to correspond to the edge of the polarization beam splitter 33. However, only the external appearance of the divisional wave plate device 37 is changed, and the divisional wave plate device 37 has the same function as the divisional wave plate device 37 shown in FIG. 7.

This embodiment is almost identical in the construction to the first embodiment except the sub beam creating diffraction grating 32, the start-up mirror M, the astigmatic device 38, and the photo detector 40. Consequently, only the operations of the above-mentioned members will be described hereinafter.

As shown in FIG. 11, light beams LB emitted from the semiconductor laser 31 is incident on the polarization beam splitter 33 via the sub beam creating diffraction grating 32. The light flux, incident on the polarization beam splitter 33, passes through the polarization beam splitter 33, and then passes through the collimator lens 34. The optical path of the light flux is changed by a right angle by the mirror M. After that, the light flux passes through the quarter wave plate 35, and is then irradiated to an information recording surface of the optical disk 1 through the object lens 36. The sub beam creating diffraction grating 32 divides the light flux emitted from the semiconductor laser 31 into three bundles of light fluxes including zero-order diffracted light flux (main beam), +first-order diffracted light flux (sub beam), and first-order diffracted light flux (sub beam), which are transmitted through the object lens 36. Also, the three bundles of light fluxes are shown as one bundle of light flux in the drawing. In the irradiation optical system, the object lens 36 focuses the light flux on a bit array or a track TRK formed on the optical disk 1 in the shape of a spiral or a concentric circle to form a light spot (not shown) on the recording surface of the optical disk 1. The irradiation is carried out such that tracks are put between the spots of the two sub beams outside the spot of the main beam on the track, and are scanned while being merely suspended.

Also, a lens drive mechanism DM is installed in the pickup 3 such that the position of the object lens 36, which are movably supported to perform focus servo and tracking servo operations, can be controlled by the lens drive mechanism DM according to an electric signal calculated from the output of the photo detector 40.

The returning light reflected from the light spot on a target recording surface of the optical disk is incident on the polarization beam splitter 33 again via the optical axis OAX of the optical system, i.e., the object lens 36, the mirror M, the quarter wave plate 35, and the collimator lens 34, and is introduced into the photodetector via the divisional wave plate device 37 and the astigmatic device 38. The three bundles of the returning light transmitted through the astigmatic device 38 are given astigmatism and, at the same time, diffracted. Subsequently, the returning light is incident on a quadrant optical detection unit 400 for a main beam and sub photo detection units 401 and 402 for three beams, of the photo detector 40, as diffracted light.

Figure 12:
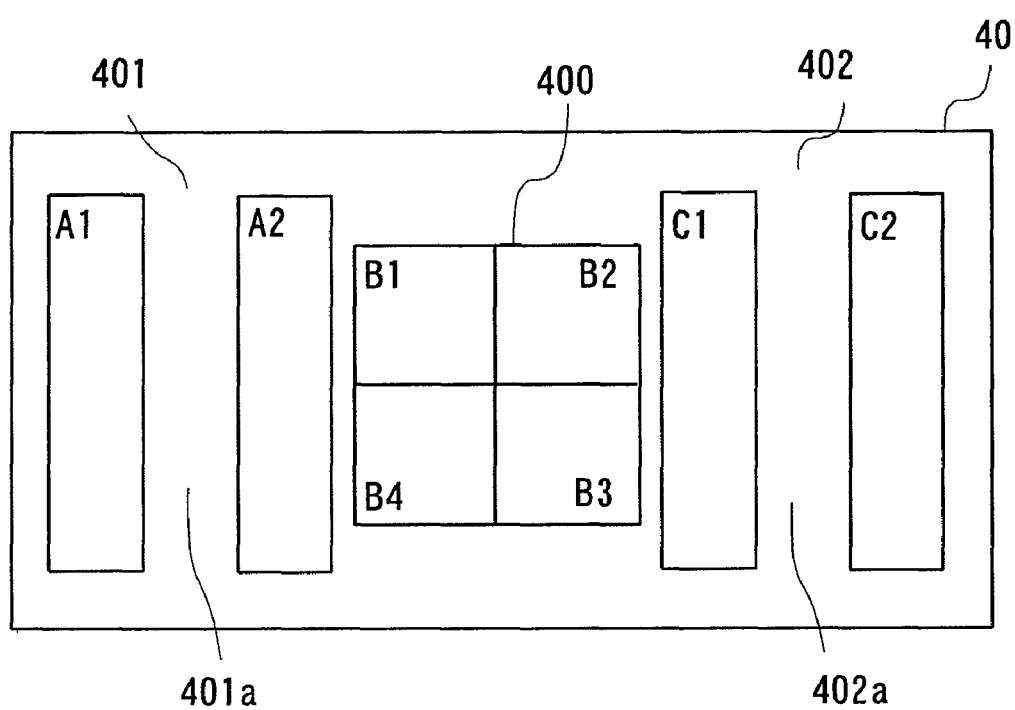
FIG. 12 is a typical plan view illustrating an photodetector of the optical pickup device according to the second embodiment of the present invention when viewing from an optical axis incidence side of the photo detector.

FIG. 12 is a typical plan view illustrating the photo detector 40 when viewing from an optical axis incidence side of the photo detector. The photo detector 40 includes the sub optical detection units 401 and 402 for three beams disposed side by side at opposite sides of the quadrant optical detection unit 400 in the radial direction to perform tracking servo by a three beam method. In the same manner as the first embodiment, the quadrant optical detection unit 400 includes four light receiving parts B1, B2, B3, and B4, having the same area, which are disposed adjacent to one another while being separated from one another by two perpendicular division lines 400L and 400M as boundary lines. One of the division lines is parallel to the tangent direction TAN. The sub optical detection unit 401; 402 for three beams includes two separated light receiving parts A1 and A2; C1 and C2 disposed adjacent to one another while a divisional region 401a; 402a extending approximately in parallel to the tangent direction is disposed between the two light receiving parts A1 and A2; C1 and C2. The light receiving parts are formed and disposed in a point symmetrical fashion with respect to the center of the quadrant optical detection unit 400 (the intersection point between the division lines). That is, the light receiving parts are symmetrical to straight lines extending from the centers thereof in the tangent direction TAN and the radial direction RAD.

Also, as shown in FIG. 13(a), the photo detector 40 is disposed such that, when the light flux is focused on the optical disk, the zero-order diffracted light becomes a main spot MB of the minimum scattering circle at the center of the quadrant optical detection unit 400, and the returning light fluxes (sub beams) corresponding to sub spots SB1 and SB2 are incident on the sub optical receiving units 401 and 402, respectively.

The sub optical receiving units 401 and 402 are divided in the push pull direction (the radial direction RAD) such that the sub optical receiving units 401 and 402 have divisional regions 401a and 402a at the middle thereof. The width of the divisional regions 401a and 402a is set to be greater than that of the light spot part P or S of the sub spots SB1 and SB2 to which the P or S polarization component light flux is irradiated. This is because its polarization state is the same as the light spot part P or S of the stray light STRAY, and therefore, it is necessary for the corresponding part not to be received.

As described above, the stray light STRAY is generated at the respective beams; however, the polarization of the stray light at the sub beams is changed by an angle of 90° in the same manner as the main beam, and therefore, the interference does not occur in the same manner as the first embodiment. The interference between the stray light STRAY of the main beam and the signal lights of the sub beams occurs as shown in FIG. 13(b) (The interference between the S polarized lights occurs in the drawing). However, the polarization directions are different from each other at the main diffraction circle from the track, and therefore, the interference does not occur (The interference between the S and P polarized lights does not occur in the drawing). The light receiving parts of the sub optical receiving units 401 and 402 are disposed only at the region where the interference does not occur, and therefore, noise due to the interference is not detected.

Also, the light receiving parts of the sub optical receiving units 401 and 402 have regions sufficient to detect push pull signals of the sub beams, and therefore, it is possible to use a tracking error creating method, such as a well-known differential push pull (DPP) method. In this case, for example, it is possible to obtain a focus error signal FE of the following equation FE=(B1+B3)−(B2+B4), a differential push pull tracking error signal DPP of the following equation DPP=((B1 +B4)−(B2+B3))−G×((A1+C1)−(A2+C2)), and an RF signal RF of the following equation RF=B1+B3+B2+B4, using the output signals B1, B2, B3, and B4 of the respective light receiving parts B1, B2, B3, and B4 of the quadrant optical detection unit 400 and the output signals A1, A2 and C1, C2 of the respective light receiving parts A1, A2 and C1, C2 of the sub optical detection units 401 and 402. In the equation, "G" indicates a differential coefficient.

According to this embodiment with the above-stated construction, in a system in which a plurality of partial light fluxes are divided to detect a focus error, it is possible to prevent the occurrence of the interference between two partial light fluxes by changing the polarization directions of the partial light fluxes such that the polarization directions of the partial light fluxes are different from each other, and therefore, it is possible to set the distance between the light receiving parts to be small. That is, the interference between the light reflected from the target recording layer and the light reflected from the other recording layer (the stray light) does not occur, and therefore, it is possible to stably perform focus servo without the influence of noise. Also, is not necessary to consider the size of the photo detector and the distance between the respective components of the photo detector, and therefore, it is possible to reduce the size of the photo detector. With the reduction in size of the photo detector, it is possible to achieve a wide band. Of course, since the size of the photo detector used to reproduce a multi-layer optical disk, it is possible to restrain the interlayer cross talk of the reproduction signal such that the interlayer cross talk is small.

In the conventional art, the signal light and the stray light are overlapped with each other on the photo detector using the light shading band. In this embodiment, however, the interference is prevented using the polarized light. Also, the conventional art is constructed such that the stray light is not incident on the photodetector. In this embodiment, however, although the stray light is incident on the photo detector, the optical operations at the respective divisional regions adjacent to each other are different from each other in the section of the returning light by the division device having the division lines formed along the ridgeline of the astigmatism, with the result that the reduction in amount of light is small. Consequently, the quality of the signal reproduced is not deteriorated.

Third Embodiment

Figure 14:
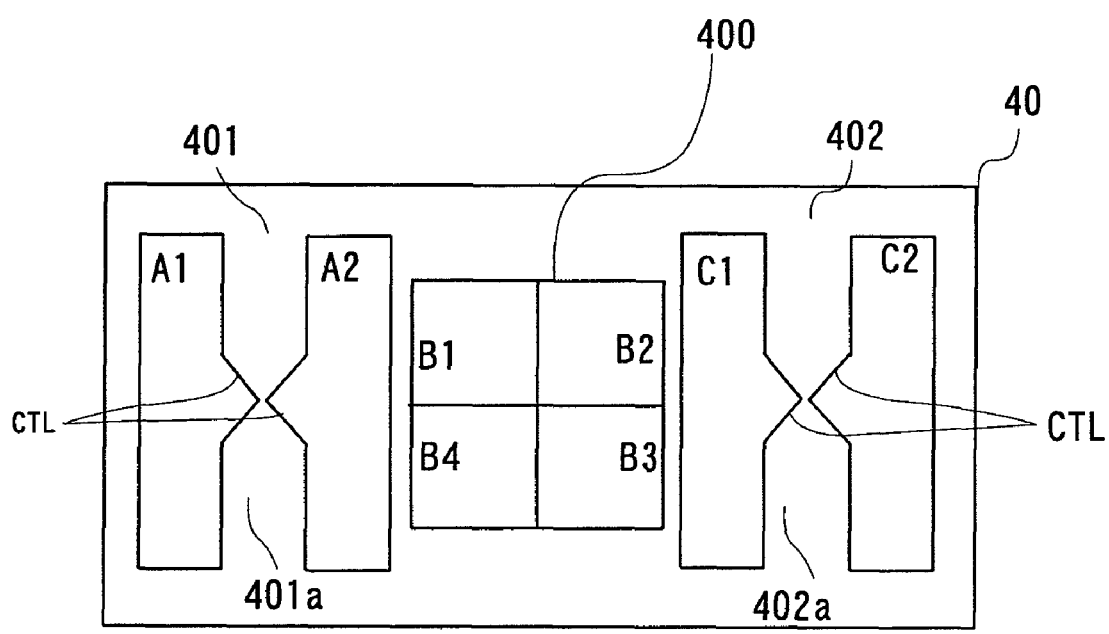
FIG. 14 is a typical plan view illustrating a photo detector of an optical pickup device according to a third embodiment of the present invention when viewing from an optical axis incidence side of the photo detector.

FIG. 14 illustrates a photo detector 40 of a pickup device according to a third embodiment of the present invention, which is identical in construction to that of the second embodiment except the change in shape of the light receiving parts of the sub optical detection units 401 and 402. The photo detector 40 is constructed such that a large number of tracking error signals (push pull signals) can be detected by the light receiving parts of the sub optical detection units 401 and 402.

Figure 15:
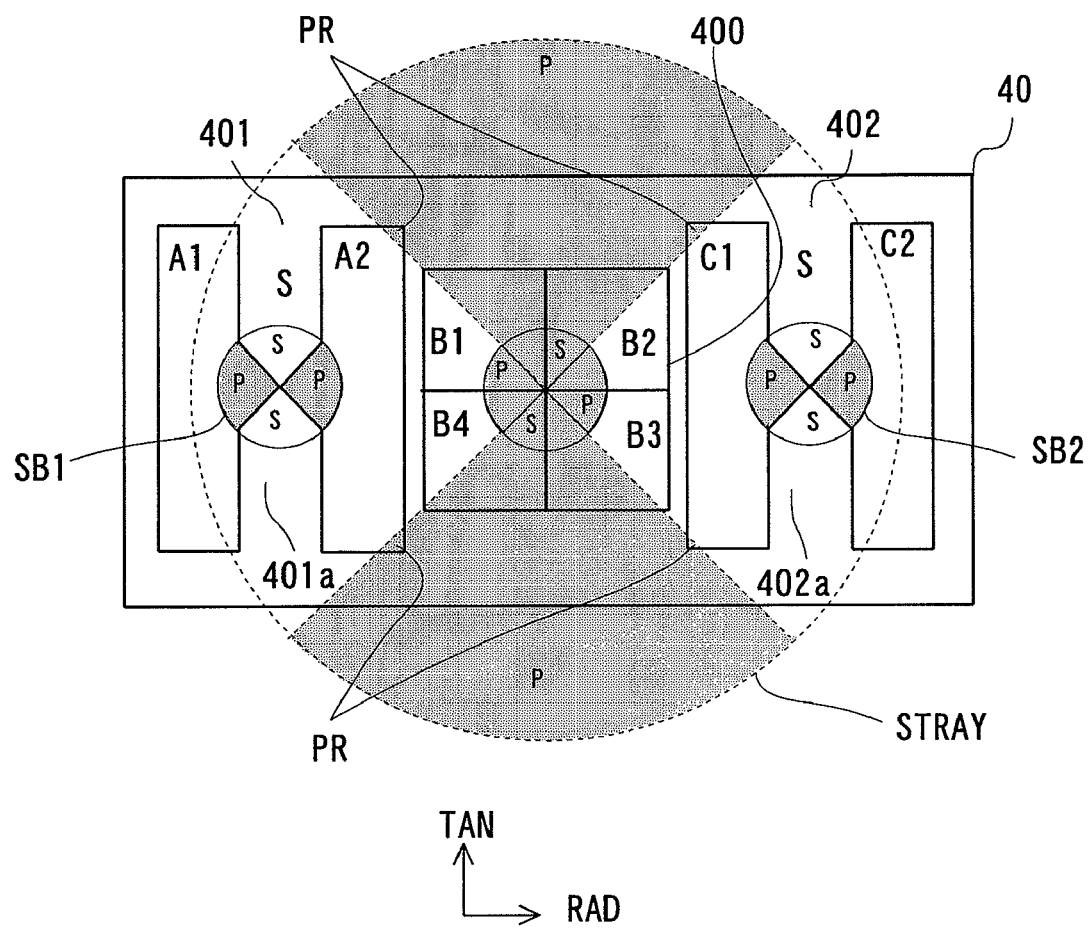
FIG. 15 is a typical plan view illustrating the photo detector of the optical pickup device according to the third embodiment of the present invention when viewing from the optical axis incidence side of the photo detector.

As shown in FIGS. 14 and 15, the shape of the light receiving parts of the sub optical detection units 401 and 402 is configured such that the light receiving parts are spread in the shape of a fan, i.e., the light receiving parts protrude toward the divisional regions 401a and 402a at the division lines 37M and 37L of the divisional wave plate device 37 of the division device and outlines CTL approximately coinciding with the intersection point between the division lines 37M and 37L (in the shape of a fan) on the sub spots SB1 and SB2 image-formed at the time of in-focus.

As shown in FIG. 15, the shape of the light receiving parts of the sub optical detection units 401 and 402 approximately coincide with the division lines 37M and 37L of the divisional wave plate device 37 (at the time of in-focus), and therefore, an S/N ratio of the tracking error signal is increased.

Figure 16:
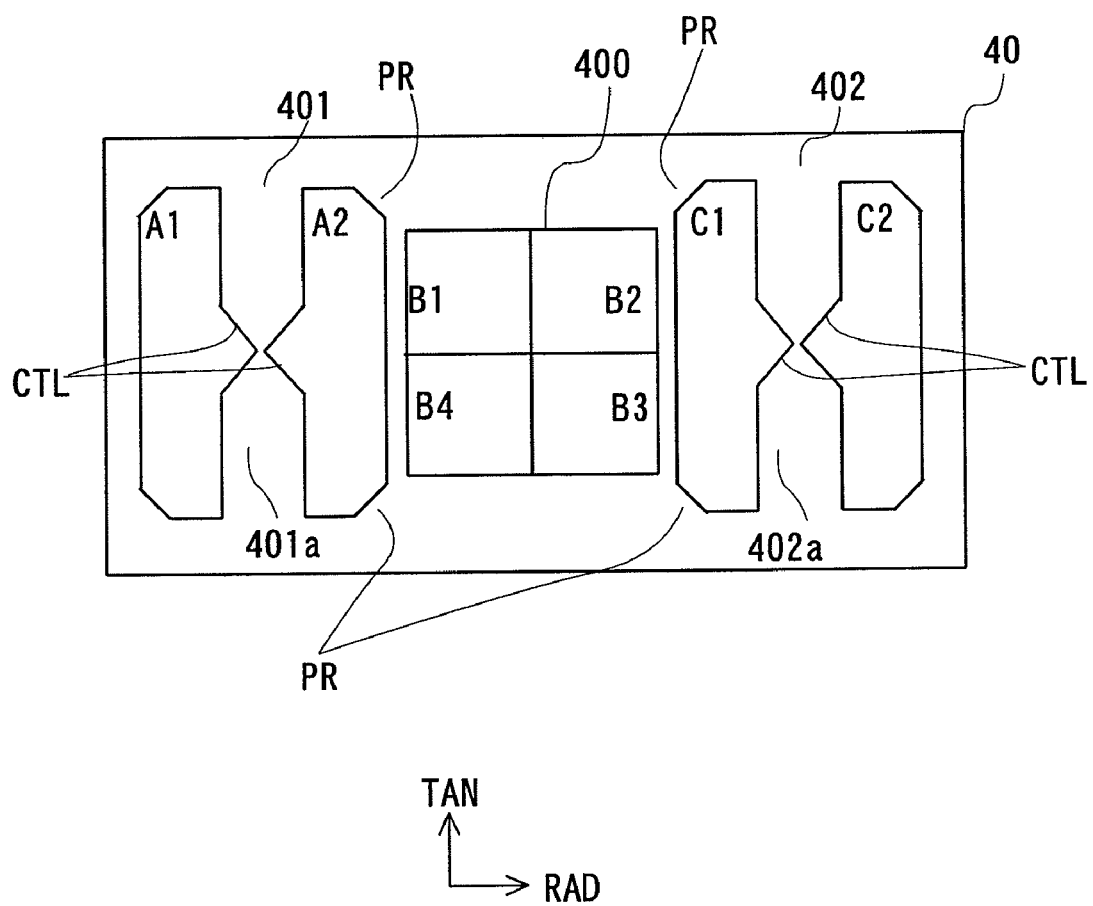
FIG. 16 is a typical plan view illustrating the photo detector of the optical pickup device according to the third embodiment of the present invention when viewing from the optical axis incidence side of the photo detector.
Figure 17:
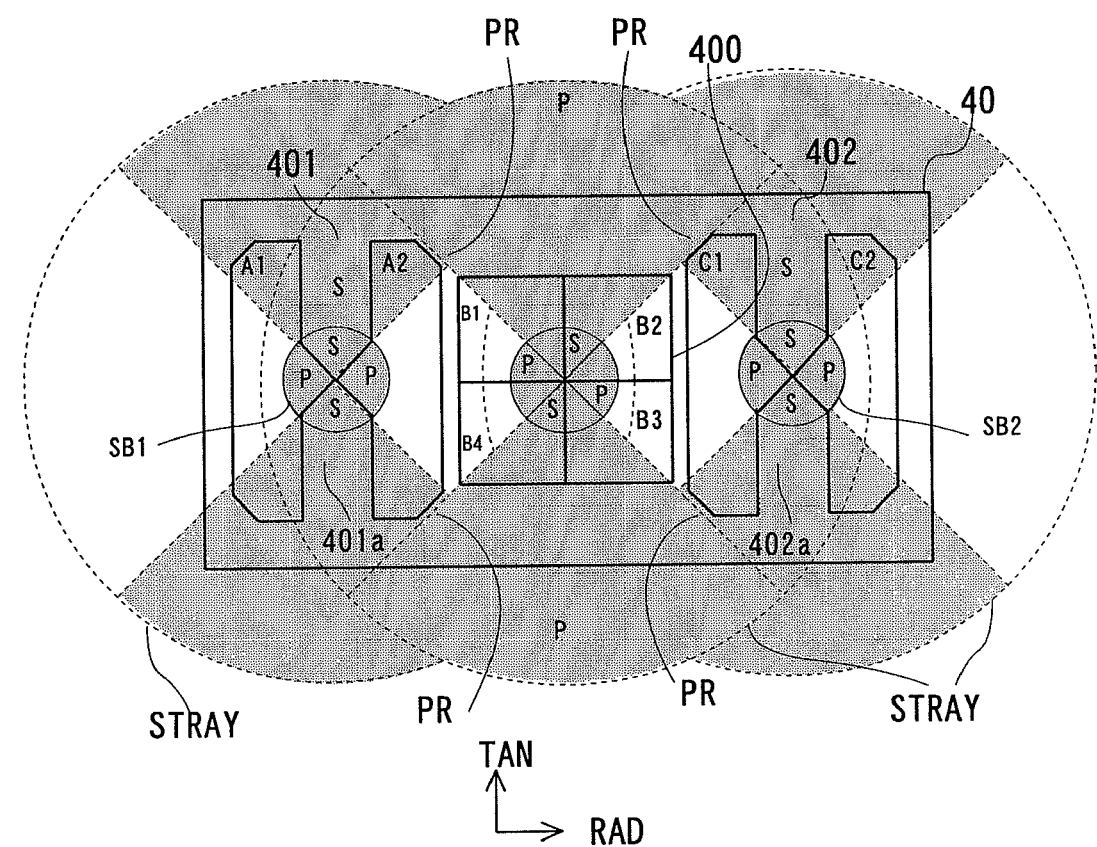
FIG. 17 is a typical plan view illustrating the photo detector of the optical pickup device according to the third embodiment of the present invention when viewing from the optical axis incidence side of the photo detector.

Also, reduced parts (parts PR illustrated in FIG. 15) are preferably formed at the outlines of the light receiving parts of the sub optical detection units 401 and 402 such that the outlines of the light receiving parts of the sub optical detection units 401 and 402 do not go over the image-forming extension lines of the division lines 37M and 37L of the main beam. Consequently, as shown in FIG. 16 and FIG. 17, when the areas of the reduced parts PR are reduced, and the areas of the light receiving parts of the sub optical detection units 401 and 402 are uniformly configured, the interference between the stray light STRAY of the sub beams and the stray light STRAY of the main beam does not occur on the light receiving parts of the sub optical detection units 401 and 402, and therefore, the generation of noise due to the interference is further decreased.

Although the light receiving parts to receive the sub beams are formed in a specific shape as in the above-described embodiment, light shading masks may be formed on the light receiving parts to achieve the same light receiving state as in the above-described embodiment.

Fourth Embodiment

In the pickup device according to the previous embodiment, the division device (the divisional wave plate device 37) has a plurality of divisional regions divided by the division lines extending in the astigmatic direction about the optical axis of the returning light, by which the returning light having astigmatism is divided into a plurality of partial light fluxes divided for the respective divisional regions along the optical axis of the returning light. Also ones of the divisional regions neighboring each other provide the partial light fluxes with an optical operation such that the partial light fluxes do not interfere with each other on the light receiving parts of the photo detector 40. In the pickup device according to the embodiment, this optical operation provides the polarizing operation which is different for the partial light fluxes on the photo detector 40 to the divisional wave plate device including the half wave plate regions WR and the transparent regions TW. However, the division device is not limited by the divisional wave plate device 37, and the optical operation of the division device and the polarizing operation to allow the partial light fluxes on the photo detector 40 to deviate from the optical axis and reach other positions may be included. Such an example will be described hereinafter as another embodiment of the present invention.

Figure 18:
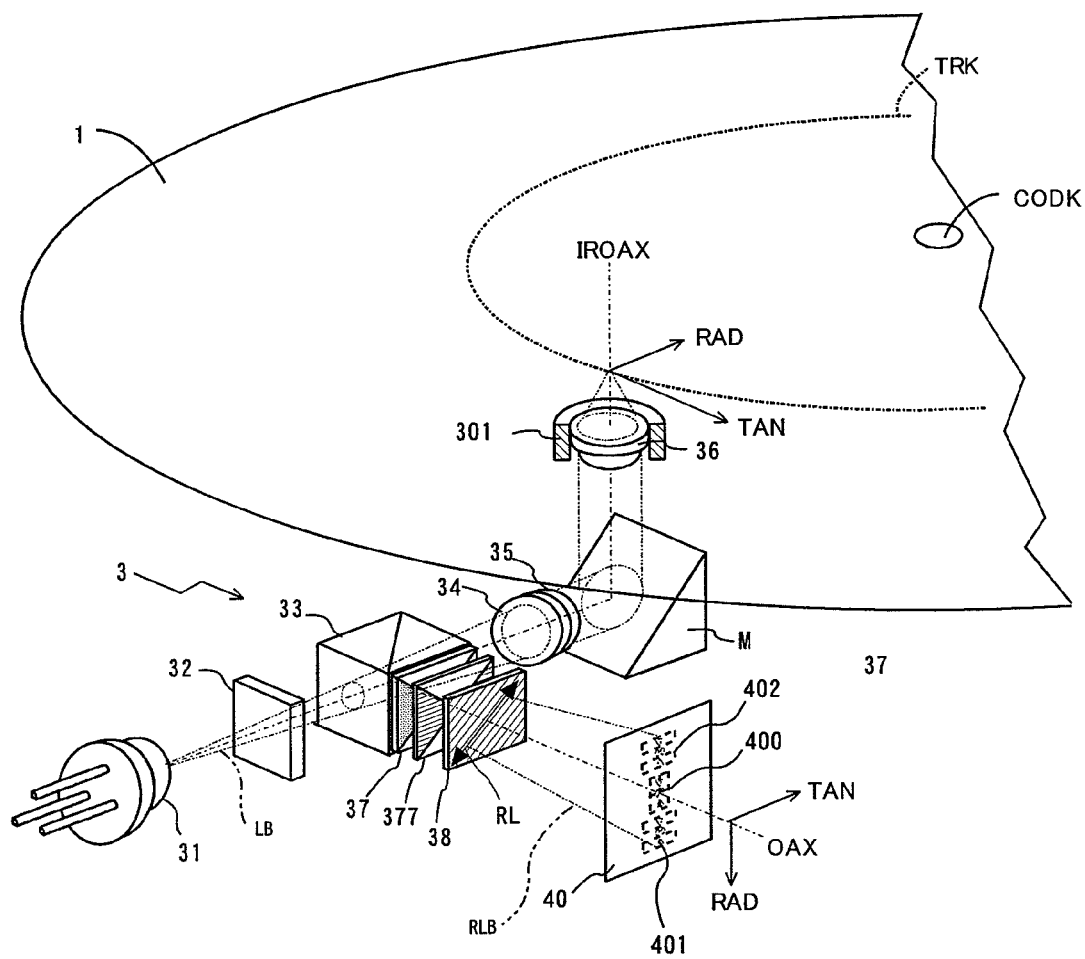
FIG. 18 is a schematic perspective view illustrating the structure of the principal part of an optical pickup device according to a fourth embodiment of the present invention.

The pickup device according to a fourth embodiment of the present invention shown in FIG. 18 is identical to the second embodiment (FIG. 11) except that a divisional deflection device 377 is added, and the structure of the photo detector 40 is changed. FIG. 18 is a schematic perspective view illustrating the structure of the principal part of an optical pickup device according to a fourth embodiment of the present invention.

In this embodiment, in addition to the divisional wave plate device 37 as the division device, the divisional deflection device 377 is coaxially disposed between the divisional wave plate device 37 and the astigmatic device 38. The divisional deflection device 377 primarily diffracts three bundles of returning light fluxes (the reflected light fluxes) passing through the divisional wave plate device 37 from the optical disk 1 in a plane approximately including the radial direction and the optical axis direction. The refracted light is incident on the photo detector 40 from the astigmatic device 38. Also, the three bundles of light fluxes are shown as one bundle of light flux in the drawing.

FIG. 19 is a typical plan view illustrating a divisional deflection device 377, which is an example of the division device, used in the fourth embodiment of the present invention. The divisional deflection device 377 is constructed in a structure in which four regions Ha, TWb, Hc, and TWd, obtained by approximately uniformly quartering the light flux section into the shape of a fan about the optical axis, are sequentially disposed around the optical axis on a plane perpendicular to the optical axis OAX of the returning light RLB. As shown in FIG. 19, the division lines 377L and 377M of the divisional deflection device 377 extend at an angle of 45° (the astigmatic direction) to the tangent direction of the optical disk, and the division lines 377L and 377M of the divisional deflection device 377 intersect each other at the optical axis OAX of the returning light such that the hologram regions Ha and Hc are located in the tangent direction and the light-transmissive regions TWb and TWd are located in the radial direction.

The two light-transmissive regions TWb and TWd, located at a pair of vertically opposite angle positions of the divisional deflection device 377, are formed as light-transmissive parallel plates widening from the intersection point (the optical axis) between the division lines 377L and 377M. Also, the two hologram regions Ha and Hc, located at another pair of vertically opposite angle positions of the divisional deflection device 377, are formed in a hologram pattern, and are designed on the basis of the equal point positions in the radial direction from the central point (the intersection point between the division lines 400L and 400M (FIG. 5)) of the quadrant optical detection unit 400 of the photo detector 40. The hologram regions Ha and Hc are formed in a blazed hologram, and are designed such that the transmitted lights are directed oppositely in the radial direction, i.e., the transmitted lights are deflected in the directions in which the transmitted lights are separated from each other.

The hologram regions Ha and Hc function to deflect P polarized light, and the light-transmissive regions TWb and TWd function to transmit the returning light (S polarized light) as it is. That is, the partial light fluxes located at the supplementary angle positions, among the four regions Ha, TWb, Hc, and TWd quartered by the two division lines 377M and 377L, do not interfere with each other by the provision of the divisional deflection device 377.

Figure 20:
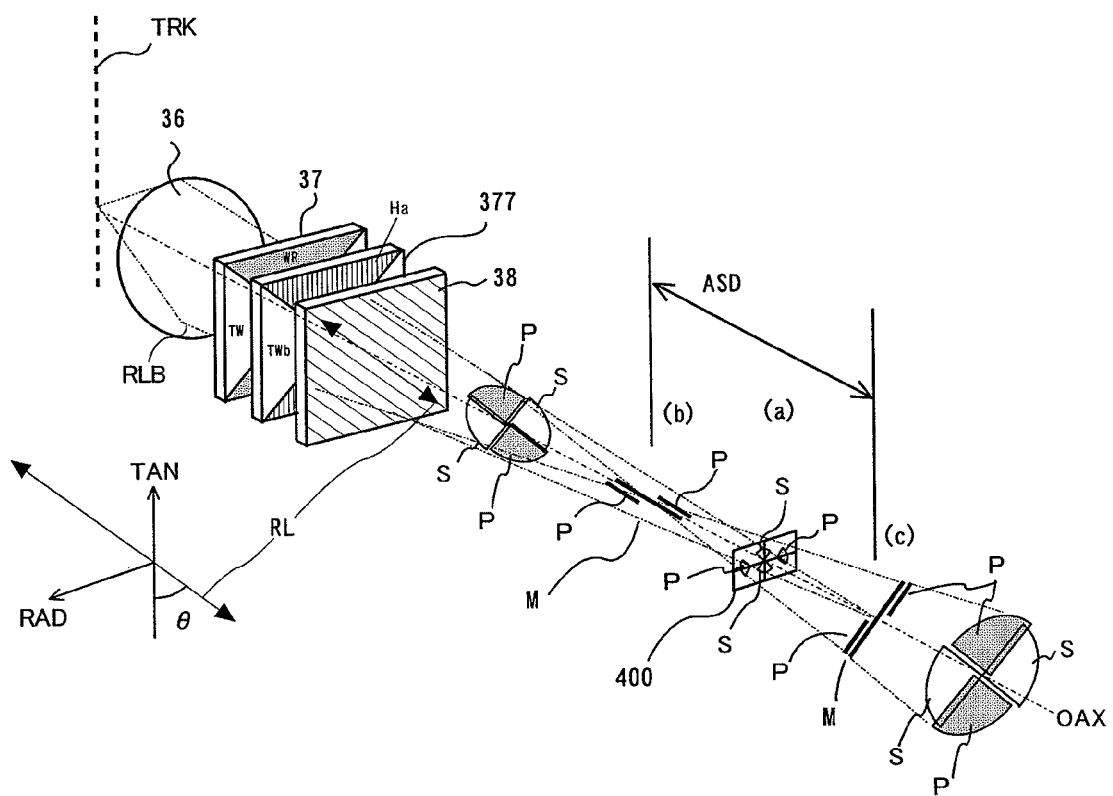
FIG. 20 is a schematic perspective view of a detection system illustrating a condensed state of returning light in the optical pickup device according to the fourth embodiment of the present invention.

FIG. 20 is a schematic perspective view of a detection system illustrating a condensed state (an in-focus state and a non-focus state) of the returning light RLB in the pickup device shown in FIG. 18 (A light source, a polarization beam splitter, and a photo detector except a quadrant optical detection unit 400 are omitted to clearly describe the detection system, as in FIG. 6). FIGS. 21(a) to 21(e) are schematic plan views illustrating various states of the quadrant optical detection unit 400 to explain an in-focus state and a non-focus state of the pickup device. FIG. 22 is a schematic plan view of the quadrant optical detection unit 400 illustrating an in-focus state of signal light particularly in the pickup device.

The returning light RLB, passing through a divisional wave plate device 37 of an optical system including an object lens 36 shown in FIG. 20, is divided into partial light fluxes of which the polarized light components are different from each other by an angle of 90°. The partial light fluxes divided according to the polarized state are further spatially divided by the divisional deflection device 377. The P polarized partial light flux P, passing through the half wave plate regions WR of the divisional wave plate device 37, is diffracted by the hologram regions Ha and Hc of the divisional deflection device 377, and the S polarized partial light flux, passing through the transparent regions TW of the divisional wave plate device 37, is transmitted through the light-transmissive regions TWb and TWd of the divisional deflection device 377 without diffraction. Subsequently, the respective partial light fluxes pass through the astigmatic device 38, by which the respective partial light fluxes are given astigmatism having an angular direction of 45°, and fan-shaped spots of the returning light RLB in a state in which the minimum scattering circle is divided are formed on the quadrant optical detection unit 400 through the line image M having an angle of 45°. For example, when deviating from a range of the astigmatic distance to the next line image M (a sagittal line image), the P polarized partial light flux P moves to the side symmetrical to the line image M about the line image. The movement of the P polarized partial light flux is the same as the previous embodiment. Also, the S polarized partial light flux, passing through the transparent regions TW (S polarization) of the divisional wave plate device 37 moves around the optical axis in the same manner.

That is, when the main beam is focused on the track TRK of the optical disk 1 of FIG. 20 (at the time of in-focus), as shown in FIGS. 20(a) and 21(a), the condensed spot Ta of FIG. 22 spreads in the shape of a fan about a point distant from the central point on the division line 400M to be a quarter circle put between the light receiving parts B2 and B3, the condensed spot Tc of FIG. 22 spreads in the shape of a fan about a symmetrical point of the central on the division line 400M to be a quarter circle put between the light receiving parts B1 and B4, the condensed spot Tb of FIG. 22 spreads in the shape of a fan from the central point to be a quarter circle put between the light receiving parts B1 and B2, and the condensed spot Td of FIG. 22 spreads in the shape of a fan from the central point to be a quarter circle put between the light receiving parts B3 and B4. In this way, in the in-focus state, the returning light is condensed as the divided minimum scattering circle on the quadrant optical detection unit 400.

When the optical disk 1 becomes closer to the object lens 36 than in the in-focus state, as shown in FIGS. 20(b) and 21(b), the returning light is condensed on a diagonal line of the quadrant optical detection unit 400 in the shape of the three line images M parallel to the diagonal line. On the other hand, when the optical disk 1 becomes more distant from the object lens 36 than in the in-focus state, as shown in FIGS. 20(c) and 21(c), the returning light is condensed on another diagonal line of the quadrant optical detection unit 400 in the shape of the three line images M parallel to the diagonal line.

Furthermore, when the distance between the optical disk and the object lens is further decreased and increased, as shown in FIGS. 21(d) and 21(e), the returning light spreads out on the quadrant optical detection unit 400 in the shape of a spreading and divided ellipse. At the same time, light spot parts P and S on the quadrant optical detection unit 400, to which the P and S polarized partial light fluxes are irradiated, are changed inside the range of the astigmatic distance (FIGS. 21(a) to 21(c)) and outside the range of the astigmatic distance (FIGS. 21(d) and 21(e)). In the astigmatic method, the state of the light divided along the optical axis is changed inside and outside the range of the astigmatic distance.

That is, the P polarized partial light fluxes, diffracted at the hologram regions Ha and Hc of the divisional deflection device 377 shown in FIG. 19, are condensed on positions distant from each other in the radial direction of the quadrant optical detection unit 400, i.e., positions displaced in opposite directions, as condensed spots Ta and Tc, respectively, in the in-focus state, as shown in FIG. 22. On the other hand, the S polarized partial light fluxes, transmitted through the light-transmissive regions TWb and TWd, are condensed on positions opposite to each other about the central point of the quadrant optical detection unit 400 as condensed spots Tb and Td, respectively. Also, one of the sub beams, divided at the quadrant hologram surface regions Ha, TWb, Hc, and TWd of the divisional deflection device 377 shown in FIG. 19, is condensed on the sub optical detection unit 401 as condensed spots Qa, Qb, Qc, and Qd, respectively, as shown in FIG. 22. The other sub beam, diffracted at the regions Ha, TWb, Hc, and TWd, is condensed on the sub optical detection unit 402 as condensed spots Ra, Rb, Rc, and Rd, respectively. However, the sub beam of the S polarized light is condensed on the divisional regions 401a and 402a, which are non-sensitive bands, as condensed spots Qb, Qd, Rb, and Rd.

Figure 21:
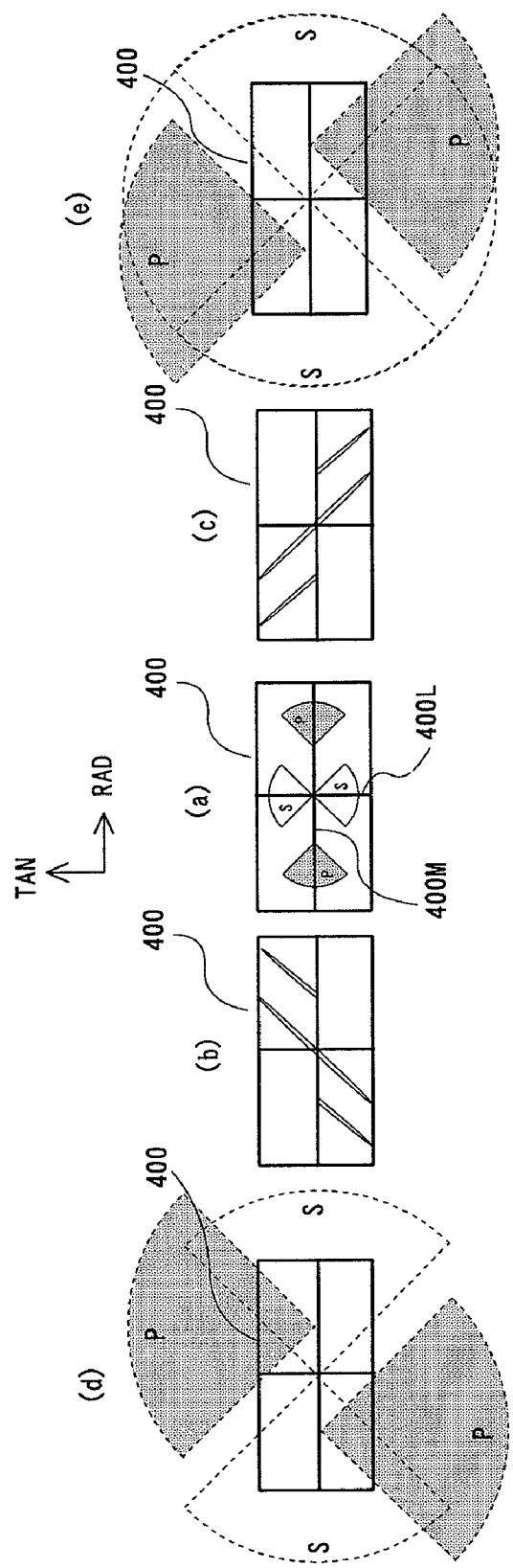
FIG. 21 is a schematic plan view of a quadrant photo detection unit illustrating an in-focus state and a non-focus state of the optical pickup device according to the fourth embodiment of the present invention.
Figure 22:
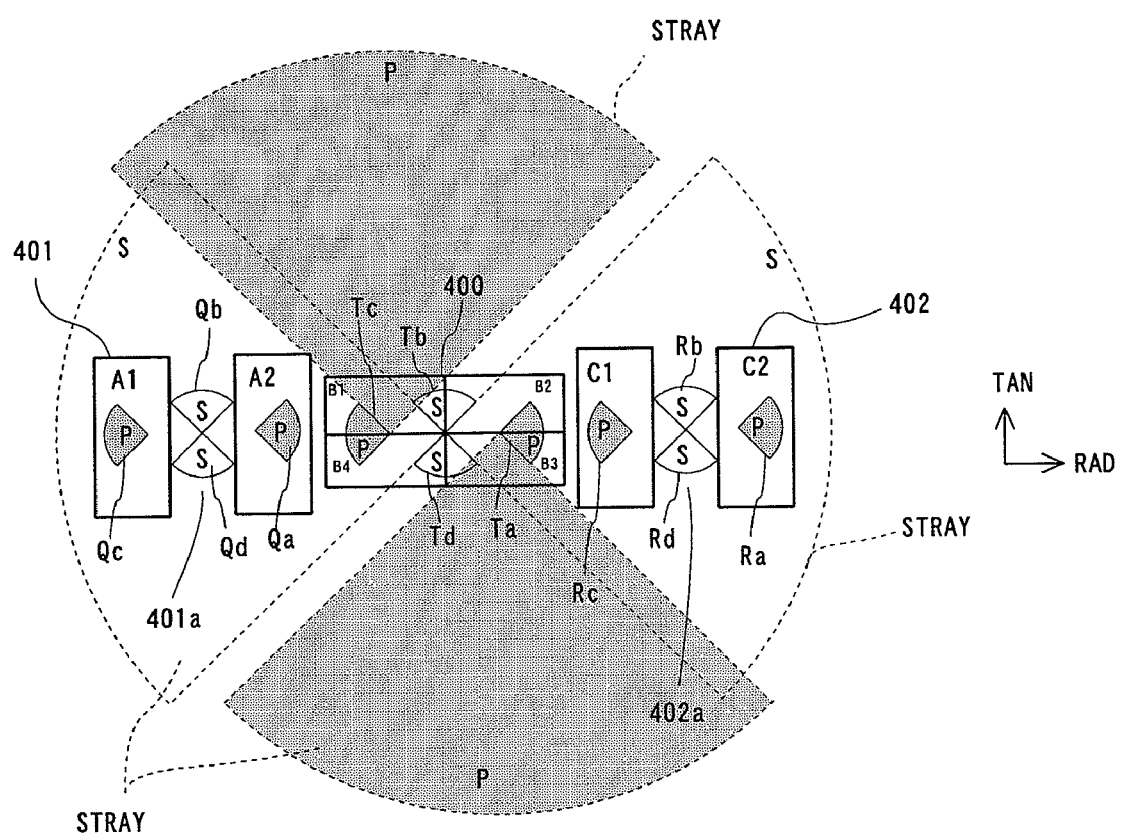
FIG. 22 is a schematic plan view of the quadrant photo detection unit illustrating an in-focus state of signal light in the optical pickup device according to the fourth embodiment of the present invention.

As can be seen from FIGS. 20 to 22, when a multi layer optical disk is recorded and reproduced, the light (stray light STRAY) reflected from the recording layer other than the target recording layer to be reproduced is incident on the quadrant optical detection unit 400 along the same light path as described above although being reflected in a defocus state outside the range of the astigmatic distance (generally, more distant than in the line image state) in the astigmatic method.

Consequently, as shown in FIG. 22, in the in-focus state, the light flux of the reflected stray light STRAY is located at a position different from the focus of the object lens 36, with the result that the divided minimum scattering circle is not formed on the quadrant optical detection unit 400, but is greatly defocused, divided, and irradiated. That is, the stray light does not overlap with the light spot parts P and S of the divided minimum scattering circle. Also, in the light flux returning from the recording layer to be reproduced, its polarization direction in the optical spot parts P and S at every overlapped region is different from that of the stray light by an angle of 90°, even though being overlapped on the quadrant optical detection unit 400, and therefore, the interference therebetween does not occur. Also, in this embodiment, the division lines of the divisional wave plate device 37 are set to be parallel to the astigmatic direction (an angle of 45° to the tangent direction) of the astigmatic device 38, and the half wave plate regions WR are disposed side by side in the tangent direction while the transparent regions TW are disposed side by side in the radial direction. In the same manner, the division lines of the divisional deflection device 377 are set to be parallel to each other, and the hologram regions Ha and Hc of the divisional deflection device 377 are located in the tangent direction while the light-transmissive regions TWb and TWd are located in the radial direction. However, even when the division lines are set not to be parallel to the astigmatic direction of the astigmatic device 38 but to be symmetrical about the center (the optical axis) thereof in the tangent direction, such that the respective regions are formed in symmetrical fashion in the tangent direction and in the radial direction, it is possible to dispose the respective optical detection units of the photo detector with some degree of freedom, and therefore, it is possible to prevent the interference between the stray light and the signal light.

In this embodiment, astigmatism corresponding to the focus state is given to the returning light flux, deflected at and transmitted through the divisional deflection device 377, as in the previous embodiment, and therefore, it is possible to detect the focus state of the optical disk 1 by calculating output signals from the respective light receiving parts of the quadrant optical detection unit 400 and the sub optical detection units 401 and 402 of the photo detector. As a result, in the pickup device according to this embodiment, noise caused due to the interference between the signal light and the stray light is not generated, and therefore, it is possible to obtain a good servo error signal and a good reproduction signal. In the same manner as the previous embodiment, it is possible to obtain a focus error signal FE of the following equation FE=(B1+B3)−(B2+B4), a differential push pull tracking error signal DPP of the following equation DPP=((B1+B4)−(B2+B3))−G×((A1+C1)−(A2+C2)), and an RF signal RF of the following equation RF=B1+B3+B2+B4, using the output signals B1, B2, B3, and B4 of the respective light receiving parts B1, B2, B3, B4, B5, and B6 of the optical detection unit and the output signals A1, A2 and C1, C2 of the respective light receiving parts A1, A2 and C1, C2 of the sub optical detection units, shown in FIG. 22. In the equation, "G" indicates a differential coefficient.

According to this embodiment, the polarization direction of the polarized light flux of the returning light and the polarization direction of the non-polarized light flux are different from each other by the divisional deflection device 377, and therefore, the interference there between does not occur. It is possible to exclude the S polarization component without the sub optical detection units 401 and 402 being formed into a specific shape.

Fifth Embodiment

Figure 23:
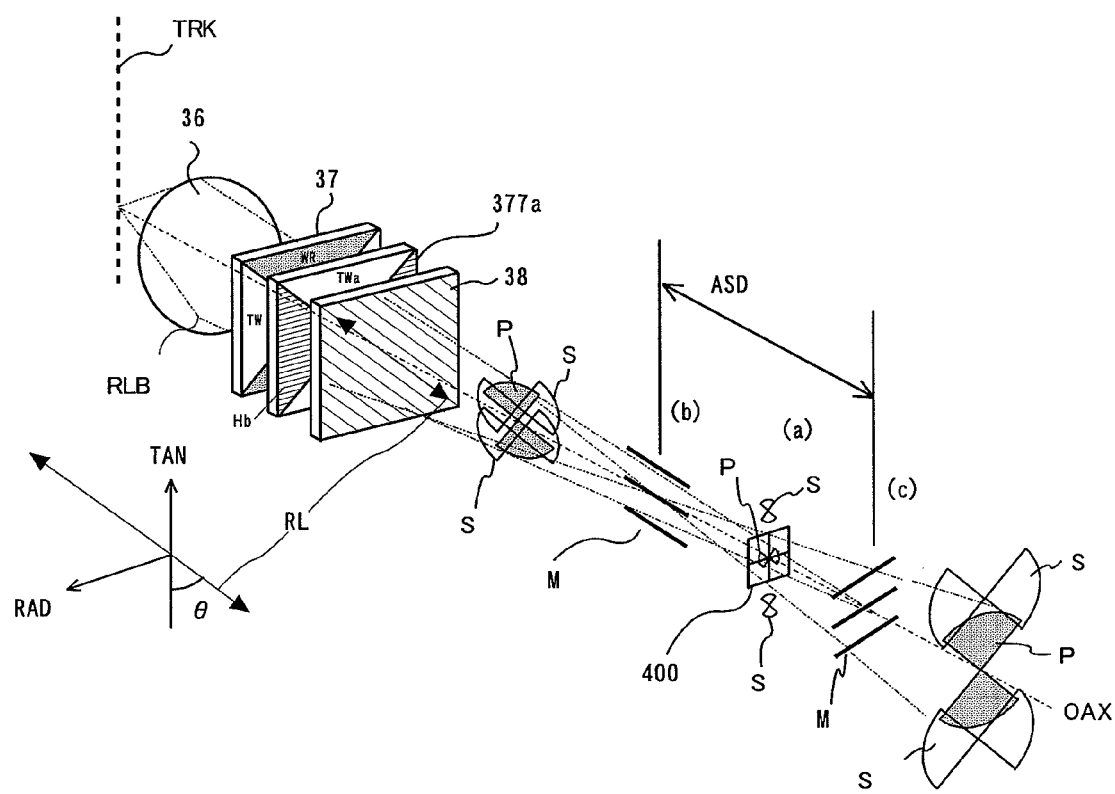
FIG. 23 is a schematic perspective view illustrating the structure of the principal part of an optical pickup device according to a fifth embodiment of the present invention.

A pickup device according to a fifth embodiment of the present invention is identical in construction to that of the fourth embodiment (FIG. 18) except that the deflection direction of the divisional deflection device is changed, and the structure of the photo detector 40 is changed. The principal part of a modification of the fourth embodiment is illustrated in FIG. 23. According to this modification, the polarization direction of the polarized light flux and the polarization direction of the non-polarized light flux are different from each other, and therefore, the interference therebetween does not occur. As a result, it is possible to dispose the light receiving parts to receive the polarized light flux such that the light receiving parts are adjacent to each other, and therefore, it is possible to reduce the size of the light receiving parts.

FIG. 23 is a schematic perspective view of a detection system illustrating a condensed state (an in-focus state and a non-focus state) of the returning light RLB (A light source, a polarization beam splitter, and a photo detector except a quadrant optical detection unit 400 are omitted to clearly describe the detection system).

FIG. 24 is a typical plan view illustrating a divisional deflection device 377a, the deflection direction of which is changed. The divisional deflection device 377a is identical to the fourth embodiment (FIG. 19) except that the arrangement of four regions obtained by uniformly quartering the light flux section of the returning light RLB about the optical axis in the shape of a fan on a plane perpendicular to the optical axis OAX of the returning light RLB is different from that of the fourth embodiment.

In the regions quartered by the division lines 377L and 377M of FIG. 24, light-transmissive regions TWa and TWc, formed as light-transmissive parallel plates, are disposed side by side in the tangent direction while the optical axis is put between the light-transmissive regions TWa and TWc, and hologram regions Hb and Hd are disposed side by side in the radial direction while the optical axis is put between the hologram regions Hb and Hd. The function of the light-transmissive regions TWa and TWc is identical to that of the previous embodiment. That is, the light-transmissive regions TWa and TWc function to transmit the returning light RLB (S polarized light) as it is. The hologram regions Hb and Hd are designed such that the condensed spots are diffracted in bi-directions in the tangent direction such that the condensed spots are deflected by a predetermined distance in the tangent direction from the central point of the quadrant optical detection unit 400. Alternatively, the hologram regions Hb and Hd may be formed in a blazed hologram such that the diffraction is achieved not in bi-directions but in one direction in the tangent direction.

Figure 25:
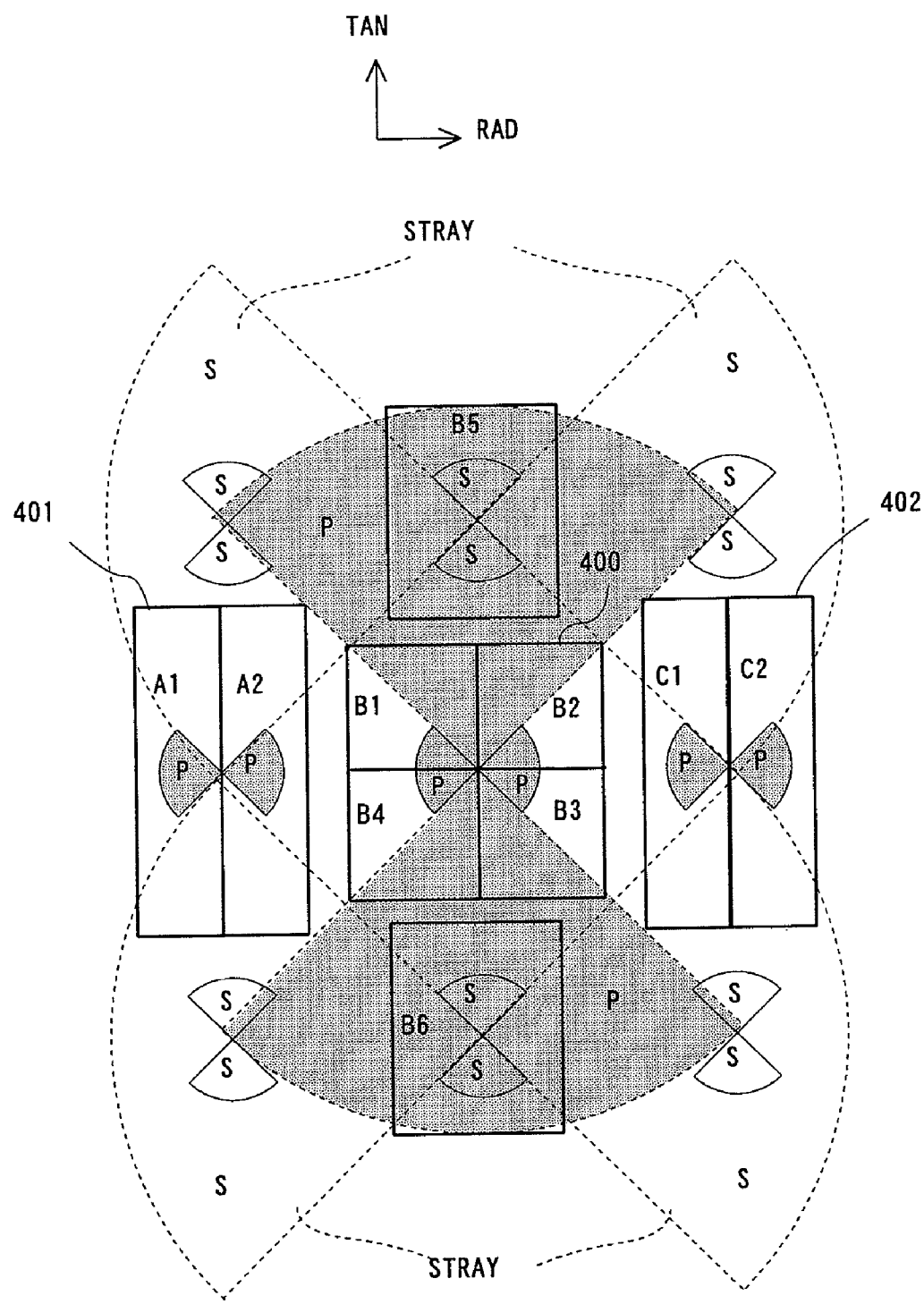
FIG. 25 is a typical plan view illustrating the structure of a photo detector of the optical pickup device according to the fifth embodiment of the present invention.

FIG. 25 is a typical plan view illustrating the structure of a photodetector 40. The photo detector 40 includes a quadrant optical detection unit 400 disposed at the central part thereof to perform focus servo by an astigmatic method, and sub optical detection units 401 and 402 for three beams disposed side by side at opposite sides of the quadrant optical detection unit 400 in the radial direction to perform tracking servo by a three beam method. The sub optical detection unit 401; 402 includes two separated light receiving parts A1 and A2; C1 and C2. However, a divisional region 401a; 402a, having a large width, extending approximately in parallel to the tangent direction of the sub optical detection unit is not provided. In the photo detector 40, tangent-direction sub optical detection units B5 and B6, having the same area, to receive S polarized partial light flux diffracted and deflected from the light-transmissive regions TWa and TWc to the hologram regions Hb and Hd are disposed at positions (on the extension lines of the division lines in the tangent direction) symmetric with respect to the central point of the quadrant optical detection unit 400.

The returning light RLB, passing through a divisional wave plate device 37 of an optical system including an object lens 36 shown in FIG. 23, is divided into partial light fluxes of which the polarized light components are different from each other by an angle of 90°. The partial light fluxes divided according to the polarized state are further spatially divided by the divisional deflection device 377. The P polarized partial light flux P, passing through the half wave plate regions WR of the divisional wave plate device 37, is diffracted by the hologram regions Hb and Hd of the divisional deflection device 377a, and the S polarized partial light flux, passing through the transparent regions TW of the divisional wave plate device 37, is transmitted through the light-transmissive regions TWa and TWc of the divisional deflection device 377a without diffraction. Subsequently, the respective partial light fluxes pass through the astigmatic device 38, by which the respective partial light fluxes are given astigmatism having an angular direction of 45°, and fan-shaped spots of the returning light RLB in a state in which the minimum scattering circle is divided are formed on the quadrant optical detection unit 400 through the line image M having an angle of 45°. For example, when deviating from a range of the astigmatic distance to the next line image M (a sagittal line image), the P polarized partial light flux P moves to the side symmetrical to the line image M about the line image. The movement of the P polarized partial light flux is the same as the previous embodiment. Also, the S polarized partial light flux, passing through the transparent regions TW of the divisional wave plate device 37 moves around the optical axis in the same manner.

That is, when the main beam is focused on the optical disk 1 (at the time of in-focus), for example, as shown in FIG. 25, the returning light RLB is condensed as the fan shape of the divided minimum scattering circle on the quadrant optical detection unit 400.

In this embodiment, astigmatism corresponding to the focus state is given to the returning light flux, deflected at and transmitted through the divisional deflection device 377a, as in the previous embodiment, and therefore, it is possible to detect the focus state of the optical disk 1 by calculating output signals from the respective light receiving parts of the quadrant optical detection unit 400 and the sub optical detection units 401 and 402 of the photo detector. As a result, in the pickup device according to this embodiment, noise caused due to the interference between the signal light and the stray light is not generated, and therefore, it is possible to obtain a good servo error signal and a good reproduction signal. In the same manner as the previous embodiment, it is possible to obtain a focus error signal FE of the following equation FE=(B1+B3)−(B2+B4), a differential push pull tracking error signal DPP of the following equation DPP=((B1+B4)−(B2+B3))−G×((A1+C1)−(A2+C2)), and an RF signal RF of the following equation RF=B1+B3+B2+B4+B5+B6, using the output signals B1, B2, B3, and B4 of the respective light receiving parts B1, B2, B3, and B4 of the quadrant optical detection unit 400 and the output signals A1, A2 and C1, C2 of the respective light receiving parts A1, A2 and C1, C2 of the sub optical detection units 401 and 402, shown in FIG. 25. In the equation, "G" indicates a differential coefficient.

Sixth Embodiment

Figure 26:
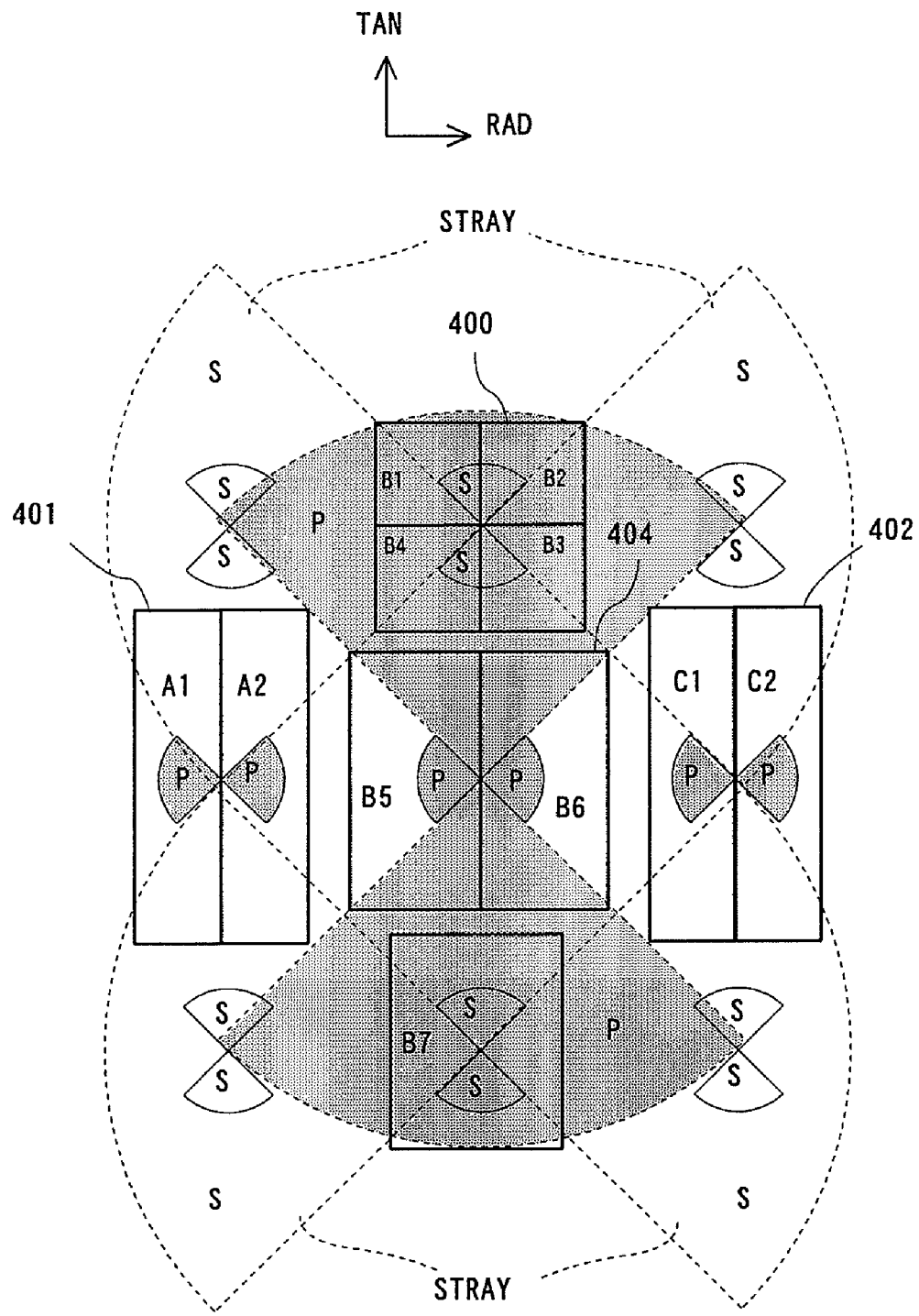
FIG. 26 is a typical plan view illustrating the structure of a photo detector of an optical pickup device according to a sixth embodiment of the present invention.

FIG. 26 illustrates a sixth embodiment of a photo detector 40 which is divided into a photo detector for focus error detection and a photo detector for tracking error signal detection in the fifth embodiment. The sixth embodiment is identical to the fifth embodiment except the change in structure of the photo detector 40. Here, the focus error detection is performed using the light flux of the region where the tracking error signal component is small, and the tracking error signal detection is performed using the light flux of the region where the tracking error signal component is large. Since the track cross component is little in the signal itself, the track cross is rarely mixed in the focus error detection as noise.

Unlike the photo detector of FIG. 25, the photo detector 40 of FIG. 26 is displaced in the tangent direction, not about the quadrant optical detection unit 400, and sub optical detection unit 404 (light receiving parts B5 and B6), which is divided in the tangent direction for push pull, are disposed at the central part of the photo detector 40. Also, the photo detector 40 includes the quadrant optical detection unit 400 displaced to receive S polarized partial light flux diffracted and deflected from the light-transmissive regions TWa and TWc (FIG. 23 and FIG. 24) to the hologram regions Hb and Hd, and a tangent-direction sub optical detection unit B7 disposed at a position (on the extension line of the division line in the tangent direction) symmetrical with respect to the central point of the sub optical detection unit 404.

Also, in this embodiment, noise caused due to the interference between the signal light and the stray light is not generated, and therefore, it is possible to obtain a good servo error signal and a good reproduction signal. In the same manner as the previous embodiment, it is possible to obtain a focus error signal FE of the following equation FE=(B1+B3)−(B2+B4), a differential push pull tracking error signal DPP of the following equation DPP=(B5−B6)−G×((A1+C1)−(A2+C2)), and an RF signal RF of the following equation RF=B1+B3+B2+B4+B5+B6+B7, using the output signals B1, B2, B3, and B4 of the respective light receiving parts B1, B2, B3, B4, B5, B6, and B7 of the optical detection unit and the output signals A1, A2 and C1, C2 of the respective light receiving parts A1, A2 and C1, C2 of the sub optical detection units, shown in FIG. 26. In the equation, "G" indicates a differential coefficient.

Seventh Embodiment

The focus error detection according to this embodiment is carried out using an optical device which provides astigmatisms different by an angle of 90° at four regions which are quartered in the shape of a fan on a pupil while being adjacent to each other and provides deflection actions different at the adjacent regions. Since the astigmatic directions are different for the respective regions, the directions of the line images are different from each other. The focus error is detected by a spot size method using this respect.

Figure 27:
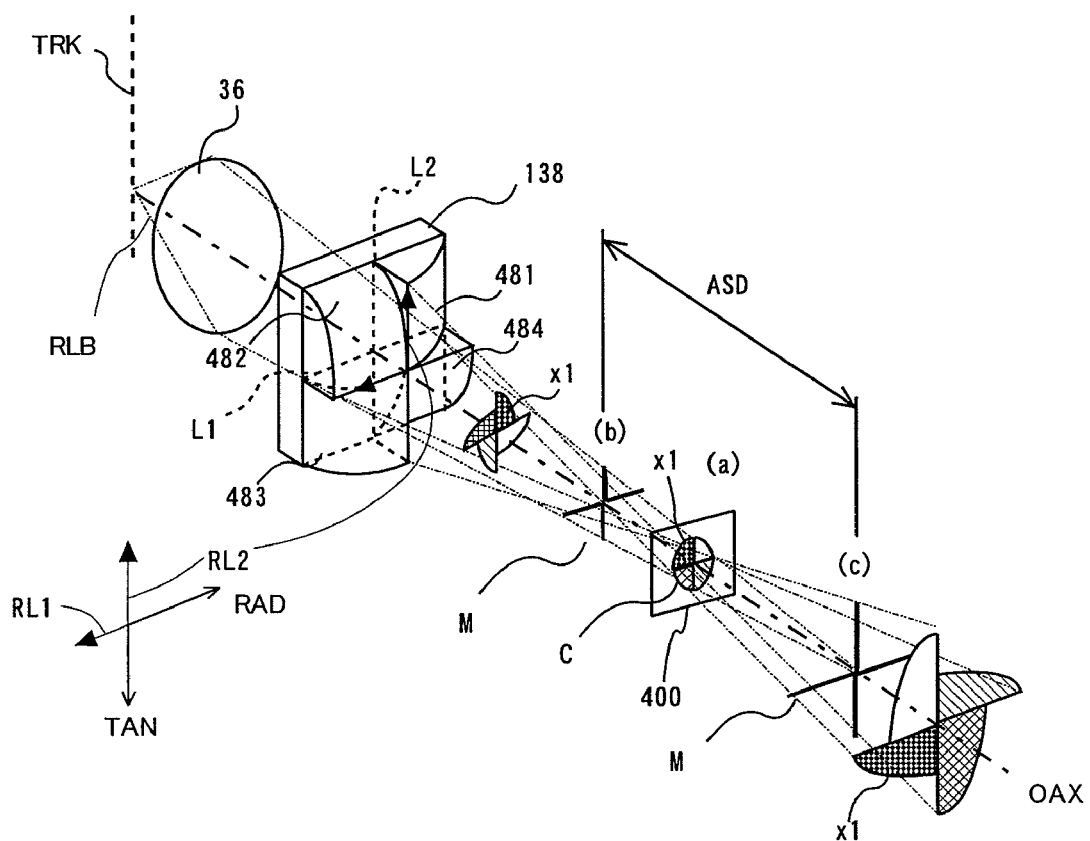
FIG. 27 is a typical perspective view illustrating an optical system including a cylindrical assembly lens, which is an example of an astigmatic device, of an optical pickup device according to a seventh embodiment of the present invention.

FIG. 27 is a typical perspective view illustrating an optical system including a cylindrical assembly lens 138, which is an example of the astigmatic device. The cylindrical assembly lens 138 is disposed on a plane perpendicular to the optical axis OAX of the returning light RLB, and provides two astigmatisms of which the directions are perpendicular to each other to the returning light RLB directed from the object lens 36 to the photo detector 40 along the optical axis. The cylindrical assembly lens 138 is constructed in a structure in which, for example, two cylindrical lens parts 481, 483 and 482, 484 having the same curvature are disposed, while intersecting the optical axis OAX of the returning light RLB, such that central axes RL1 and RL2 of the cylindrical lens parts 481, 483 and 482, 484 are located in the radial direction and in the tangent direction and are perpendicular to the optical axis. The extension directions of the central axes RL1 and RL2 of the cylindrical lens parts 481, 483 and 482, 484 become astigmatic directions. Pairs of vertically opposite angle positions 481, 483 and 482, 484 of the lens parts 481 to 484 belong to the same cylindrical lens.

The cylindrical lens parts 481 to 484 provide astigmatism of which the direction is rotated by an angle of 90° with respect to the returning light part passing through quadrant regions adjacent at the same side about the division line L1 (the tangent direction) or the division line L2 (the radial direction), and, at the same time, quarter the returning light for the respective quadrant regions. The first and third lens parts 481 and 483 disposed at a pair of vertically opposite angle positions have a common cylindrical lens surface extending to opposite sides of the division line L2. The second and fourth lens parts 482 and 484 disposed at another pair of vertically opposite angle positions have a common cylindrical lens surface extending to opposite sides. The curvature central axis of the lens parts located at a pair of vertically opposite angle positions is rotated around the optical axis by an angle of 90° from the curvature central axis of the lens parts located at another pair of vertically opposite angle positions. With this construction, astigmatism of which the direction is rotated by an angle of 90° is provided to the returning light part passing through the quadrants at the vertically opposite angle positions.

As shown in FIG. 27, a partial light flux x1 of the returning light RLB at a first quadrant region passing through the first lens part 481 around the optical axis OAX of the returning light from the object lens 36 passes through the first quadrant region to a first line image M, moves to a second quadrant region after passing through the first line image M, and moves to a third quadrant region after passing through the next line image M. Consequently, change is made from a line image spot formed along the division line L2 in the second quadrant region to a line image spot formed along the division line L1 inclined at an angle of 90° via a fan-shaped spot within the astigmatic distance.

In the same manner, a partial light flux of the returning light at the second quadrant region passing through the second lens part 482 passes through the second quadrant region to the first line image, moves to the third quadrant region after passing through the first line image, and moves to a fourth quadrant region after passing through the next line image. Consequently, change is made from a line image spot formed along the division line L1 in the third quadrant region to a line image spot formed along the division line L2 inclined at an angle of 90° via a fan-shaped spot within the astigmatic distance.

In the same manner, a partial light flux at the third quadrant region passing through the third lens part 483 at the vertically opposite angle position passes through the third quadrant region to the first line image, moves to the fourth quadrant region after passing through the first line image, and moves to the first quadrant region after passing through the next line image. Consequently, change is made from a line image spot formed along the division line L2 in the fourth quadrant region to a line image spot formed along the division line L1 inclined at an angle of 90° via a fan-shaped spot within the astigmatic distance.

In the same manner, a partial light flux at the fourth quadrant region passing through the fourth lens part 484 passes through the fourth quadrant region to the first line image, moves to the first quadrant region after passing through the first line image, and moves to the second quadrant region after passing through the next line image. Consequently, change is made from a line image spot formed along the division line L1 in the first quadrant region to a line image spot formed along the division line L2 inclined at an angle of 90° via a fan-shaped spot within the astigmatic distance.

In this way, in the case of the astigmatic distance, a cross-shaped line image spot appears on the optical axis, and it looks like that the respective partial light fluxes are rotated about the optical axis like a windmill. By the cylindrical assembly lens 138, including the first to fourth lens parts 481 to 484, it is possible to spatially divide the returning partial light flux passing through the lens parts for the respective quadrant regions and, at the same time, to jointly use the three beam method and the PDP method by the provision of the astigmatism.

Figure 28:
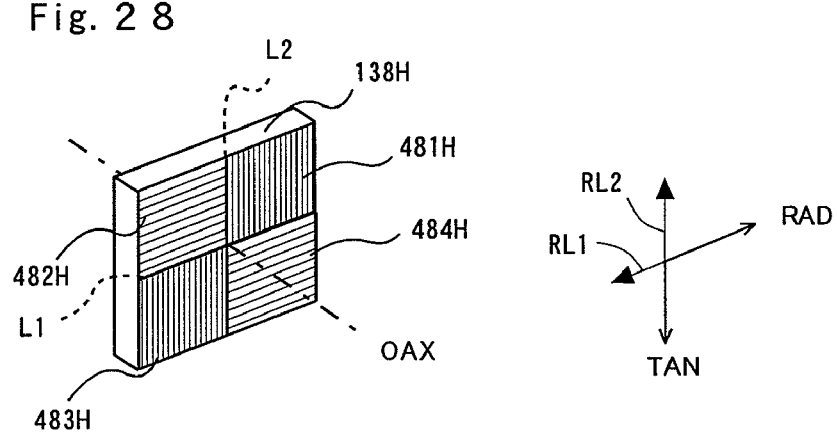
FIG. 28 is a typical perspective view illustrating a quadrant transmission blazed hologram including quadrant hologram parts, which is an example of an astigmatic device, of the optical pickup device according to the seventh embodiment of the present invention.

FIG. 28 is a typical perspective view illustrating a quadrant transmission blazed hologram 138H including quadrant hologram parts, which is an example of the astigmatic device. The quadrant transmission blazed hologram 138H is a diffraction optical device designed to function as the lens surface of the cylindrical assembly lens 138. The first to fourth quadrant hologram parts 481H, 482H, 483H, and 484H are formed to function as the cylindrical lens surfaces by a two light wave interference method. The quadrant transmission blazed hologram 138H functions as the cylindrical lens surfaces as the first to fourth lens parts 481 to 484. The quadrant transmission blazed hologram 138H has central axes RL1 and RL2 which are astigmatic directions, like the cylindrical assembly lens 138. The central axes RL1 and RL2 are ridgelines of the corresponding cylindrical lens parts or rotational symmetry axes of cylindrically curved surfaces forming the lens surfaces. The quadrant transmission blazed hologram 138H is disposed while intersecting the optical axis of the returning axis such that the central axes RL1 and RL2 (or the division lines L1 and L2) of the quadrant transmission blazed hologram 138H extend in parallel to the tangent direction and the radial direction of the optical disk on a plane perpendicular to the optical axis of the returning axis. The quadrant transmission blazed hologram 138H spatially divides the returning partial light fluxes passing through the first to fourth quadrant hologram parts 481H, 482H, 483H, and 484H for the respective quadrant regions, and, at the same time, provides astigmatism to the returning partial light fluxes, by the first to fourth quadrant hologram parts 481H, 482H, 483H, and 484H.

Figure 29:
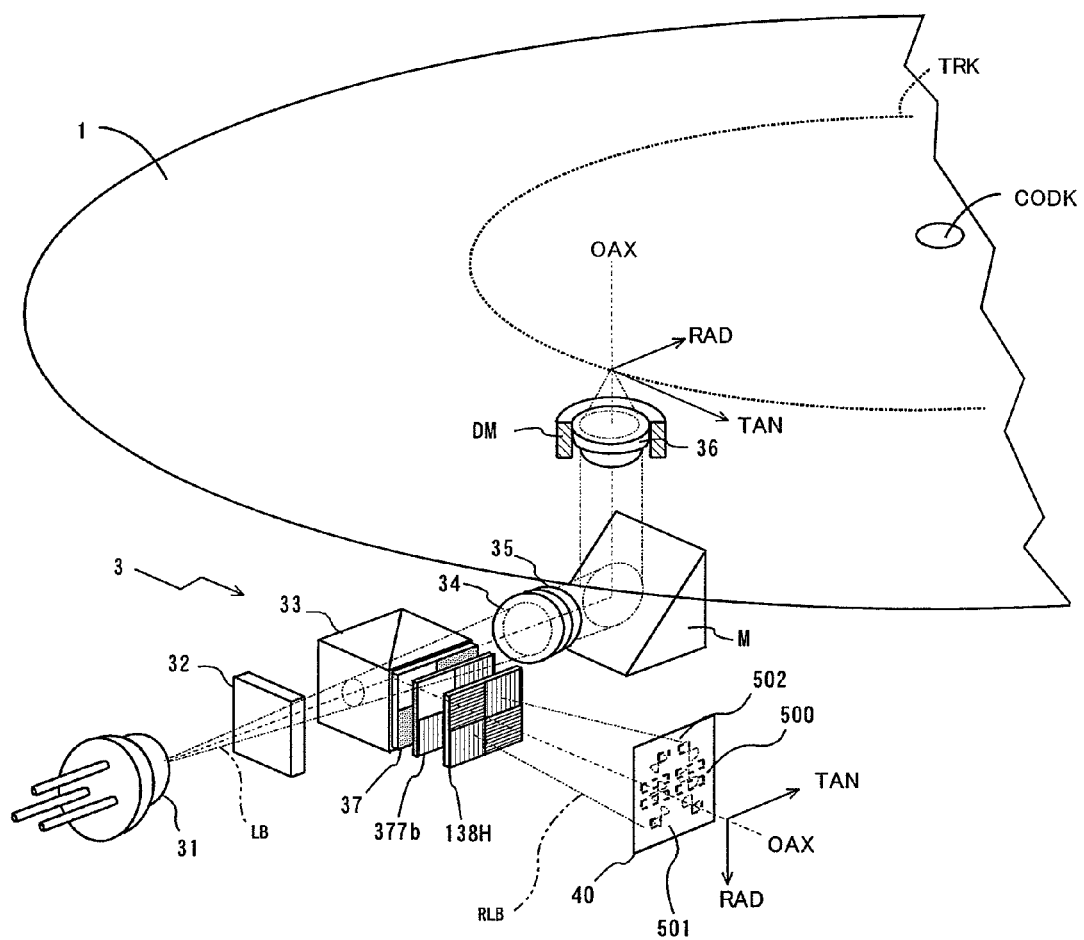
FIG. 29 is a schematic perspective view illustrating the structure of the principal part of the optical pickup device according to the seventh embodiment of the present invention.

FIG. 29 is a schematic perspective view illustrating the structure of the principal part of the pickup device according to the seventh embodiment of the present invention, using the quadrant transmission blazed hologram 138H shown in FIG. 28. This pickup device is identical to the second embodiment (FIG. 11) except that the structure of a division device (a divisional wave plate device 37, the quadrant transmission blazed hologram 138H, and a divisional deflection device 377b) is changed, and the structure of a photo detector 40 is changed. The photo detector 40 includes two trisectional optical detection units 500 disposed at the central part thereof to perform focus servo using an astigmatic method on a plane perpendicular to the optical axis of the returning light, and sub optical detection units 501 and 502 for three beams disposed side by side at opposite sides of the two trisectional optical detection units 500 in the radial direction to perform tracking servo by a three beam method.

In this embodiment, the divisional wave plate device 37 and the divisional deflection device 377b, as the division device, are coaxially disposed between the divisional wave plate device 37 and the quadrant transmission blazed hologram 138H, which is the astigmatic device. The divisional deflection device 377b diffracts three bundles of light fluxes (the reflected light fluxes) passing through the divisional wave plate device 37 from the optical disk 1. The light fluxes are incident on the photo detector 40 from the quadrant transmission blazed hologram 138H. Also, the three bundles of light fluxes are shown as one bundle of light flux in the drawing.

Figure 30:
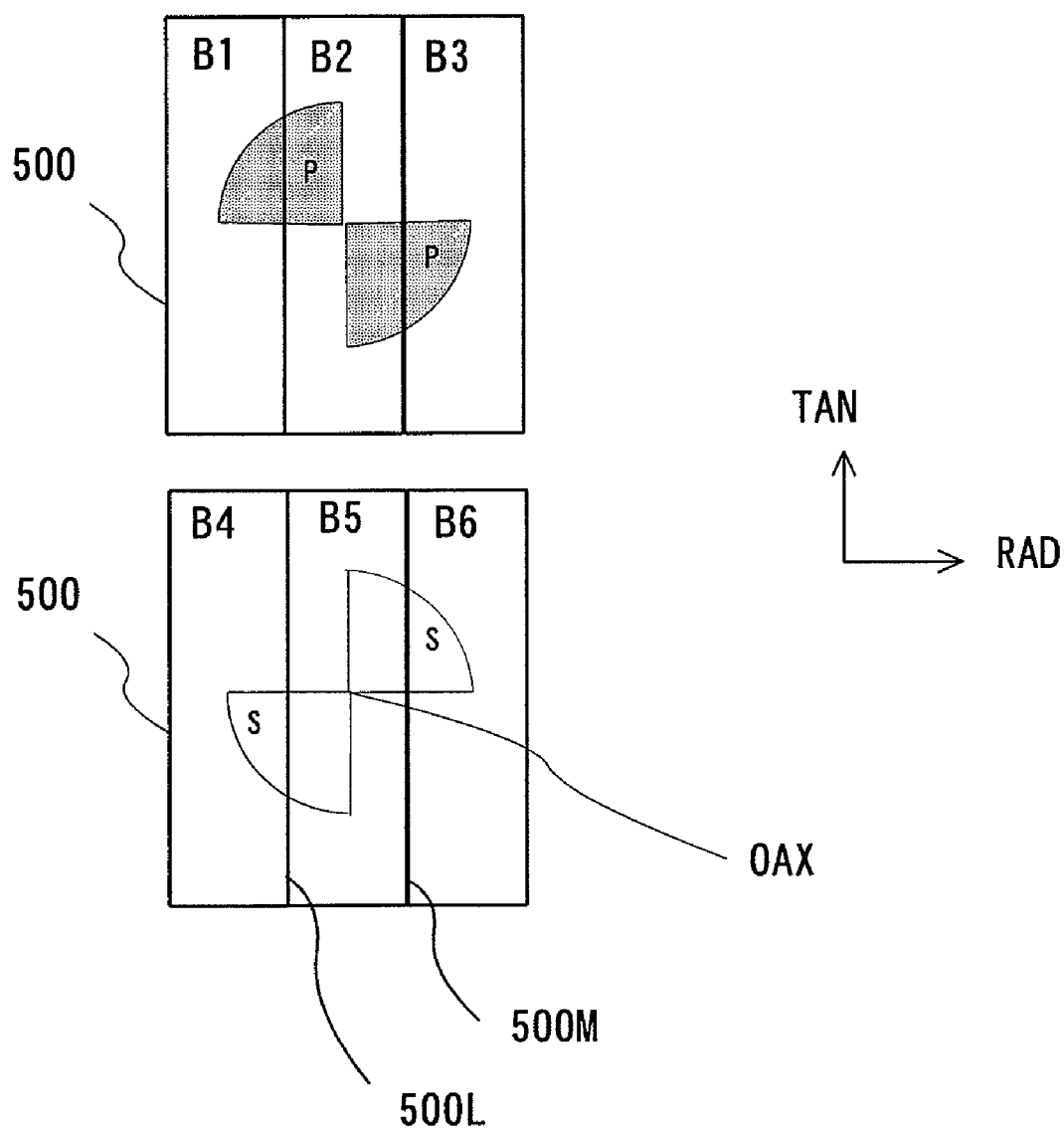
FIG. 30 is a typical plan view illustrating trisectional photo detection units of the optical pickup device according to the seventh embodiment of the present invention when viewing from optical axis incidence sides of the trisectional optical detection units.

FIG. 30 is a typical plan view illustrating the trisectional optical detection units 500 of the photo detector 40 shown in FIG. 29 when viewing from optical axis incidence sides of the trisectional optical detection units. The two trisectional optical detection units 500 of the photo detector 40 are the same in structure, and are disposed side by side while being spaced a predetermined distance from each other in the tangent direction. The respective trisectional optical detection units 500 include three light receiving parts B1, B2, B3 and B4, B5, B6, having the same area, which are separated from each other while being adjacent to each other, about two division lines 500L and 500M parallel to each other in the tangent direction. Also, the respective trisectional optical detection units 500 are disposed such that the center of the middle light receiving part B5 of one of the trisectional optical detection units 500 disposed side by side on a straight line in the tangent direction intersects with the optical axis OAX of the returning light RLB. The light receiving parts are connected to a predetermined circuit (not shown), and photoelectric conversion outputs from the respective light receiving parts are calculated to create a focus error signal.

Figure 31:
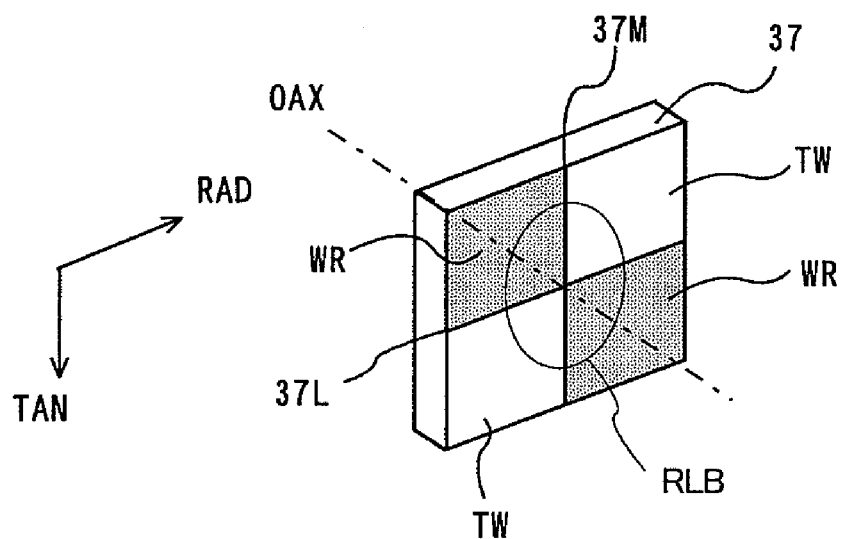
FIG. 31 is a typical perspective view illustrating a divisional wave plate device of a division device of the optical pickup device according to the seventh embodiment of the present invention.

FIG. 31 is a typical perspective view illustrating the divisional wave plate device 37 of the division device used in this embodiment. The divisional wave plate device 37 has the same function as the divisional wave plate device 37 shown in FIG. 7. The divisional wave plate device 37 is constructed in a structure in which, on a plane perpendicular to the optical axis OAX of the returning light RLB, half wave plate regions WR and transparent regions TW, which are obtained by uniformly quartering the light flux section about the optical axis in the shape of a fan, are alternately arranged around the optical axis. In the divisional wave plate device 37, as shown in the drawing, the intersection point between one division line 37L and the other division line 37M intersects with the optical axis OAX of the returning light such that the division line 37L extends in the radial direction, and the division line 37M extends in the tangent direction. The half wave plate regions WR and the transparent regions TW provide phase difference such that polarized light components of the light flux of the transmitted returning light (S polarized light) at the neighboring regions thereof are different from each other by an angle of 900.

Figure 32:
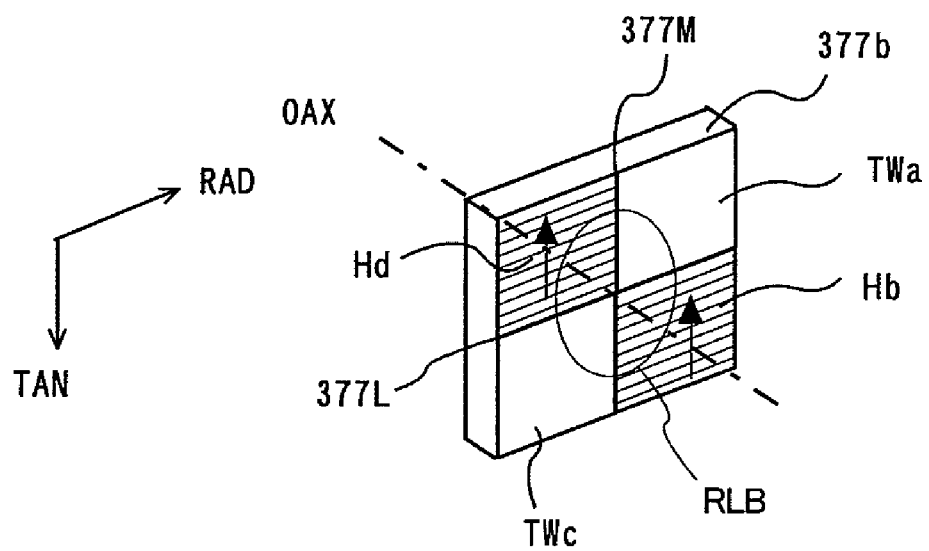
FIG. 32 is a typical perspective view illustrating a divisional deflection device of the optical pickup device according to the seventh embodiment of the present invention.

FIG. 32 is a typical perspective view illustrating the divisional deflection device 377b of the division device used in the seventh embodiment. The divisional deflection device 377b is constructed in a structure in which, on a plane perpendicular to the optical axis OAX of the returning light RLB, four regions TWa, Hb, TWc, and Hd, which are obtained by uniformly quartering the light flux section about the optical axis in the shape of a fan, are sequentially arranged around the optical axis. In the divisional deflection device 377b, as shown in the drawing, the intersection point between one division line 377L and the other division line 377M intersects with the optical axis OAX of the returning light such that the division line 377L extends in the radial direction, and the division line 377M extends in the tangent direction. Of the regions quartered by the division line 377L and the division line 377M, the light-transmissive regions TWa and TWc are formed as light-transmissive parallel plates, and function to transmit the returning light (S polarized light) as it is. The hologram regions Hb and Hd are formed in a blazed hologram such that the hologram regions Hb and Hd are diffracted in the same direction in the tangent direction such that the hologram regions Hb and Hd are deflected by a predetermined distance (the central point of the center of the middle light receiving part B2 of the other trisectional optical detection unit 500) in the tangent direction from the central point of the center of the middle light receiving part B5 of one of the trisectional optical detection units 500.

Since the hologram regions Hb and Hd of the divisional deflection device 377b correspond to the half wave plate regions WR of the divisional wave plate device 37, the hologram regions Hb and Hd of the divisional deflection device 377b function to deflect the P polarized light. Also, since the light-transmissive regions TWa and TWc of the divisional deflection device 377b correspond to the transparent regions TW of the divisional wave plate device 37, the light-transmissive regions TWa and TWc of the divisional deflection device 377b function to transmit the returning light (S polarized light) as it is. That is, the divisional deflection device 377b is constructed such that the partial light fluxes at supplementary angle positions, among the four regions TWa, Hb, TWc, and Hd quartered by the two division lines 377M and 377L, do not spatially interfere with each other.

Figure 33:
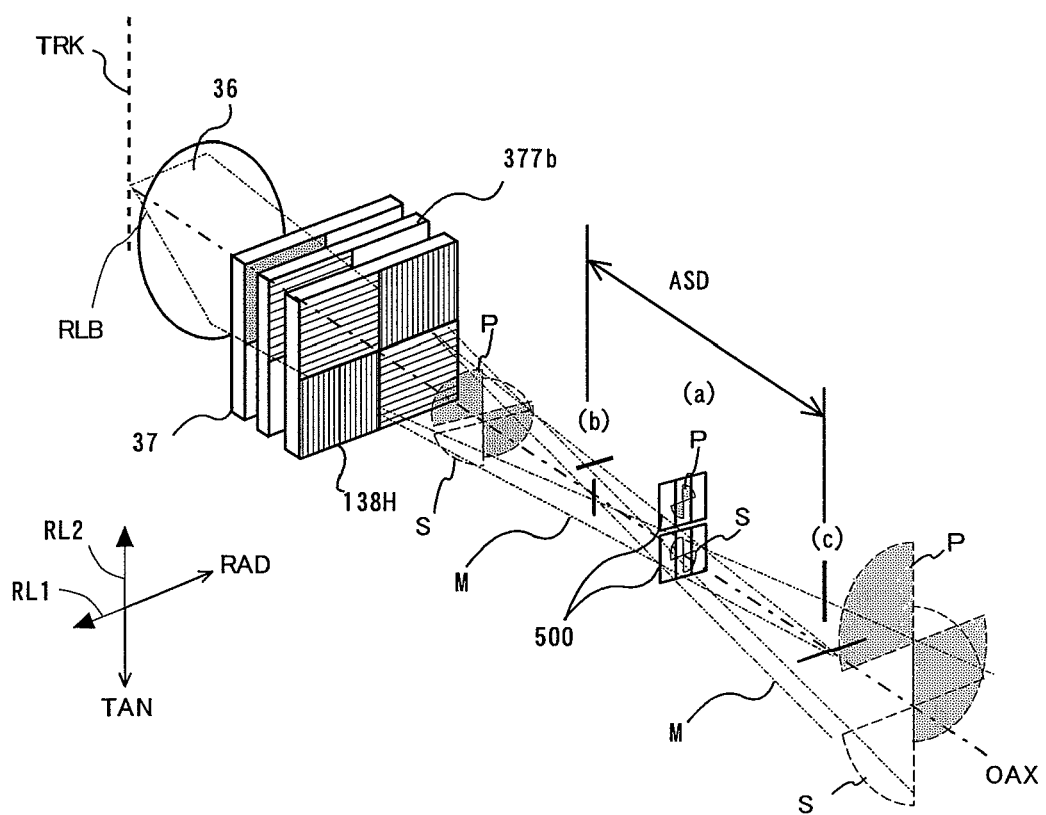
FIG. 33 is a schematic perspective view of a detection system illustrating a condensed state of returning light in the optical pickup device according to the seventh embodiment of the present invention.

FIG. 33 is a schematic perspective view of a detection system illustrating a condensed state (an in-focus state and a non-focus state) of the returning light RLB in the pickup device shown in FIG. 29 (A light source, a polarization beam splitter, and a photo detector except trisectional optical detection units 500 are omitted to clearly describe the detection system).

Figure 34:
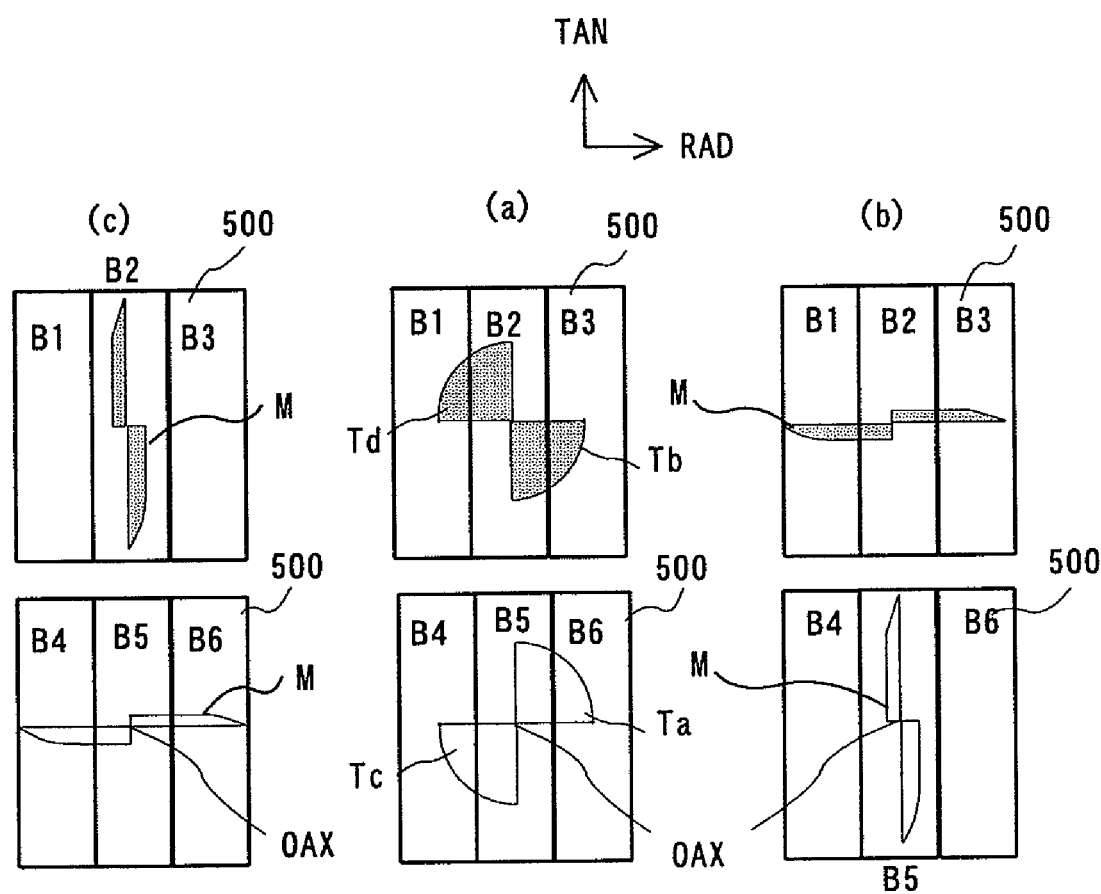
FIG. 34 is a schematic plan view of trisectional optical detection units illustrating an in-focus state and a non-focus state of the optical pickup device according to the seventh embodiment of the present invention.
Figure 35:
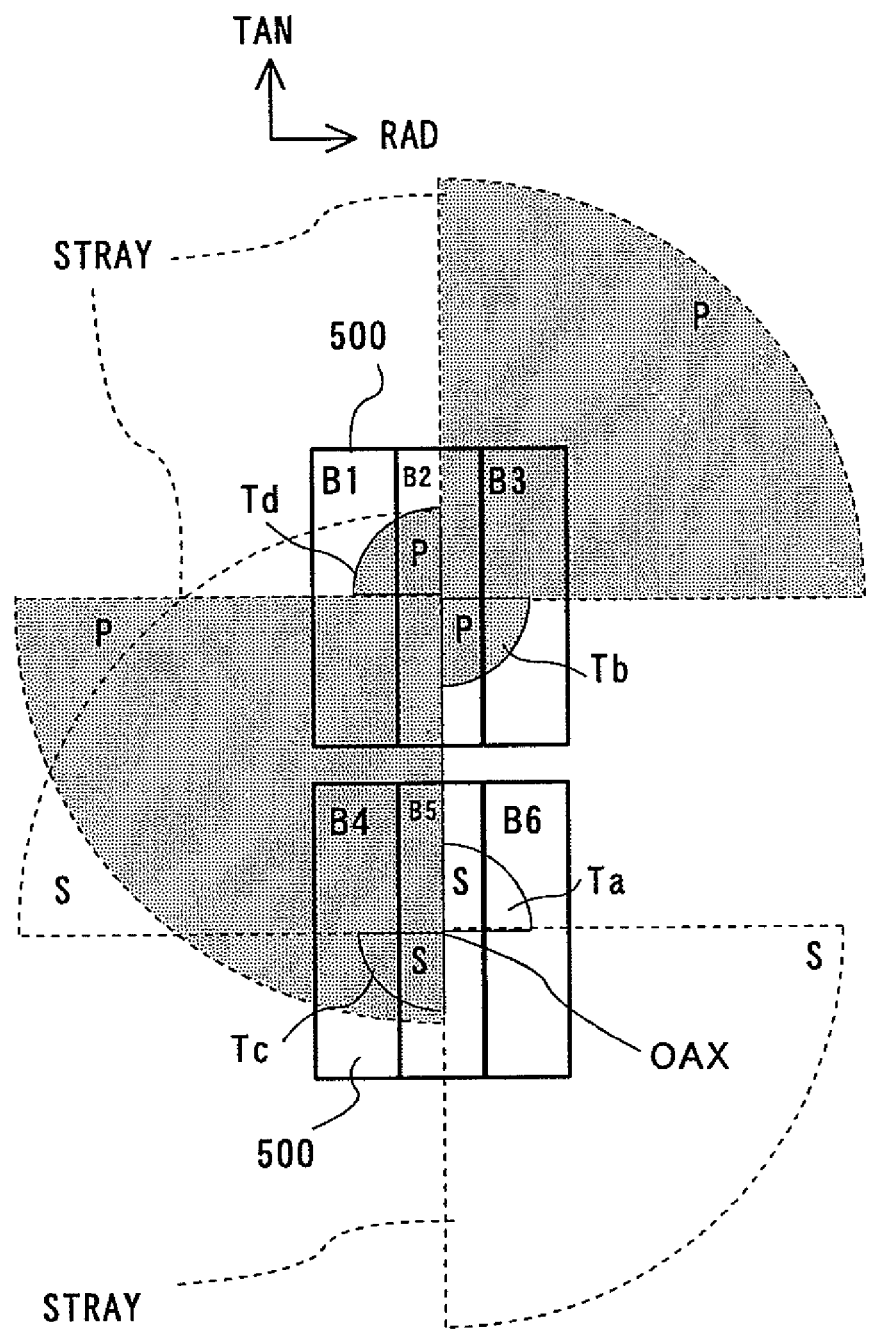
FIG. 35 is a schematic plan view of the trisectional optical detection unit illustrating an in-focus state of signal light in the optical pickup device according to the seventh embodiment of the present invention.

FIG. 34 is a schematic plan view of the trisectional optical detection units 500 illustrating an in-focus state and a non-focus state of the pickup device. FIG. 35 is a schematic plan view of the trisectional optical detection units 500 illustrating an in-focus state of signal light particularly in the pickup device. When the main beam is focused on the optical disk 1 (at the time of in-focus), as shown in FIGS. 33(a), 34(a), and 35, the condensed spots Ta, Tb, Tc, and Td spread in the shape of a fan from the central points of the middle light receiving parts B5 and B2 of the respective trisectional optical detection units 500 to be a pair of quarter circles (opposite directions inclined at an angle of 45° to the tangent direction) put between the light receiving parts B4-B5 and between the light receiving parts B1-B3, respectively.

When the optical disk 1 becomes closer to the object lens 36 than in the in-focus state, as shown in FIGS. 33(b) and 34(b), the returning light RLB is condensed in the shape of line image spots M extending in the directions perpendicular to the respective trisectional optical detection units 500. On the other hand, when the optical disk 1 becomes more distant from the object lens 36 than in the in-focus state, as shown in FIGS. 33(c) and 34(c), the returning light is condensed in the shape of line image spots M extending in the directions reversely perpendicular to the respective trisectional optical detection units 500.

Furthermore, when the distance between the optical disk and the object lens is further decreased and increased, as shown in FIG. 33, the returning light RLB spreads out on the trisectional optical detection units 500 in the shape of a spreading and divided ellipse. At the same time, light spot parts P and S on the trisectional optical detection units 500, to which the P and S polarized partial light fluxes are irradiated, are changed inside the range of the astigmatic distance (FIGS. 33 and 34(a) to 34(c)) and outside the range of the astigmatic distance. In the astigmatic method, the state of the light divided along the optical axis is changed inside and outside the range of the astigmatic distance.

In the seventh embodiment, the divisional wave plate device 37, the divisional deflection device 377b, and the astigmatic device 138H, which have the same divisional regions along the optical axis of the detection optical system, are assembled, with the result that the overlap between the stray light and the condensed spots Ta, Tb, Tc, and Td does not occur in principle (See FIG. 35), and, in addition, it is not necessary to separate the two light receiving parts from each other in order to avoid the interference between the two returning light fluxes RLB by the two cylindrical lens (hologram) parts 481H, 483H and 482H, 484H. It is possible to dispose the photo detector in an adjacent fashion in order to change the polarization of the two light fluxes.

In this embodiment, the description was given while focusing on the two trisectional optical detection units 500, to obtain a focus error signal. However, it is possible to create a tracking error signal (a push pull signal) using only the light fluxes not interfering with each other at the time of using three beams, as shown in FIG. 36, such that the tracking error signal can be detected.

Figure 36:
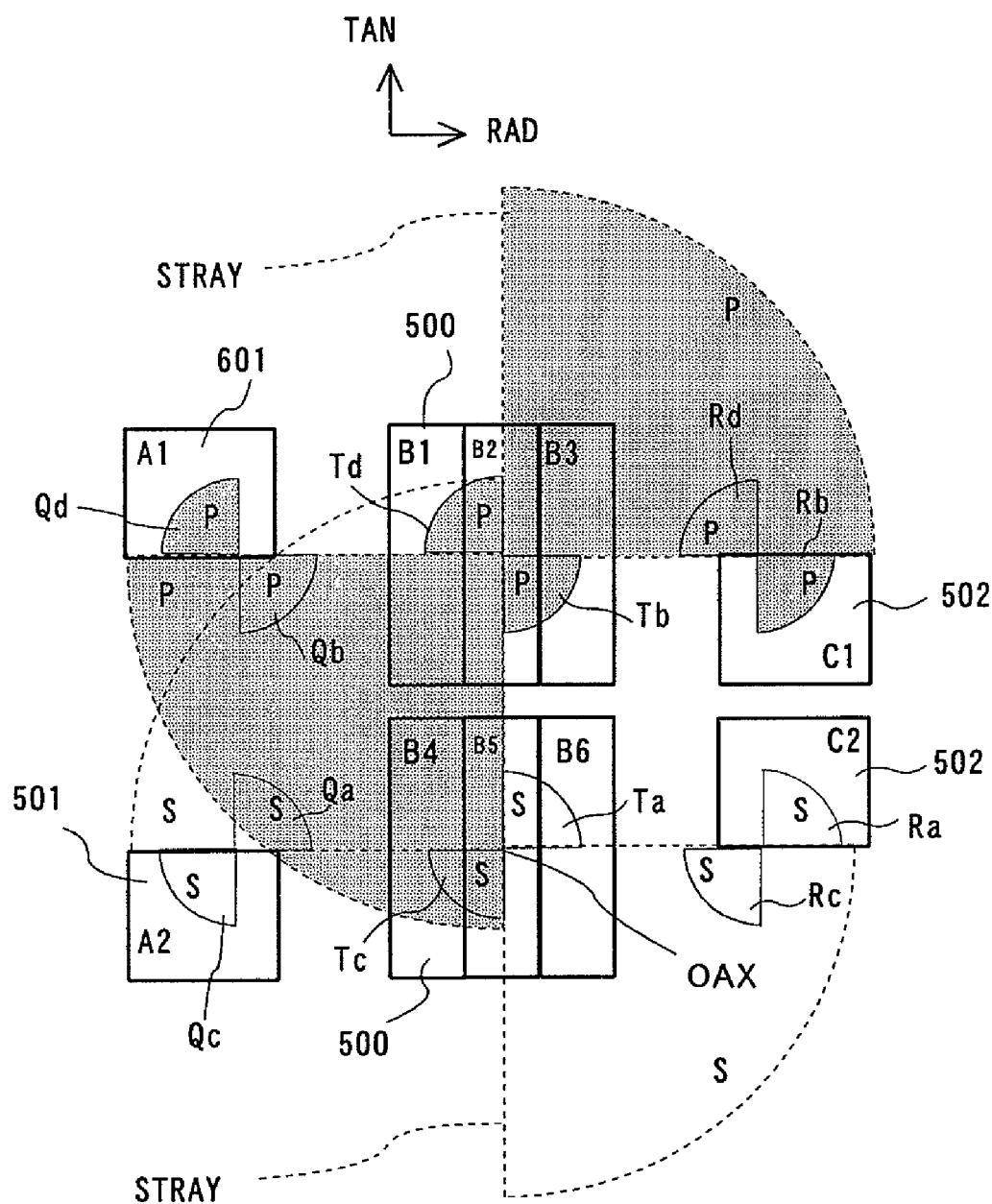
FIG. 36 is a schematic plan view of the trisectional optical detection unit illustrating an in-focus state of signal light in the optical pickup device according to the seventh embodiment of the present invention.

One of the sub beams, divided at the four regions TWa, Hb, TWc, and Hd of the divisional deflection device 377b shown in FIG. 32, is condensed on the sub optical detection unit 501 (the light receiving parts A1 and A2) of the photo detector as condensed spots Qa, Qb, Qc, and Qd, respectively, and is condensed on the sub optical detection unit 502 (the light receiving parts C1 and C2) as condensed spots Ra, Rb, Rc, and Rd, respectively, as shown in FIG. 36. However, the sub optical detection unit 501 (the light receiving parts A1 and A2) and the sub optical detection unit 502 (the light receiving parts C1 and C2) are disposed side by side in parallel to each other while being spaced apart from each other in the radial direction at the opposite sides of the direction in which the two trisectional optical detection units 500 are disposed side by side (the tangent direction), and the light receiving parts A1 and A2 and the light receiving parts C1 and C2 are disposed in a symmetrical fashion in the radial direction, such that the S polarized and P polarized sub beams do not interfere with the stray light.

In this embodiment, astigmatism corresponding to the focus state is given to the returning light flux, deflected at and transmitted through the divisional deflection device 377b, as in the previous embodiment, and therefore, it is possible to detect the focus state of the optical disk 1 by calculating output signals from the respective light receiving parts of the trisectional optical detection units 500 and the sub optical detection units 501 and 502 of the photo detector. As a result, in the pickup device according to this embodiment, noise caused due to the interference between the signal light and the stray light is not generated, and therefore, it is possible to obtain a good servo error signal and a good reproduction signal. In the same manner as the previous embodiment, it is possible to obtain a focus error signal FE of the following equation FE=(B1+B3+B5)−(B2+B4+B6), a differential push pull tracking error signal DPP of the following equation DPP=((B1+B3)−(B4+B6))−G×((A1+A2)−(C1+C2)), and an RF signal RF of the following equation RF=B1+B3+B2+B4+B5+B6, using the output signals B1, B2, B3, B4, B5, and B6 of the respective light receiving parts B1, B2, B3, B4, B5, and B6 of the trisectional optical detection units 500 and the output signals A1, A2 and C1, C2 of the respective light receiving parts A1, A2 and C1, C2 of the sub optical detection units 501 and 502, shown in FIG. 36. In the equation, "G" indicates a differential coefficient.

Eighth Embodiment

An eighth embodiment is a pickup device which is identical in construction to the seventh embodiment (FIG. 29) except the change in shape and arrangement of the light receiving parts of the photo detector 40 and the provision of a divisional deflection device 377b of the division device. In this embodiment, one of the trisectional optical detection units 500 is removed, and a sub optical detection unit 500PP is added, to detect a large number of tracking error signals (push pull signals).

Figure 37:
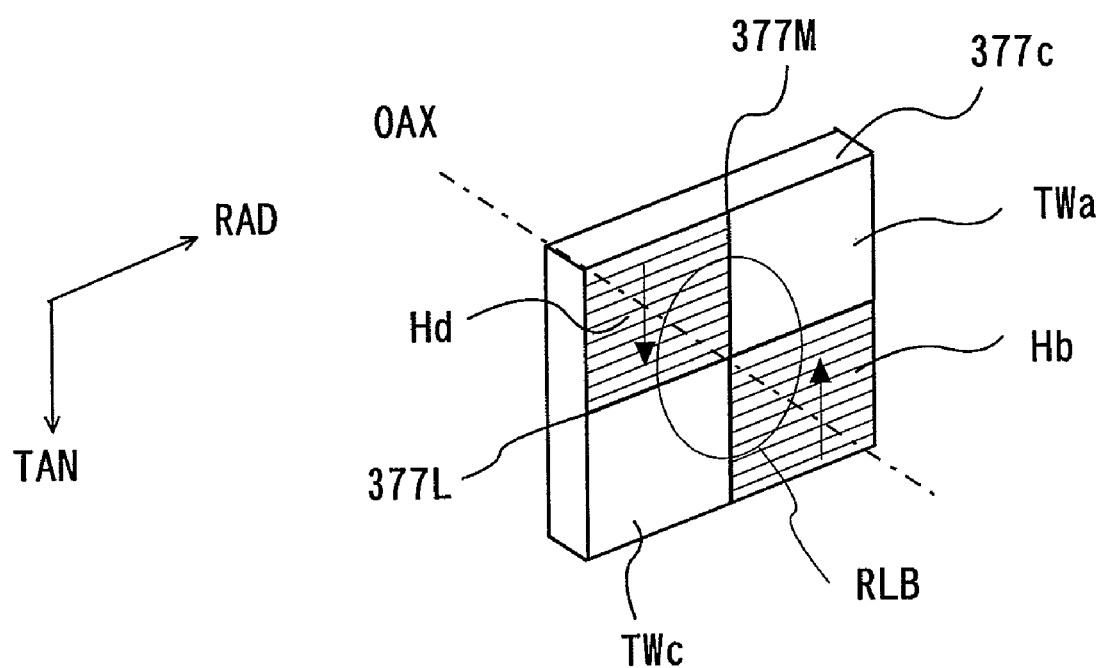
FIG. 37 is a typical perspective view illustrating a divisional deflection device of an optical pickup device according to an eighth embodiment of the present invention.

A divisional deflection device 377c of the division device used in the eighth embodiment is shown in FIG. 37. The divisional deflection device 377c is identical in construction to the divisional deflection device 377b shown in FIG. 32 except that the polarization direction of the P polarized light of the hologram region Hd of the divisional deflection device 377b shown in FIG. 32 is set to be reversed. That is, the hologram regions Hb and Hd are formed in a blazed hologram such that the P polarized partial light fluxes are diffracted and deflected in opposite directions in the tangent direction.

Figure 38:
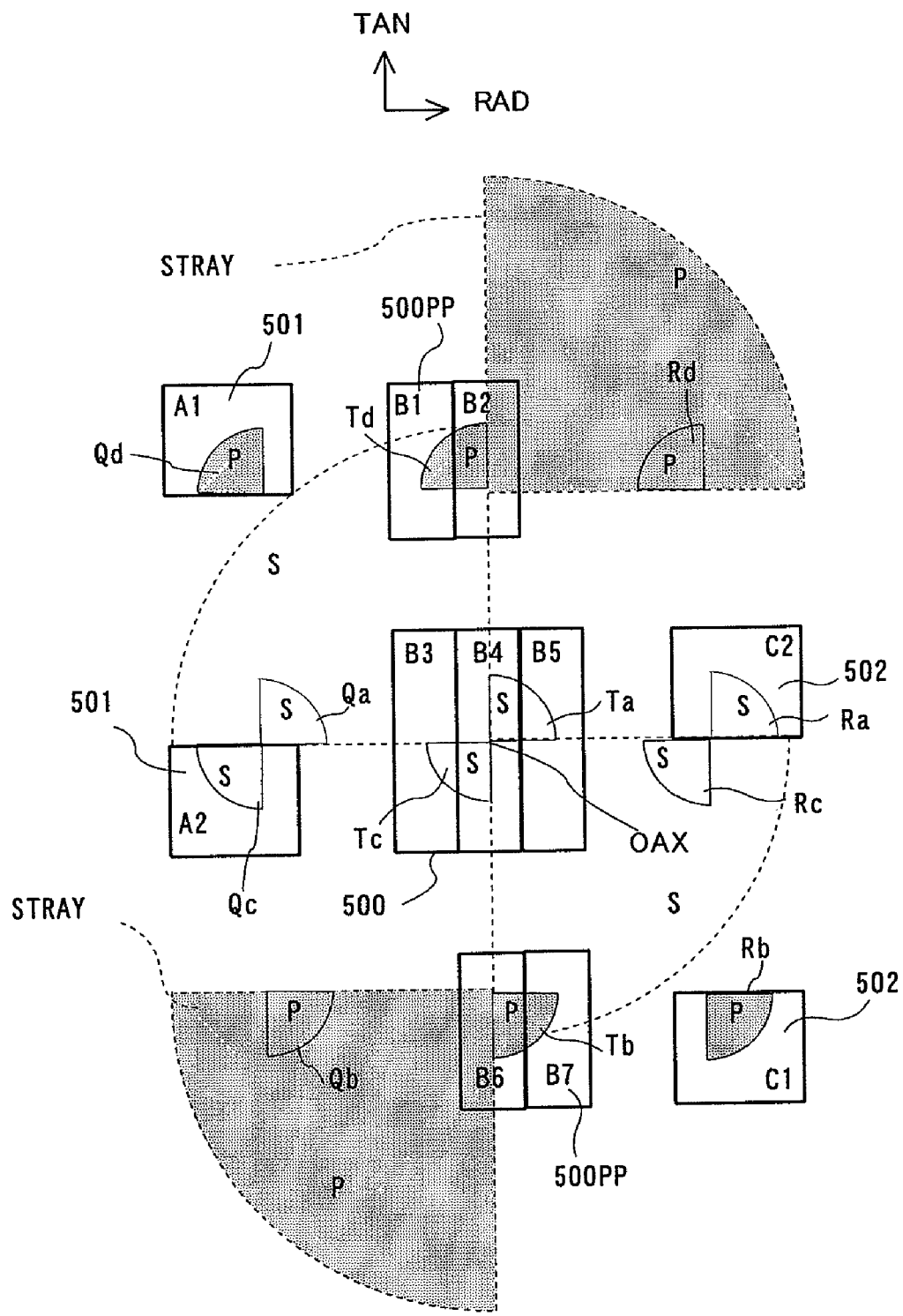
FIG. 38 is a schematic plan view of a trisectional optical detection unit illustrating an in-focus state of signal light in the optical pickup device according to the eighth embodiment of the present invention.

The P polarized partial light fluxes, diffracted at the hologram regions Hb and Hd of the divisional deflection device 377c shown in FIG. 37, are condensed on positions distant from each other in the tangent direction of the two sub optical detection units 500PP, i.e., positions displaced in opposite directions, as condensed spots Tb and Td, respectively, in the in-focus state, as shown in FIG. 38. The trisectional optical detection unit 500 includes three light receiving parts B3, B4, B5, having the same area, which are separated from each other while being adjacent to each other, about two division lines 500L and 500M parallel to each other in the tangent direction. Also, the respective trisectional optical detection unit 500 is disposed such that the center of the middle light receiving part B5 of the trisectional optical detection unit 500 disposed on a straight line in the tangent direction intersects with the optical axis OAX of the returning light RLB. Consequently, the two sub optical detection units 500PP are disposed in a point symmetrical fashion about the optical axis, while being separated from the trisectional optical detection unit 500. Also, the two sub optical detection units 500PP include light receiving parts B1, B2 and B6, B7 divided by the division lines 500L and 500M. Consequently, the condensed spots Tb and Td are condensed such that the condensed spots Tb and Td go over the division lines of the light receiving parts B1, B2 and B6, B7.

On the other hand, the S polarized partial light fluxes, transmitted through the light-transmissive regions TWa and TWc of the divisional deflection device 377c, condensed such that the condensed spots Ta and Tc spread in the shape of a fan from the central point of the middle light receiving part B4 of the trisectional optical detection unit 500 to be a pair of quarter circles (opposite directions inclined at an angle of 45° to the tangent direction) put between the light receiving parts B3–B5.

Also, one of the sub beams, divided at the four regions TWa, Hb, TWc, and Hd of the divisional deflection device 377 shown in FIG. 37, is condensed on the sub optical detection unit 501 (the light receiving parts A1 and A2) of the photo detector as condensed spots Qd and Qc, respectively, and is condensed on the sub optical detection unit 502 (the light receiving parts C1 and C2) as condensed spots Rc and Ra, respectively, as shown in FIG. 38. However, the sub optical detection unit 501 (the light receiving parts A1 and A2) and the sub optical detection unit 502 (the light receiving parts C1 and C2) are disposed side by side in parallel to each other, while being spaced apart from each other, in the radial direction at the opposite sides of the trisectional optical detection unit 500 on the optical axis, and the light receiving parts A1 and A2 and the light receiving parts C1 and C2 are disposed in a point symmetrical fashion about the optical axis, such that the S polarized and P polarized sub beams do not interfere with the stray light.

In the same manner as the previous embodiment, it is possible to obtain a focus error signal FE of the following equation FE=(B1+B4+B7)−(B2+B3+B5+B6), a differential push pull tracking error signal DPP of the following equation DPP=((B5+B3)−(B5+B7))−G×((A1+A2)−(C1+C2)), and an RF signal RF of the following equation RF=B1+B3+B2+B4+B5+B6+B7, using the output signals B1, B2, B3, B4, and B5 of the respective light receiving parts B3, B4, and B5 of the trisectional optical detection unit 500, the output signals B1, B2, B6, and B7 of the respective light receiving parts B1, B2, B6, and B7 of the sub optical detection units 500PP, and the output signals A1, A2 and C1, C2 of the respective light receiving parts A1, A2 and C1, C2 of the sub optical detection units 501 and 502, shown in FIG. 38. In the equation, "G" indicates a differential coefficient.

Ninth Embodiment

A ninth embodiment is a pickup device which is identical in construction to the fourth embodiment (FIG. 18) except the change in shape and arrangement of the light receiving parts of the photo detector 40 and the provision of a divisional deflection device 377 of the division device. In this embodiment, the partial light flux of the region corresponding to the S polarized light or the P polarized light is slightly offset using some regions of the divisional deflection device, in addition to the fourth embodiment, with the result that the shape of the photo detector for light diffracted by the deflection device, among the returning light flux, is simplified, and, at the same time, SN deterioration at the time of RF signal detection is also prevented.

Specifically, a divisional deflection device 377d of the division device used in the ninth embodiment is shown in FIG. 39. The divisional deflection device 377d is identical in construction to the divisional deflection device 377a shown in FIG. 24 except that the light-transmissive regions TWa and TWc of the divisional deflection device 377a, through which the P polarized partial light fluxes pass, are changed into hologram regions Ha and Hc. That is, the hologram regions Ha and Hc are formed such that the P polarized partial light fluxes are also diffracted and deflected in the tangent direction.

Figure 40:
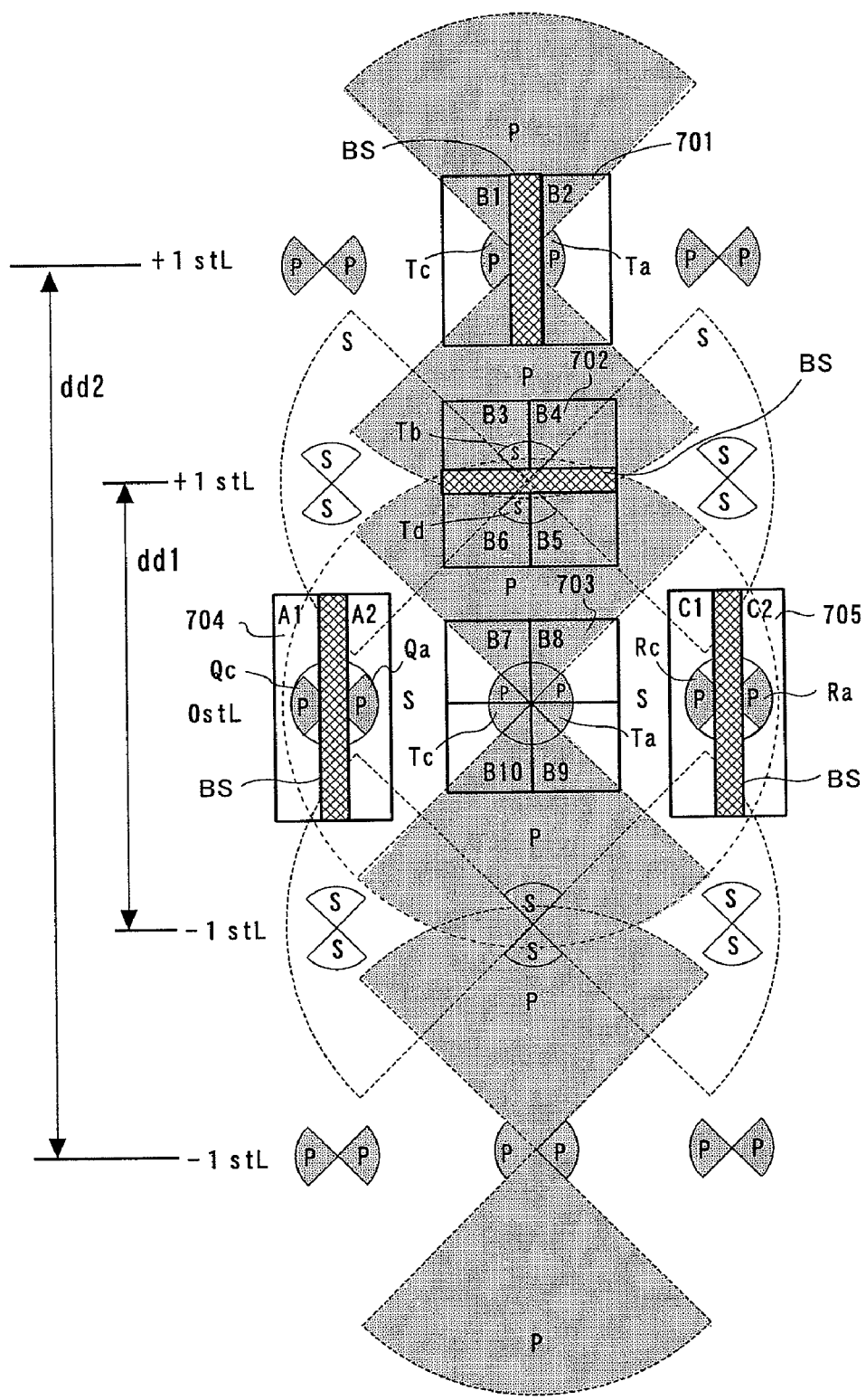
FIG. 40 is a typical plan view illustrating the structure of a photo detector of the optical pickup device according to the ninth embodiment of the present invention.

FIG. 40 is a typical plan view illustrating the structure of a photo detector 40. The photo detector 40 includes a quadrant optical detection unit 703 disposed at the central part thereof to perform focus servo using an astigmatic method, and sub optical detection units 704 and 705 disposed side by side at opposite sides of the quadrant optical detection unit 703 in the radial direction to perform tracking servo by a three beam method. In addition, the photodetector 40 further includes a quadrant optical detection unit 702 for +first-order diffraction S polarized light and a half optical detection unit 701 for +first-order diffraction P polarized light.

Furthermore, the interference between the stray light and the signal light occurs on the division lines in the tangent direction of the sub optical detection units 704 and 705, and, for this reason, opaque light shading stripes BS having a width not affected by the interference are disposed. In the same manner, the interference between the stray light of the P polarized region of the zero-order light and the stray light of the +first-order diffraction P polarized light region occurs on the division line in the radial direction of the quadrant optical detection unit 702 for +first-order diffraction S polarized light, and, for this reason, an opaque light shading stripe BS having a width not affected by the interference is disposed. In the same manner, an opaque light shading stripe BS having a width not affected by the interference is disposed on the division line in the tangent direction of the half optical detection unit 701. As a result, it is possible to prevent the detection of a DC component unnecessary for push pull tracking error detection.

In the regions quartered by the division lines 377L and 377M of the divisional deflection device 377d of FIG. 39, hologram regions Ha and Hc are disposed side by side in the tangent direction while the optical axis is put between the hologram regions Ha and Hc, and hologram regions Hb and Hd are disposed side by side in the radial direction while the optical axis is put between the hologram regions Hb and Hd. In the same manner as the hologram regions Hb and Hd, the hologram regions Ha and Hc are designed such that the condensed spots are diffracted in bi-directions in the tangent direction such that the condensed spots are deflected by a predetermined distance dd2 in the tangent direction from the central point of the quadrant optical detection unit 703. Also, the hologram regions Ha and Hc are formed such that the diffraction is achieved in bi-directions in the tangent direction such that the predetermined distance dd2 is greater than a predetermined distance dd1 in the tangent direction of the condensed spots by the hologram regions Hb and Hd.

In the P polarized partial light flux diffracted at the hologram region Ha of the divisional deflection device 377d shown in FIG. 39, the zero-order diffraction condensed spot Ta spreads in the shape of a fan about the optical axis on the division line in the radial direction to be a quarter circle put between the light receiving parts B8 and B9 of the quadrant optical detection unit 703, as shown in FIG. 40. In the P polarized partial light flux diffracted at the hologram region Hc, the zero-order diffraction condensed spot Tc spreads in the shape of a fan directed in the reverse direction about the optical axis on the division line in the radial direction to be a quarter circle put between the light receiving parts B7 and B10 of the quadrant optical detection unit 703. At the same time, the +first-order diffraction condensed spot Ta of the P polarized partial light flux diffracted at the hologram region Ha of the divisional deflection device 377d spreads in the shape of a fan in the radial direction from the extension line of the division line in the tangent direction of the quadrant optical detection unit 703 to be a quarter circle on the light receiving part B2 of the half optical detection unit 701, and the +first-order diffraction condensed spot Tc of the P polarized partial light flux spreads in the shape of a fan in the reverse direction to be a quarter circle on the light receiving part B1 of the half optical detection unit 701.

In the S polarized partial light flux diffracted at the hologram region Hb of the divisional deflection device 377d, the zero-order diffraction condensed spot Tb spreads in the shape of a fan about the intersection point on the division line in the tangent direction to be a quarter circle put between the light receiving parts B3 and B4 of the quadrant optical detection unit 702, as shown in FIG. 40. In the P polarized partial light flux diffracted at the hologram region Hd, the zero-order diffraction condensed spot Td spreads in the shape of a fan directed in the reverse direction about the intersection point on the division line in the tangent direction to be a quarter circle put between the light receiving parts B5 and B6 of the quadrant optical detection unit 702.

One of the sub beams, divided at the four regions TWa, Hb, TWc, and Hd of the divisional deflection device 377d shown in FIG. 39, is partially condensed on the sub optical detection unit 704 (the light receiving parts A1 and A2) of the photo detector as zero-order diffraction condensed spots Qc and Qa of the P polarized partial light flux, respectively, and is condensed on the sub optical detection unit 705 (the light receiving parts C1 and C2) as condensed spots Rd and Ra, respectively, as shown in FIG. 40.

In the same manner as the previous embodiment, it is possible to obtain a focus error signal FE of the following equation FE=(B3+B5)−(B4+B6), a differential push pull tracking error signal DPP of the following equation DPP= (B1−B2)−G×((A1+C1)−(A2+C2)), and an RF signal RF of the following equation RF=B7+B8+B9+B10, using the output signals B1, B2, B3, B4, B5, B6, B7, B8, B9, B10, A1, A2, C1, and C2 of the respective light receiving parts B1, B2, B3, B4, B5, B6, B7, B8, B9, B10, A1, A2, C1, and C2 of the quadrant optical detection unit 703, the sub optical detection units 704 and 705, the quadrant optical detection unit 702, and the half optical detection unit 701, shown in FIG. 40. In the equation, "G" indicates a differential coefficient. Also, it is possible to perform push pull tracking error detection using a single beam in addition to the normal DPP using three beams. In this case, the detectors A1, A2, C1, and C2 are not used. It is possible to obtain a single beam tracking error signal PP= (B1−B2)−G×((B3+B6)−(B4+B5)). In the equation, "G" indicates a differential coefficient.

Tenth Embodiment

A tenth embodiment is a single beam tracking type pickup device which is identical in construction to the fourth embodiment (FIG. 18) except the removal of the sub beam creating diffraction grating 32, the change in shape and arrangement of the light receiving parts of the photo detector 40 and the provision of a divisional deflection device 377 of the division device. In this embodiment, the sub beam creating diffraction grating 32 is removed from the fourth embodiment, and the divisional deflection device is further divided, such that the partial light flux of the S polarized light and the P polarized light is slightly offset using divisional regions of the divisional deflection device, and therefore, the shape and arrangement of the photo detector for light diffracted by the deflection device, among the returning light flux, is simplified, and, at the same time, SN deterioration at the time of RF signal detection is also prevented.

Figure 41:
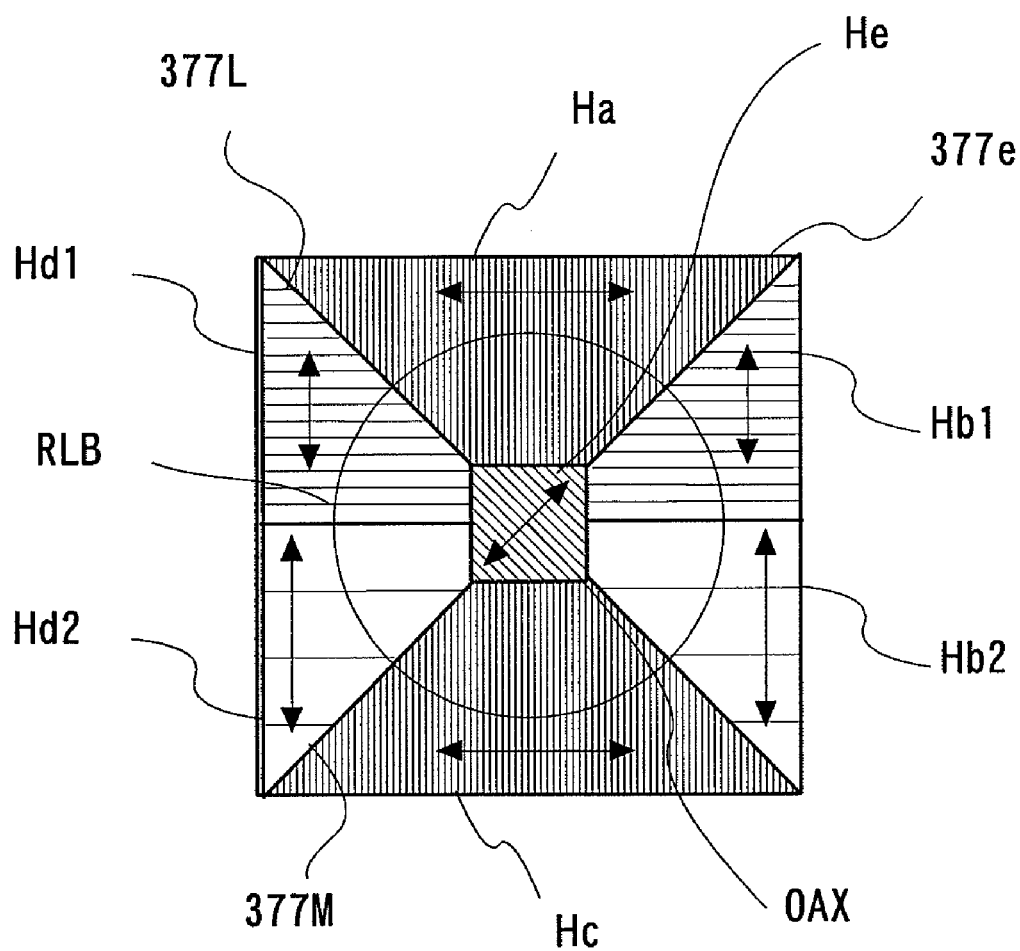
FIG. 41 is a typical plan view illustrating a divisional deflection device of an optical pickup device according to a tenth embodiment of the present invention.

Specifically, a divisional deflection device 377e of the division device used in the tenth embodiment is shown in FIG. 41. FIG. 41 is a typical plan view illustrating the structure of a photo detector 40. The divisional deflection device 377e is constructed to divide the returning light RLB into seven pieces. That is, the divisional deflection device 377e includes a central hologram region He including the optical axis OAX of the returning light RLB and surrounding sextant hologram regions Ha, Hb1, Hb2, Hc, Hd1, and Hd2 which are disposed around the hologram region He.

As shown in FIG. 42, the photo detector 40 includes a quadrant optical detection unit 400 for zero-order diffracted light disposed at the central part thereof to perform focus servo using an astigmatic method, and sub optical detection units 401 and 402 disposed side by side at opposite sides of the quadrant optical detection unit 400 in the tangent direction. The sub optical detection unit 401 is a half optical detection unit for +first-order diffraction S polarized light, and the sub optical detection unit 402 is a quadrant optical detection unit for 1 first-order diffraction S polarized light. The sub optical detection unit 401 includes two light receiving parts A1 and A2 disposed side by side in the tangent direction while being divided in the radial direction. The sub optical detection unit 402 includes two quadrant optical detection parts C1, C2, C1, C2 and C1, C2, C1, C2 disposed side by side in the tangent direction while being divided in the radial direction. One of the quadrant optical detection parts of the sub optical detection unit 402 is disposed symmetrical to the light receiving part A1 of the sub optical detection unit 401 about the optical axis of the returning light, and the other quadrant optical detection part of the sub optical detection unit 402 is disposed on the extension line of the division line in the tangent direction of the quadrant optical detection unit 400 for zero-order diffracted light at a position symmetrical to the light receiving part A1 of the sub optical detection unit 401 about the optical axis of the returning light. The quadrant optical detection parts C1 disposed side by side in the tangent direction of the sub optical detection unit 402 are disposed side by side in an angular direction of 45° to the tangent direction, and, at the same time, the quadrant optical detection parts C2 are disposed side by side in an angular direction of 45° to the tangent direction.

In the returning light flux around the hologram region He of the divisional deflection device 377e shown in FIG. 41, the zero-order diffraction condensed spot of the returning light becomes a circle (zero-order light) having the optical axis of the quadrant optical detection unit 400 as a center thereof, as shown in FIG. 42.

The hologram region He of FIG. 41 is disposed such that the central portion of the returning light is not irradiated to the sub optical detection unit 401 and the sub optical detection unit 402 if possible, and is formed such that the transmitted light is diffracted in an angular direction of 45°, for example, to the tangent direction of FIG. 42. The zero-order light is received by the quadrant optical detection unit 400 for zero-order diffracted light while not being influenced by the hologram region He. Also, the hologram region He may be formed as a light shading region made of an absorbing material. In this case, the central portion of the zero-order light is shaded; however, when the region is configured to be small, there is no trouble in reproducing an RF signal. As shown in FIG. 42, the partial light flux (He+first-order light) of the +first-order diffracted light diffracted at the hologram region He of the divisional deflection device 377e and the partial light flux (He−first-order light) of the 1 first-order diffracted light diffracted at the hologram region He form condensed spots while being separated from the quadrant optical detection unit 400.

The hologram regions Ha and Hc shown in FIG. 41 are the same pattern, and are disposed side by side in the tangent direction while the hologram region He is put between the hologram regions Ha and Hc. Also, the hologram regions Ha and Hc are formed to diffract and deflect the P polarized partial light flux from the divisional wave plate device 37 in the radial direction. The P polarized partial light fluxes diffracted at the hologram regions Ha and Hc of the returning light are diffracted in the opposite direction about the optical axis on the division line in the radial direction of the quadrant optical detection unit 400 to be a pair of condensed spots formed in the shape of a deformed fan (HaHc+first-order light and HaHc 1 first-order light). These deformed fan-shaped condensed spots containing a push pull signal component are not used for error detection.

The hologram region pairs Hb1, Hb2 and Hd1, Hd2 of FIG. 41 are disposed side by side in the radial direction while the hologram region He is put between the hologram region pairs Hb1, Hb2 and Hd1, Hd2. Also, the hologram region pairs Hb1, Hb2 and Hd1, Hd2 are formed to diffract and deflect the S polarized partial light flux from the divisional wave plate device 37 in the tangent direction. The division line between the hologram regions Hb1 and Hb2 extend in the radial direction from the optical axis of the returning light, and the division line between the hologram regions Hd1 and Hd2 extend in parallel to the radial direction from the optical axis of the returning light. The hologram regions Hb1 and Hd1 are the same pattern, and are designed such that the condensed spots are diffracted in bi-directions in the tangent direction such that the condensed spots are deflected at a predetermined distance dd2 in the tangent direction from the central point of the quadrant optical detection unit 400. The hologram regions Hb2 and Hd2 are the same pattern, and are formed such that the condensed spots are diffracted in bi-directions in the tangent direction at a predetermined distance dd1 less than the predetermined distance dd2 in the tangent direction.

Consequently, the S polarized partial light fluxes (Hb1Hd1+first-order light) of the +first-order diffracted light diffracted at the hologram regions Hb1 and Hd1 of the divisional deflection device 377e shown in FIG. 41 become two deformed quadrants on the light receiving part A1 of the sub optical detection unit 401. The S polarized partial light fluxes (Hb1Hd1−first-order light) of the −first-order diffracted light diffracted at the hologram regions Hb1 and Hd1 of the divisional deflection device 377e become two deformed quadrants on the quadrant optical detection parts C1 and C2 of the sub optical detection unit 402. Furthermore, the S polarized partial light fluxes (Hb2Hd2+first-order light) of the +first-order diffracted light diffracted at the hologram regions Hb2 and Hd2 of the divisional deflection device 377e become two deformed quadrants on the light receiving part A2 of the sub optical detection unit 401. The S polarized partial light fluxes (Hb2Hd2−first-order light) of the −first-order diffracted light diffracted at the hologram regions Hb2 and Hd2 of the divisional deflection device 377e become two deformed quadrants on the quadrant optical detection parts C1 and C2 of the sub optical detection unit 402.

With the above-stated construction, the diffracted light flux of the central hologram region He including the optical axis of the returning light is shifted to the region having no light receiving part, and therefore, the stray light of ±first-order light of the hologram regions Hb1, Hb2, Hd1, and Hd2 is prevented from being incident on the sub optical detection unit, with the result that offset unnecessary for error detection does not occur. Furthermore, it is possible for the sub optical detection unit to be disposed inside the stray light of the zero-order light. The interference between the stray light and the ±first-order light on the sub optical detection unit does not occur by the divisional wave plate device 37. It is possible to dispose the sub optical detection units 401 and 402 at the vicinity of the quadrant optical detection unit 400 for zero-order diffracted light.

It is possible to detect the lens shift amount by receiving the S polarized partial light fluxes (Hb1Hd1+first-order light) of the +first-order diffracted light diffracted at the regions having no push pull signal, of the two light receiving parts A1 and A2 of the sub optical detection unit 401, i.e., the hologram regions Hb1 and Hd1, and, at the same time, it is possible to correct the offset of the push pull signal by drawing from a push pull signal of the main beam (zero-order light) at the quadrant optical detection unit 400 for zero-order diffracted light.

Only the −first-order light of the regions having no push pull signal, of the two quadrant optical detection parts C1, C2, C1, C2 and C1, C2, C1, C2 of the sub optical detection unit 402, is used for focus detection, and therefore, the push pull signal is not mixed into the focus error signal as noise.

In the same manner as the previous embodiment, it is possible to obtain a focus error signal FE of the following equation FE=C1−C2, a push pull tracking error signal PP of the following equation PP=((B1+B4)−(B2+B3))−G×(A2−A1), and an RF signal RF of the following equation RF=B1+B2+B3+B4, using the output signals B1, B2, B3, B4, A1, A2, C1, and C2 of the respective light receiving parts B1, B2, B3, B4, A1, A2, C1, and C2 of the quadrant optical detection unit 400 for zero-order diffracted light and the sub optical detection units 401 and 402, shown in FIG. 42. In the equation, "G" indicates a differential coefficient.

Eleventh Embodiment

An eleventh embodiment is a pickup device which is identical in construction to the second embodiment (FIG. 11) except the change in shape and arrangement of the light receiving parts of the photo detector 40 and the provision of a divisional light shading device 377e in place of the divisional deflection device 377 of the division device.

Figure 43:
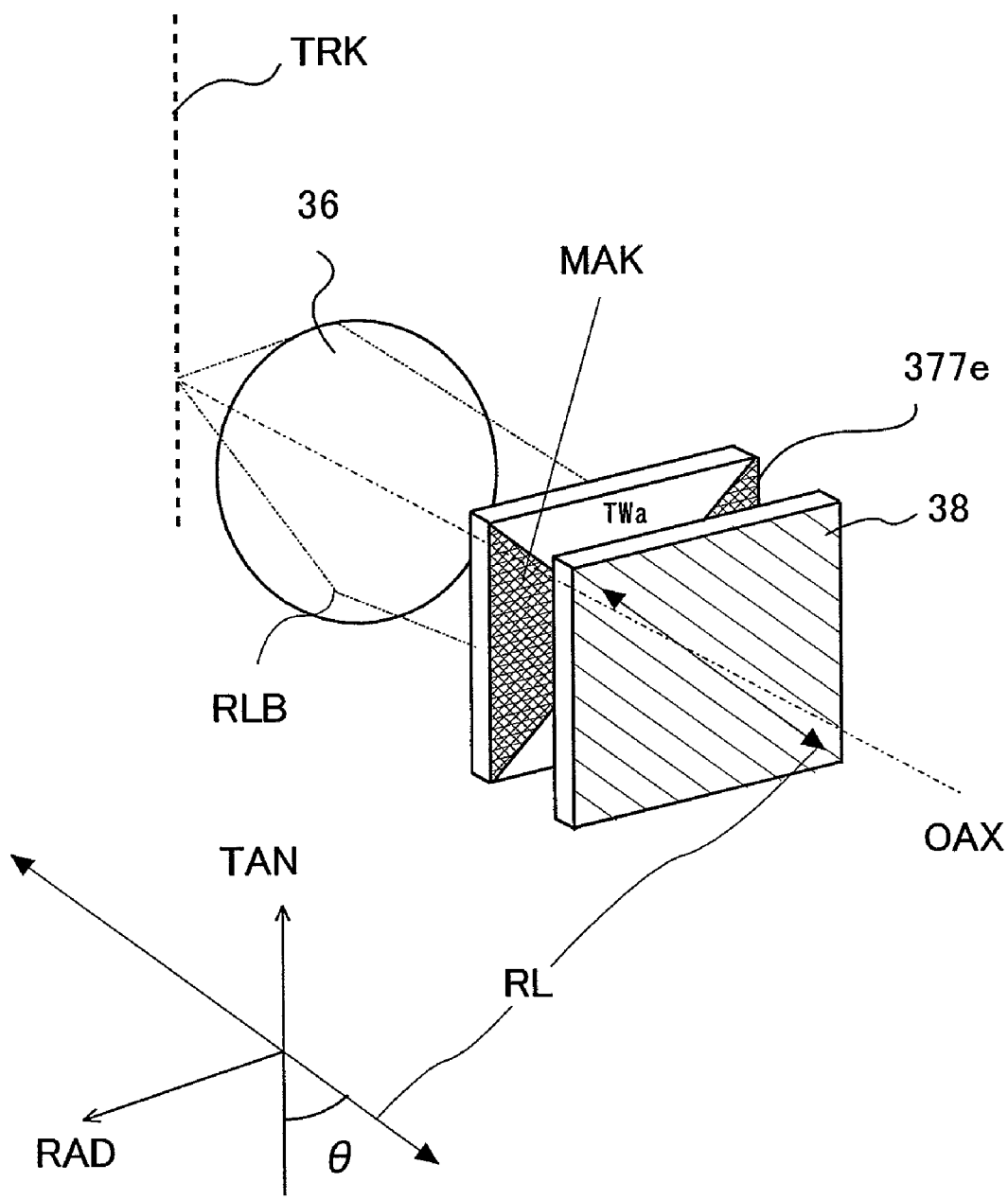
FIG. 43 is a schematic perspective view illustrating the principal part of an optical system, for focus servo by an astigmatic method, of an optical pickup device according to an eleventh embodiment of the present invention.

FIG. 43 is a schematic perspective view illustrating the principal part of an optical system for focus servo by an astigmatic method according to an eleventh embodiment of the present invention (Alight source, a polarization beam splitter, etc. are omitted to clearly describe a detection system).

As shown in FIG. 44, the divisional light shading device 377e is constructed in a structure in which opaque light shading regions BR and transparent regions TW are alternately disposed around the optical axis. That is, the divisional light shading device 377e intersects with the optical axis OAX of the returning light RLB such that a division line 37L extends at an angle of 45° to the tangent direction of the optical disk and such that the transparent regions TW are disposed side by side in the tangent direction while the optical axis is put between the transparent regions TW, and the light shading regions BR are disposed side by side in the radial direction while the optical axis is put between the light shading regions BR.

Figure 45:
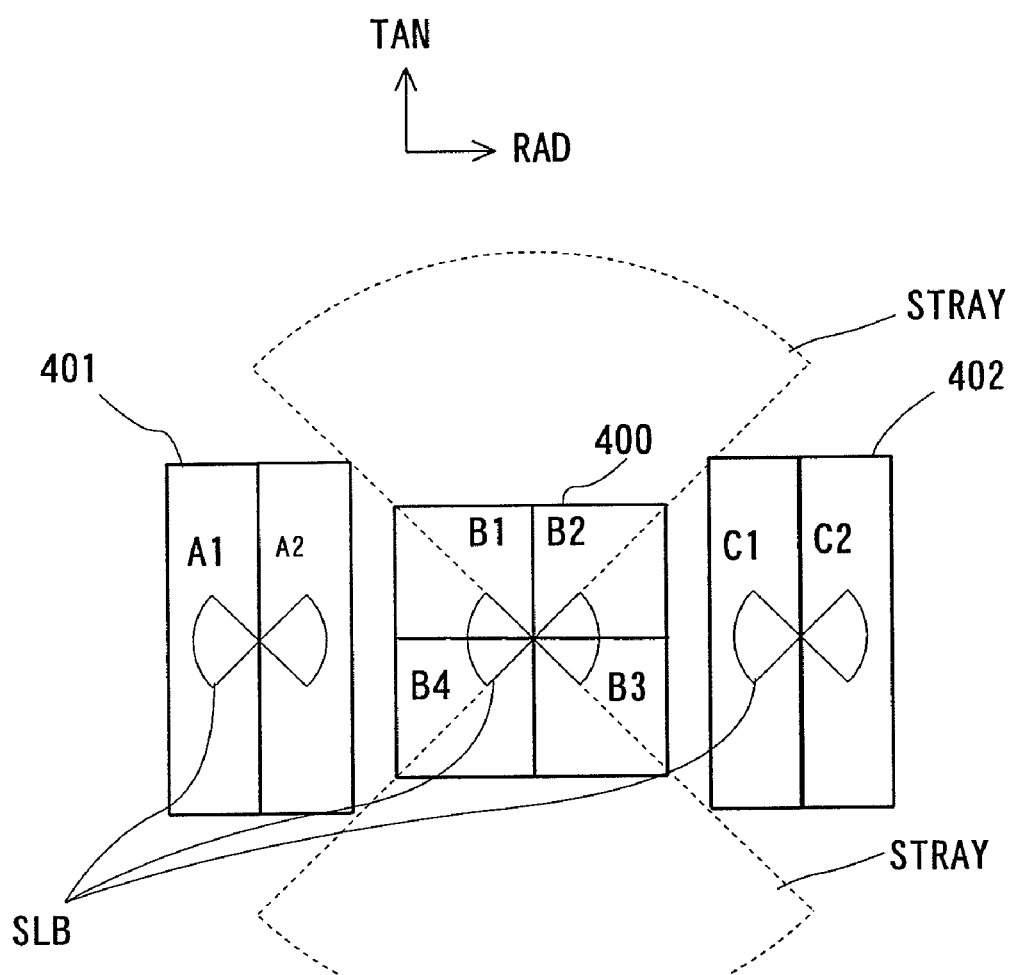
FIG. 45 is a typical plan view illustrating a photo detector of the optical pickup device according to the eleventh embodiment of the present invention when viewing from an optical axis incidence side of the photo detector.

FIG. 45 is a typical plan view illustrating a photo detector 40 when viewing from an optical axis incidence side of the photo detector. The photo detector 40 includes a quadrant optical detection unit 400 disposed at the central part thereof to perform focus servo using an astigmatic method, and sub optical detection units 401 and 402 for three beams disposed side by side at opposite sides of the quadrant optical detection unit 400 in the radial direction to perform tracking servo by a three beam method. In the same manner as the second embodiment, the quadrant optical detection unit 400 includes four light receiving parts B1, B2, B3, and B4, having the same area, which are disposed adjacent to one another while being separated from one another by two perpendicular division lines 400L and 400M as boundary lines. One of the division lines is parallel to the tangent direction. The sub optical detection unit 401; 402 for three beams includes two separated light receiving parts A1 and A2; C1 and C2 disposed adjacent to one another as the boundary lines extending approximately in parallel to the tangent direction. Here, a divisional region 401a; 402a having a large width is not disposed. The light receiving parts are formed and disposed in a point symmetrical fashion with respect to the center of the quadrant optical detection unit 400 (the intersection point between the division lines). That is, the light receiving parts are symmetrical to straight lines extending from the centers thereof in the tangent direction and the radial direction.

The divisional light shading device 377e includes four light-transmissive regions quartered by the two division lines 400L and 400M such that transmission states and non-transmission states of the neighboring light-transmissive regions are different from each other. As shown in FIG. 45, the partial light fluxes located at the supplementary angle positions, among the four regions, do not interfere with the stray light, and therefore, the states of the neighboring partial light fluxes are different from each other. Consequently, it is possible to prevent the SN deterioration of a reproduction signal through even a simple structure of the pickup device.

According to this embodiment, it is possible to obtain a focus error signal FE of the following equation FE=(B1+B3)−(B2+B4), a differential push pull tracking error signal DPP of the following equation DPP=((B1+B4)−(B2+B3))−G×((A1+C1)−(A2+C2)), and an RF signal RF of the following equation RF=B1+B3+B2+B4, using the output signals B1, B2, B3, and B4 of the respective light receiving parts B1, B2, B3, and B4 of the quadrant optical detection unit 400 and the output signals A1, A2, and C1, C2 of the respective light receiving parts A1, A2, and C1, C2 of the sub optical detection units 401 and 402. In the equation, "G" indicates a differential coefficient.

Twelfth Embodiment

A twelfth embodiment is a pickup device which is identical in construction to the fifth embodiment (FIG. 23) except the change in shape and arrangement of the light receiving parts of the photo detector 40 and the provision of only the divisional deflection device 377a (FIG. 24) of the division device with the removal of the divisional wave plate device 37.

Figure 46:
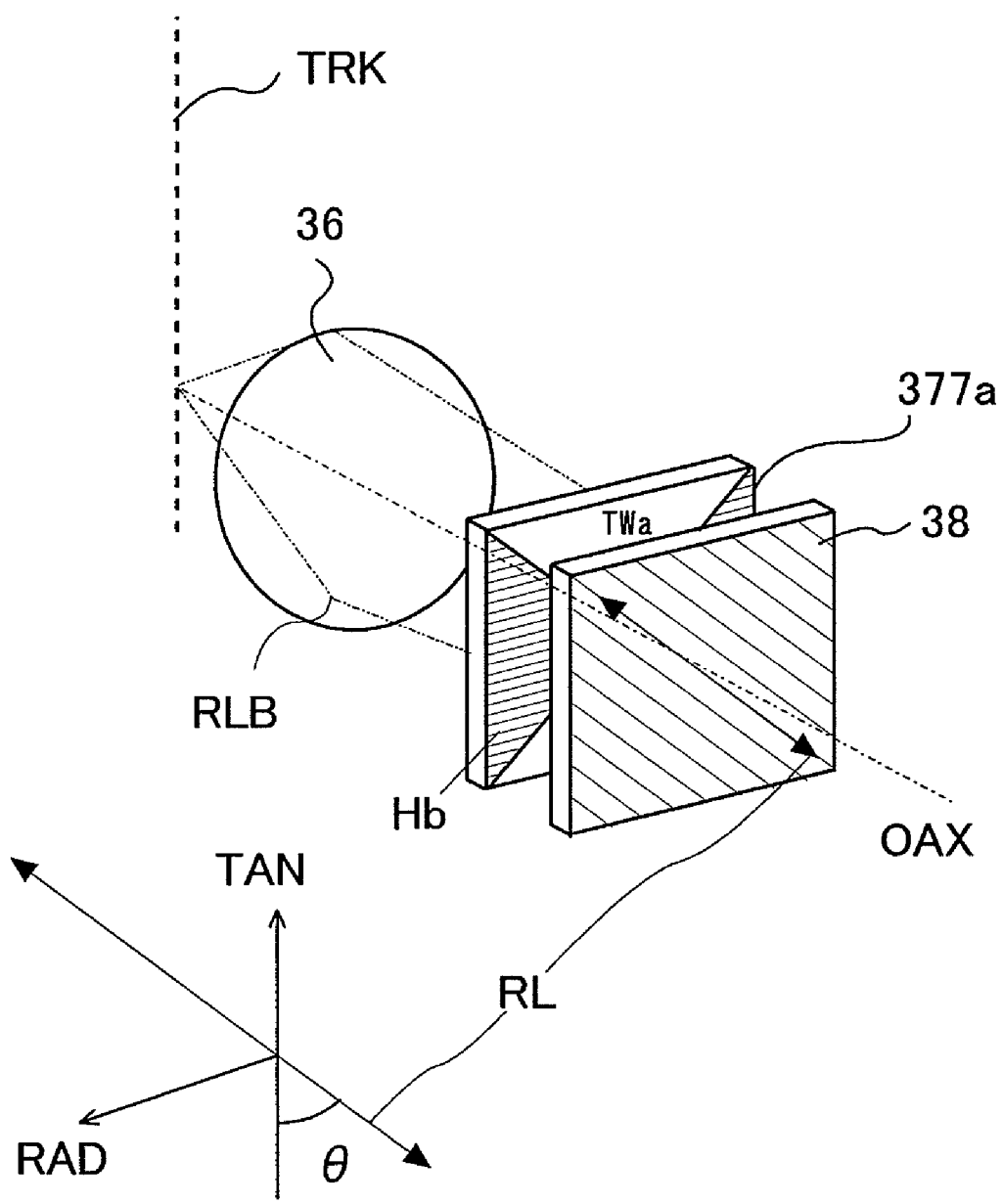
FIG. 46 is a schematic perspective view illustrating the principal part of an optical system, for focus servo by an astigmatic method, of an optical pickup device according to a twelfth embodiment of the present invention.

FIG. 46 is a schematic perspective view illustrating the principal part of an optical system for focus servo by an astigmatic method according to a twelfth embodiment (A light source, a polarization beam splitter, etc. are omitted to clearly describe a detection system).

Figure 47:
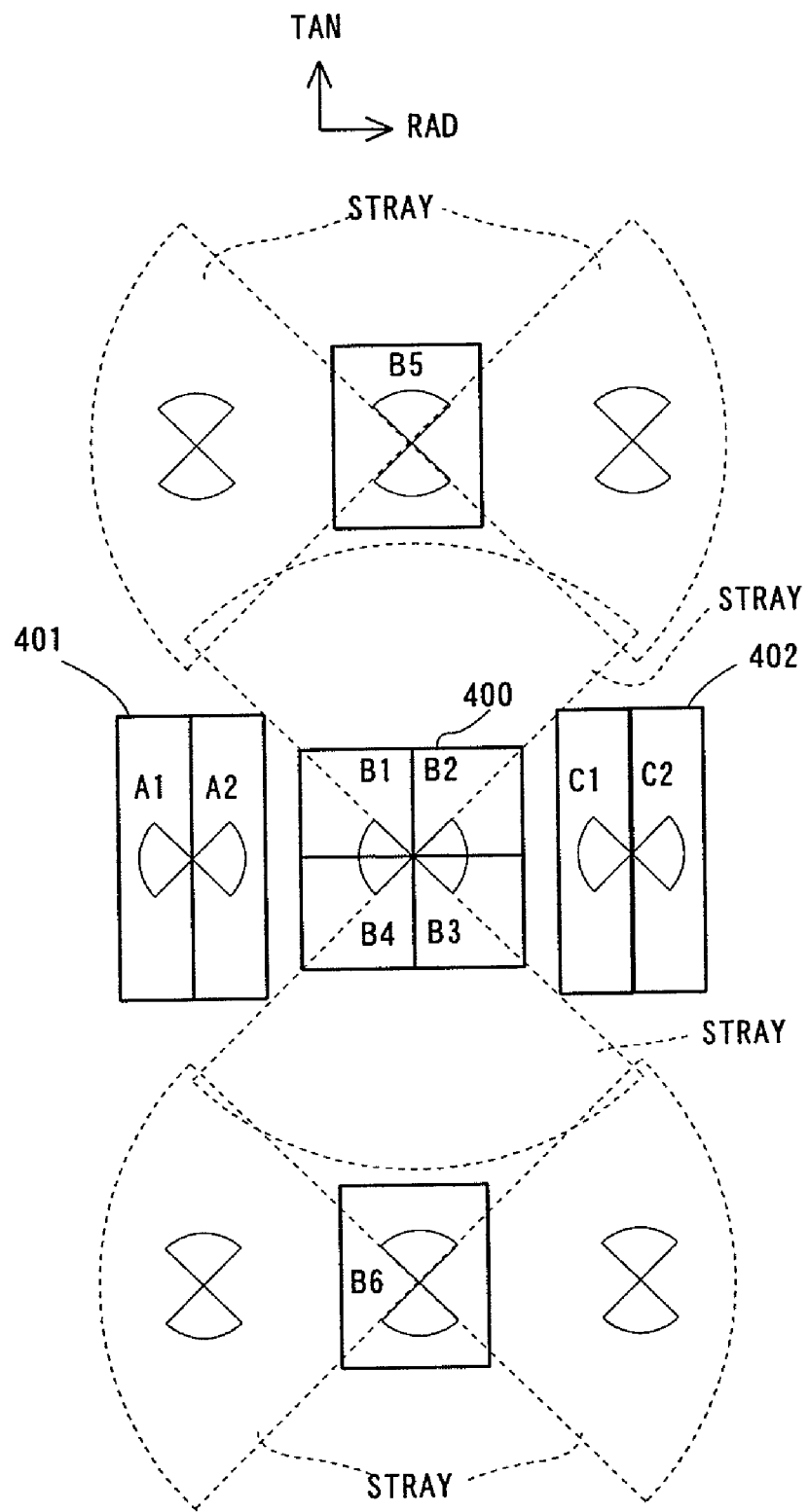
FIG. 47 is a typical plan view illustrating a photo detector of the optical pickup device according to the twelfth embodiment of the present invention when viewing from an optical axis incidence side of the photo detector.

FIG. 47 is a typical plan view illustrating a photo detector 40 when viewing from an optical axis incidence side of the photo detector. The photo detector 40 according to the twelfth embodiment is identical to the photo detector 40 of FIG. 25 except that optical detection parts B5 and B6, having the same size, which are disposed in the tangent direction, are disposed such that the optical detection parts B5 and B6 are spaced more apart than in FIG. 25 at a position symmetrical with respect to the central point of the quadrant optical detection unit 400 (on the extension line of the division line in the tangent direction). In the fifth embodiment of FIG. 25, the polarization directions around the optical axis are different from each other, the interference between the stray light and the signal light is prevented. In the twelfth embodiment, on the other hand, such interference is prevented by the separation between the light receiving parts, and therefore, it is possible to achieve the reproduction through even a simple structure of the pickup device.

The invention claimed is:

1. A pickup device comprising: an irradiation optical system including an object lens for focusing light flux on a track of a recording surface of an optical recording media having a plurality of recording layers stacked while a spacer layer is interposed between the recording layers to form a spot; and a detection optical system including a photo detector having a plurality of light receiving parts for receiving returning light reflected from the recording layers through the object lens to perform photoelectric conversion, the pickup device controlling a position of the object leans according to an electrical signal calculated from outputs of the light receiving parts, wherein the pickup device further comprises:

an astigmatic device for providing astigmatism to the returning light directed to the light receiving parts; and a division device, having divisional regions divided by a division line extending in an astigmatic direction about an optical axis of the returning light, for dividing the returning light having the astigmatism into a plurality of partial light fluxes divided for the respective divisional regions along the optical axis of returning light, wherein ones of the divisional regions neighboring each other provide the partial light fluxes with an optical action so that interference between the corresponding partial light fluxes does not occur on the light receiving parts.

2. The pickup device according to claim 1, wherein the light receiving parts of the photo detector are quartered by a division line extending in an extension direction of the track about the optical axis of the returning light and a second division line perpendicular to the division line.

3. The pickup device according to claim 2, wherein the astigmatic direction by the astigmatic device is set to be inclined at an angle of 45° to the extension direction of the track.

4. The pickup device according to claim 2, wherein the astigmatic direction by the astigmatic device is set to be parallel to the extension direction of the track.

5. The pickup device according to claim 1, wherein the division device includes a divisional deflection device for performing a deflecting action by which the respective partial light fluxes reaches different positions on the light receiving parts as the optical action, and the division device is divided by the division line and a second division line perpendicular to the division line.

6. The pickup device according to claim 1, wherein the division device includes a divisional deflection device for performing a polarizing action by which the respective partial light fluxes are differently polarized on the light receiving parts as the optical action, and the division device is divided by the division line and a second division line perpendicular to the division line.

7. The pickup device according to claim 6, wherein condensed spots by the returning light diffracted at two regions located at a pair of vertically opposite angle positions of the divisional deflection device are formed at the light receiving parts disposed at opposite sides, while being adjacent to each other, on the second division line about an intersection point between the division lines of the photo detector, respectively, and condensed spots by the returning light diffracted at two regions located at another pair of vertically opposite angle positions of the divisional deflection device are formed at the light receiving parts disposed at opposite sides, while being spaced apart from each other, on the division line about an intersection point between the division lines of the photo detector, respectively.

8. The pickup device according to claim 7, wherein the four regions of the divisional deflection device are formed with the intersection point between the division lines as a common origin, the two regions located at a pair of vertically opposite angle positions of the divisional deflection device have a hologram pattern set on the basis of the intersection point between the division lines of the photo detector, and the two regions located at another pair of vertically opposite angle positions of the divisional deflection device have a hologram pattern set on the basis of two points on the division line spaced apart from the intersection point between the division lines of the photo detector.

9. The pickup device according to claim 1, wherein an opaque light shading region is disposed between the light receiving parts of the photo detector.

10. The pickup device according to claim 3, wherein the division device includes an opaque divisional light shading device for shading light as the optical action, and the division device is divided by the division line and a second division line perpendicular to the division line.

* * * * *